(12) United States Patent
Tsai et al.

(10) Patent No.: US 10,271,295 B2
(45) Date of Patent: Apr. 23, 2019

(54) DOWNLINK SYNCHRONIZATION

(71) Applicant: CONVIDA WIRELESS, LLC, Wilmington, DE (US)

(72) Inventors: Allan Y. Tsai, Wilmington, DE (US); Lakshmi R. Iyer, Wilmington, DE (US); Guodong Zhang, Wilmington, DE (US); Joseph M. Murray, Wilmington, DE (US); Qing Li, Wilmington, DE (US); Wei Chen, Wilmington, DE (US); Pascal M. Adjakple, Wilmington, DE (US); Tianyi Xu, Wilmington, DE (US)

(73) Assignee: Convida Wireless, LLC, Wilmington, DE (US)

(*) Notice: Subject to any disclaimer, the term of this patent is extended or adjusted under 35 U.S.C. 154(b) by 0 days.

(21) Appl. No.: 15/492,261

(22) Filed: Apr. 20, 2017

(65) Prior Publication Data
US 2017/0311276 A1 Oct. 26, 2017

Related U.S. Application Data

(60) Provisional application No. 62/325,323, filed on Apr. 20, 2016, provisional application No. 62/373,662, (Continued)

(51) Int. Cl.
*H04W 48/16* (2009.01)
*H04W 56/00* (2009.01)
(Continued)

(52) U.S. Cl.
CPC ...... *H04W 56/0045* (2013.01); *H04B 7/0617* (2013.01); *H04B 7/0695* (2013.01);
(Continued)

(58) Field of Classification Search
CPC . H04W 48/16; H04W 72/005; H04W 76/046; H04W 56/004
(Continued)

(56) References Cited

U.S. PATENT DOCUMENTS 8,902,773 B2  12/2014  Anderson et al.
9,198,181 B2  11/2015  Blankenship et al.
(Continued)

FOREIGN PATENT DOCUMENTS

EP  2464076 A2  6/2012
EP  2 882 110 A1  6/2015
(Continued)

OTHER PUBLICATIONS

3rd Generation Partnership Project; (3GPP) TR 22.891 V1.1.0, 3rd Generation Partnership Project; Technical Specification Group Services and System Aspects; Feasibility Study on New Services and Markets Technology Enablers; Stage 1 (Release 14), Nov. 2011, 95 pages.
(Continued)

*Primary Examiner* — Keith Ferguson
(74) *Attorney, Agent, or Firm* — BakerHostetler

(57) ABSTRACT

The present application is at least directed to an apparatus on a 5G network. The apparatus includes a non-transitory memory including instructions stored thereon for performing configuration of an initial access signal in the 5G network. The apparatus also includes a processor, operably coupled to the non-transitory memory, capable of executing an instruction of monitoring transmission of a downlink sweeping subframe including a beam sweeping block carrying a downlink initial access signal. The processor is capable of also executing the instruction of detecting the downlink initial access signal carrying a synchronization channel. The processor is capable of also executing the instruction of determining, based on the synchronization channel, an identity of the beam sweeping block associated with the downlink initial access signal. The present application is also directed to an apparatus configured to perform downlink synchronization of a cell in the 5G network.

20 Claims, 46 Drawing Sheets

Related U.S. Application Data filed on Aug. 11, 2016, provisional application No. 62/401,055, filed on Sep. 28, 2016, provisional application No. 62/417,162, filed on Nov. 3, 2016.

(51) Int. Cl.
| | |
|---|---|
| *H04B 7/06* | (2006.01) |
| *H04W 48/20* | (2009.01) |
| *H04L 27/26* | (2006.01) |
| *H04W 76/27* | (2018.01) |
| *H04W 72/00* | (2009.01) |

(52) U.S. Cl.
CPC ......... *H04L 27/2655* (2013.01); *H04W 48/16* (2013.01); *H04W 48/20* (2013.01); *H04W 56/001* (2013.01); *H04L 27/2601* (2013.01); *H04W 72/005* (2013.01); *H04W 76/27* (2018.02)

(58) Field of Classification Search
USPC .... 455/515, 507, 508, 502, 500, 561, 562.1, 455/456.1–457, 556.1, 575.1, 575.7, 455/550.1, 422.1, 403; 370/310, 312, 370/314, 328, 329, 338
See application file for complete search history.

(56) References Cited

U.S. PATENT DOCUMENTS

| | | |
|---|---|---|
| 9,413,451 B2 | 8/2016 | Park |
| 2009/0323607 A1 | 12/2009 | Park et al. |
| 2010/0027466 A1 | 2/2010 | Mustapha |
| 2010/0061361 A1 | 3/2010 | Wu |
| 2011/0222428 A1 | 9/2011 | Charbit et al. |
| 2011/0242997 A1 | 10/2011 | Yin |
| 2012/0009963 A1 | 1/2012 | Kim et al. |
| 2013/0155847 A1 | 6/2013 | Li et al. |
| 2013/0225184 A1 | 8/2013 | Liu et al. |
| 2013/0242882 A1 | 9/2013 | Blankenship et al. |
| 2014/0036806 A1 | 2/2014 | Chen et al. |
| 2014/0204854 A1 | 7/2014 | Freda et al. |
| 2014/0254544 A1 | 9/2014 | Kar et al. |
| 2014/0315593 A1 | 10/2014 | Vrzic et al. |
| 2014/0321375 A1 | 10/2014 | Agiwal et al. |
| 2014/0369201 A1 | 12/2014 | Gupta et al. |
| 2015/0103725 A1 | 4/2015 | Sun et al. |
| 2016/0020877 A1 | 1/2016 | Koutsimanis et al. |
| 2016/0073302 A1 | 3/2016 | Yang et al. |
| 2016/0113039 A1 | 4/2016 | Hole et al. |
| 2016/0135153 A1 | 5/2016 | Suzuki et al. |
| 2016/0234759 A1 | 8/2016 | Kubota et al. |
| 2016/0353343 A1 | 12/2016 | Rahman et al. |
| 2017/0201980 A1* | 7/2017 | Hakola ............. H04W 72/0446 |
| 2017/0230985 A1 | 8/2017 | Yamada et al. |
| 2017/0289791 A1 | 10/2017 | Yoo et al. |
| 2017/0290052 A1 | 10/2017 | Zhang et al. |
| 2017/0331670 A1 | 11/2017 | Parkvall et al. |
| 2017/0331785 A1 | 11/2017 | Xu et al. |
| 2017/0359731 A1 | 12/2017 | Soldati et al. |
| 2018/0123763 A1 | 5/2018 | Yu |
| 2018/0124598 A1 | 5/2018 | Zeng |
| 2018/0139656 A1 | 5/2018 | Xu et al. |
| 2018/0167938 A1 | 6/2018 | Stephenne et al. |
| 2018/0198504 A1 | 7/2018 | Li et al. |
| 2018/0199361 A1 | 7/2018 | Zhang et al. |
| 2018/0242304 A1 | 8/2018 | Rong et al. |

FOREIGN PATENT DOCUMENTS

| | | | |
|---|---|---|---|
| EP | 3051906 A1 | 8/2016 | |
| EP | 3082362 A1 | 10/2016 | |
| EP | 3101971 A1 | 12/2016 | |
| WO | 2014/090200 A1 | 6/2014 | |
| WO | 2014/090208 | 6/2014 | |
| WO | 2015/045658 A1 | 4/2015 | |
| WO | WO 2015-080646 A1 | 6/2015 | |
| WO | 2015/100533 A1 | 7/2015 | |
| WO | 2015/113205 A1 | 8/2015 | |
| WO | 2015/141982 A1 | 9/2015 | |

OTHER PUBLICATIONS

3rd Generation Partnership Project; (3GPP) TR 38.913 V0.2.0, 3rd Generation Partnership Project; Technical Specification Group Radio Access Network; Study on Scenarios and Requirements for Next Generation Access Technologies; (Release 14), Feb. 2016, 19 pages.

3rd Generation Partnership Project; (3GPP) TS 36.211 V13.1.0, 3rd Generation Partnership Project; Technical Specification Group Radio Access Network; Evolved Universal Terrestrial Radio Access (E-UTRA); Physical Channels and Modulation (Release 13), Mar. 2016, 155 pages.

3rd Generation Partnership Project; (3GPP) TS 36.212 V10 .8.0, "3rd Generation Partnership Project; Technical Specification Group Radio Access Network; Evolved Universal Terrestrial Radio Access (E-UTRA) ; Multiplexing and Channel Coding (Release 10)", Jun. 17, 2013, 1-79 pages.

3rd Generation Partnership Project; (3GPP) TS 36.304 V13.0.0, 3rd Generation Partnership Project; Technical Specification Group Radio Access Network; Evolved Universal Terrestrial Radio Access (E-UTRA); User Equipment (UE) Procedures in idle Mode (Release 13), Dec. 2015, 42 pages.

3rd Generation Partnership Project; (3GPP) TS 36.331 V13.0.0, 3rd Generation Partnership Project; Technical Specification Group Radio Access Network; Evolved Universal Terrestrial Radio Access (E-UTRA); Radio Resource Control (RRC); Protocol specification (Release 13), Dec. 2015, 507 pages.

3rd Generation Partnership Project; (3GPP) TSG-RAN WG1 #86bis, R1-1610177, "DL Control Channels Overview", Qualcomm Incorporated, Oct. 10-14, 2016, Lisbon, Portugal, Discussion, Oct. 1, 2016, 6 pages.

3rd Generation Partnership Project; (3GPP) TSG-RAN WG1 #86bis, R1-1609127, "Signaling of Slot Structure", 3GPP Draft, Oct. 10-14, 2016, Lisbon, Portugal, Discussion, Sep. 30, 2016, 3 pages.

Budisin S. "Decimation Generator of Zadoff-Chu Sequences", In: Carlet C., Pott A. (eds) Sequences and Their Applications—SETA 2010. SETA 2010. Lecture Notes in Computer Science, vol. 6338. Springer, Berlin, Heidelberg, 2010, 40 pages.

Chu, David, "Polyphase Codes With Good Periodic Correlation Properties", IEEE Transactions on Information Theory, Jul. 1972, 531-532.

International Patent Application No. PCT/US2017/032176: Invitation to Pay Additional Fees and, Where Applicable, Protest Fee, dated Jul. 24, 2017, 17 pages.

International Patent Application No. PCT/US2017/046483: Invitation to Pay Additional Fees and, Where Applicable, Protest Fee, dated Oct. 24, 2017, 13 pages.

International Telecommunication Union (ITU-R), "IMT Vision—Framework and overall objectives of the future development of IMT for 2020 and beyond", Recommendation ITU-RM.2083-0, Sep. 2015, 21 pages.

Sesia, Stefania, "LTE-The UMTS Long Term Evolution", John Wiley & Sons, Incorporated, ProQuest Ebook Central, Jul. 20, 2011, 198-200, http://ebookcentral.proquest.com/lib/epo-ebooks/detail.action?docID=693278.

3rd Generation Partnership Project (3GPP) TSG-RAN WG2 Meeting #94, R2-163718 "Control Plane functions in NR", Nanjing, China; May 23-27, 2016, 4 pages.

3rd Generation Partnership Project (3GPP) TSG-RAN WG2 Meeting #94 R2-163371, "System Information Signalling Design in NR", May 23-27, 2016, 7 pages.

3rd Generation Partnership Project (3GPP) TSG-RAN WG1#85 R1-165027 "Basic Frame Structure Principles for 5G" May 23-27, 2016, 6 pgaes.

3rd Generation Partnership Project (3GPP) TSG RAN WG1 Meeting #85 R1-165174 "Uplink multiple access schemes for NR", May 23-27, 2016, 4 pages.

(56) References Cited

OTHER PUBLICATIONS

3rd Generation Partnership Project (3GPP) TSG RAN WG1 Meeting #85 R1-164871 "Frame structure for new radio interface", May 23-27, 2016, 3 pages.
3rd Generation Partnership Project (3GPP) TSG RAN WG1 Meeting #84bis R1-162797, "Harq Enhancement for Improved Data Channel Efficiency", Busan, Korea, Apr. 11-15, 2016, 3 pages.
3rd Generation Partnership Project (3GPP) TSG RAN WG1 Meeting #84bis R1-162379, "Overview of new radio access technology requirements and designs" Apr. 11-15, 2016, 4 pages.
3rd Generation Partnership Project (3GPP) SS WG2 Meeting #115 S2-162511 "Common CP functions and dedicate CP function for simultaneous multiple Network Slice (update of solution 1.3)" May 23-27, 2016, 4 pages.
NGMN 5G Initiative White Paper v1.0, Feb. 17, 2015, 125 pages.
IEEE P802.11, Wireless LANs, Proposed TGax draft specification, Comment Resolutions on UL MU Operation, Jul. 25, 2016, 27 pages.
3rd Generation Partnership Project (3GPP), TSG RAN WG1 Meeting #86, "RAN1 Chairman's Notes", Gothenburg, Sweden, Aug. 22-26, 2016, 105 pages.
3rd Generation Partnership Project (3GPP), TS 36.212 V10.8.0, RAN WG1, Technical Specification Group Radio Access Network; Evolved Universal Terrestrial Radio Access (E-UTRA); Multiplexing and Channel Coding (Release 10), Jun. 17, 2013, pp. 1-79.
3rd Generation Partnership Project (3GPP), RAN WG1, R1-1610177, Qualcomm Incorporated: "DL control channels overview", Oct. 1, 2016, 6 pages.
3rd Generation Partnership Project (3GPP) TSG-RAN WG1#85, R1-165363, Nokia, Alcatel-Lucent Shanghai Bell, Scalability of MIMO Operation Across NR Carrier Frequencies, Nanjing, P.R. China, May 23-27, 2016, 5 pages.
3rd Generation Partnership Project (3GPP) TSG-RAN WG1 #85, R1-164694, Frame Structure Requirements, Qualcomm, Nanjing, China, May 23- 27, 2016, 5 pages.
3rd Generation Partnership Project (3GPP) TSG-RAN WG1 #85, R1-164628, Frame Structure for NR, Ericsson, Nanjing, China, May 23-27, 2016, 3 pages.
3rd Generation Partnership Project (3GPP) TSG RAN WG1 Meeting #86bis R1-1610524, WF on NR RS Definition, Huawei, HiSilicon, Lisbon, Portugal, Oct. 10-14, 2016, Agenda Item: 8.1.4.4, 4 pages.
3rd Generation Partnership Project (3GPP) TSG RAN WG1 Meeting #83, Anaheim, USA, NTT DoCoMo, Initial Views on Technical Design for NB-IoT, 6.2.6.2, Discussion and Decision, Nov. 2015, 3 pages.
3rd Generation Partnership Project (3GPP) TSG RAN WG1 #85, R1-165669, Way Forward on Frame Structure, Qualcomm and etc., Nanjing, China, May 23-27, 2016, Agenda Item 7.1.4, 2 pages.
3rd Generation Partnership Project (3GPP) TSG RAN WG1 #85, R1-164014, Discussion on RS for Beamformed Access, Samsung, Nanjing, China, May 23-27, 2016, 3 pages.
3rd Generation Partnership Project (3GPP) TSG RAN WG1 #85, R1-164013, Framework for Beamformed Access, Samsung, Nanjing, China, May 23-27, 2016, 4 pages.
3rd Generation Partnership Project (3GPP) TSG RAN WG1 #84bis Meeting, R1-163757, Way Forward on Channel Coding Evaluation for 5G New Radio, Busan, Korea, Apr. 11-15, 2016, Agenda Item 8.1.6.1, 5 pages.
3rd Generation Partnership Project (3GPP) TS TSG RAN WG1 Meeting #85, 2016 Nanjing, China 23rd-27th, NTT DoCoMo, Inc., Uplink Multiple Access Schemes for Nr, 7.1.3.2, Discussion and Decision, May 2016, 4 pages.
3rd Generation Partnership Project (3GPP) TS TSG RAN WG1 Meeting #84bis, Busan, Korea,Intel Corporation, Overview of New Radio Access Technology Requirements and Designs, 8.1.1, Discussion and Decision, Apr. 2016, 4 pages.

3rd Generation Partnership Project (3GPP) TS 36.321 V13.0.0, Technical Specification Group Radio Access Network, Evolved Universal Ten-estrial Radio Access (E-UTRA), Medium Access Control (MAC) protocol specification (Release 13), Dec. 2015, 82 pages.
3rd Generation Partnership Project (3GPP) TS 36.300 V13.3.0, Technical Specification Group Radio Access Network, Evolved Universal Ten-estrial Radio Access (E-UTRA) and Evolved Universal Terrestrial Radio Access Network (E-UTRAN), Overall description; Stage 2 (Release 13), Mar. 2016, 295 pages.
3rd Generation Partnership Project (3GPP) TS 36.213 V13.0.0, Technical Specification Group Radio Access Network, Evolved Universal Terrestrial Radio Access (E-UTRA), Physical layer procedures (Release 13), Dec. 2015, 326 pages.
3rd Generation Partnership Project (3GPP) TS 36.133 V14.7.0, Technical Specification Group Radio Access Network, Evolved Universal Terrestrial Radio Access (E-UTRA), Requirements for support of radio resource management (Release 14), Mar. 2018, 2997 pages.
3rd Generation Partnership Project (3GPP) TS 24.302 V135.0, Technical Specification Group Core Network and Terminals, Access to the 3GPP Evolved Packet Core (EPC) via non-3GPP access networks; Stage 3 (Release 13), Mar. 2016, 126 pages.
3rd Generation Partnership Project (3GPP) TS 23.401 V13.6.1, Technical Specification Group Services and System Aspects, General Packet Radio Service (GPRS) enhancements for Evolved Universal Terrestrial Radio Access Network (E-UTRAN) access (Release 13), Mar. 2016, 365 pages.
3rd Generation Partnership Project (3GPP) TS 23.060 V13.6.0, Technical Specification Group Services and System Aspects, General Packet Radio Service (GPRS), Service description, Stage 2 (Release 13), Mar. 2016, 362 pages.
3rd Generation Partnership Project (3GPP) TR 45.820 V13.1.0, Technical Specification Group GSM/EDGE Radio Access Network, Cellular system support for ultra-low complexity and low throughput Internet of Things (CIoT) (Release 13), Nov. 2015, 495 pages.
3rd Generation Partnership Project (3GPP) TR 38.913 V14.3.0, Technical Specification Group Radio Access Network, Study on Scenarios and Requirements for Next Generation Access Technologies, (Release 14), Jun. 2017, 39 pages.
3rd Generation Partnership Project (3GPP) TR 38.801 V0.2.0, Technical Specification Group Radio Access Network, Study on New Radio Access Technology: Radio Access Architecture and Interface (Release 14), Jun. 2016, 20 pages.
3rd Generation Partnership Project (3GPP) TR 36.912 V13.0.0, Technical Specification Group Radio Access Network, Feasibility study for Further Advancements for E-UTRA (LTE-Advanced) (Release 13), Dec. 2015, 273 pages.
3rd Generation Partnership Project (3GPP) TR 36.897 V13.0.0, Technical Specification Group Radio Access Network, Study on Elevation Beamforming/Full-Dimension (FD) Multiple Input Multiple Output (MIMO) for LTE; (Release 13), Jun. 2015, 58 pages.
3rd Generation Partnership Project (3GPP) TR 36.881 V14.0.0, Technical Specification Group Radio Access Network, Evolved Universal Terrestrial Radio Access (E-UTRA), Study on Latency Reduction Techniques for LTE (Release 14), Jun. 2016, 249 pages.
3rd Generation Partnership Project (3GPP) TR 23.799 V0.5.0, Technical Specification Group Services and System Aspects, Study on Architecture for Next Generation System, (Release 14), May 2016, 372 pages.
3rd Generation Partnership Project (3GPP) TR 23.720 V13.0.0, Technical Specification Group Services and System Aspects, Study on architecture enhancements for Cellular Internet of Things, (Release 13), Mar. 2016, 94 pages.
3rd Generation Partnership Project (3GPP) TR 22.891 V14.2.0, Technical Specification Group Services and System Aspects, Feasibility Study on New Services and Markets Technology Enablers, Stage 1 (Release 14), Sep. 2016, 95 pages.
3rd Generation Partnership Project (3GPP) TR 22.864 V14.1.0, Technical Specification Group Services and System Aspects, Feasibility Study on New Services and Markets Technology Enablers—Network Operation, Stage 1 (Release 14), Sep. 2016, 35 pages.

(56) References Cited

OTHER PUBLICATIONS

3rd Generation Partnership Project (3GPP) TR 22.863 V14.1.0, Technical Specification Group Services and System Aspects, Feasibility Study on New Services and Markets Technology Enablers—Enhanced Mobile Broadband, Stage 1 (Release 14), Sep. 2016, 21 pages.
3rd Generation Partnership Project (3GPP) TR 22.863 V0.3.1, Technical Specification Group Services and System Aspects, Feasibility Study on New Services and Markets Technology Enablers—Enhanced Mobile Broadband; Stage 1 (Release 14), Feb. 2016, 13 pages.
3rd Generation Partnership Project (3GPP) TR 22.862 V14.1.0, Technical Specification Group Services and System Aspects, Feasibility Study on New Services and Markets Technology Enablers for Critical Communications, Stage 1 (Release 14), Sep. 2016, 31 pages.
3rd Generation Partnership Project (3GPP) TR 22.861 V14.1.0, Technical Specification Group Services and Systems Aspects, Feasibility Study on New Services and Markets Technology Enablers for Massive Internet of Things, Stage 1 (Release 14), Sep. 2016, 28 pages.
3rd Generation Partnership Project (3GPP) S2-162982 was S2-162717-MDD and Slice Selection in core and RAN V1, 3rd vol. SA WG2 Nokia et al., no. Nanjing, P.R. China; 20160523-20160527, May 27, 2016, 13 pages.
3rd Generation Partnership Project (3GPP) S2-161324 SA WG2 Meeting #113, Solution to Key Issue on Mobility Framework, Sophia Antipolis, FR, Feb. 23-26, 2016, 3 pages.
3rd Generation Partnership Project (3GPP) S2-161198 SA WG2 Meeting #113AH, Solution for optimized UE sleep state and state transitions, Sophia Antipolis, France, Feb. 23-26, 2016, 3 pages.
3rd Generation Partnership Project (3GPP) S1-161323 TSG-SA WG1 Meeting #74, Editorial cleanup and alignment of eMBB TR22.863, Venice, Italy, May 9-13, 2016, 4 pages.
3rd Generation Partnership Project (3GPP) S1-152395 Revision of S1-152074, ZTE Corporation et al., "Update the network slicing use case in Smarter", ZTE Smarter Update the Network Slicing Use case REV3, vol. SA WG1, no. Belgrade Serbia, Aug. 24, 2015, 3 pages.
3rd Generation Partnership Project (3GPP) RP-161214 TSG RAN Meeting #72, Revision of SI: Study on New Radio Access Technology, NTT Docomo, Busan, Korea, Jun. 13-16, 2016, 8 pages.
3rd Generation Partnership Project (3GPP) RP-160540 TSG RAN Meeting #71, New WI proposal: Signalling reduction to enable light connection for LTE, Gothenburg, Sweden, Mar. 7-10, 2016, 7 pages.
3rd Generation Partnership Project (3GPP) RP-160425 TSG RAN Meeting #71, Further enhancements on signaling reduction to enable light connection for LTE, Intel Corporation, Gothenburg, Sweden, Mar. 7-10, 2016, 7 pages.
3rd Generation Partnership Project (3GPP) RP-160301 TSG RAN Meeting #71, Motivation for new WI on Light Connection in LTE, Huawei, HiSilicon, Goteborg, Sweden, Mar. 7-11, 2016, 14 pages.
3rd Generation Partnership Project (3GPP) R2-162571 TSGRAN WG2 Meeting #93bis, Introduction of Virtual Cell, CATT, Dubrovnik, Croatia, Apr. 11-15, 2016, 3 pages.
3rd Generation Partnership Project; 3GPP TR 23.799 V0.5.0; Technical Specification Group Services and System Aspects; Study on Architecture for Next Generation System (Release 14); May 2016; 179 pages.

* cited by examiner

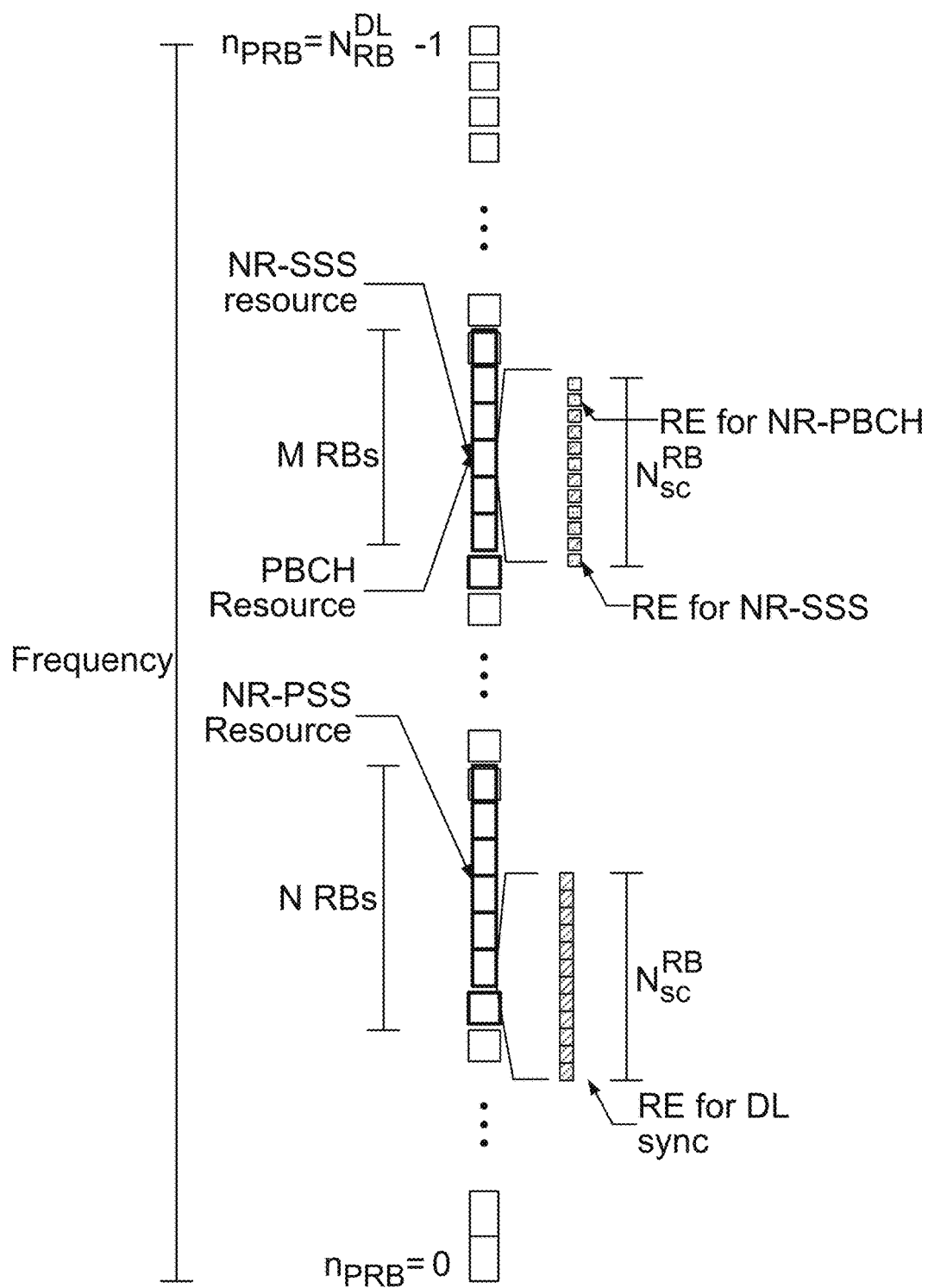
FIG. 21B(ii)

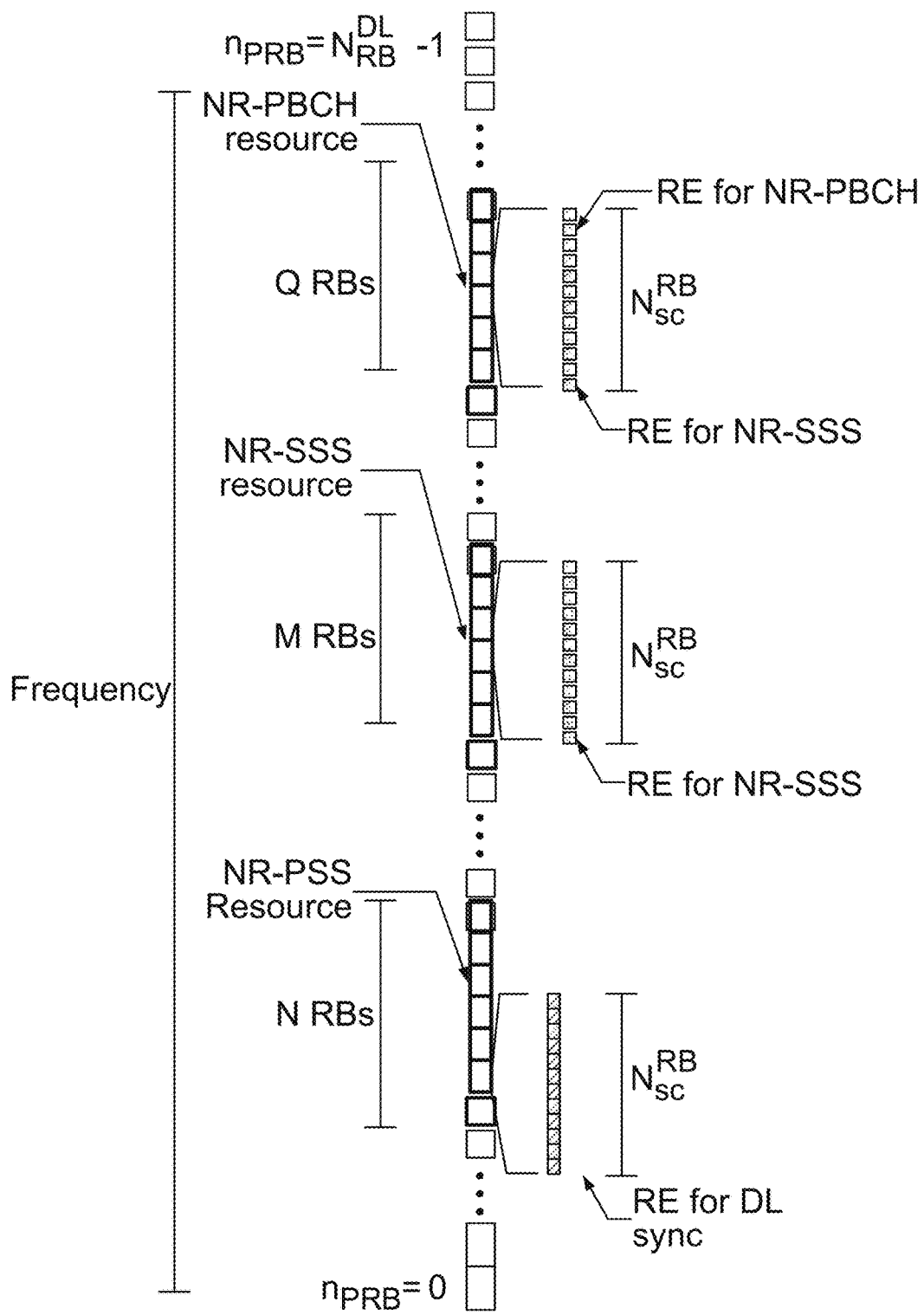
FIG. 21B(iii)

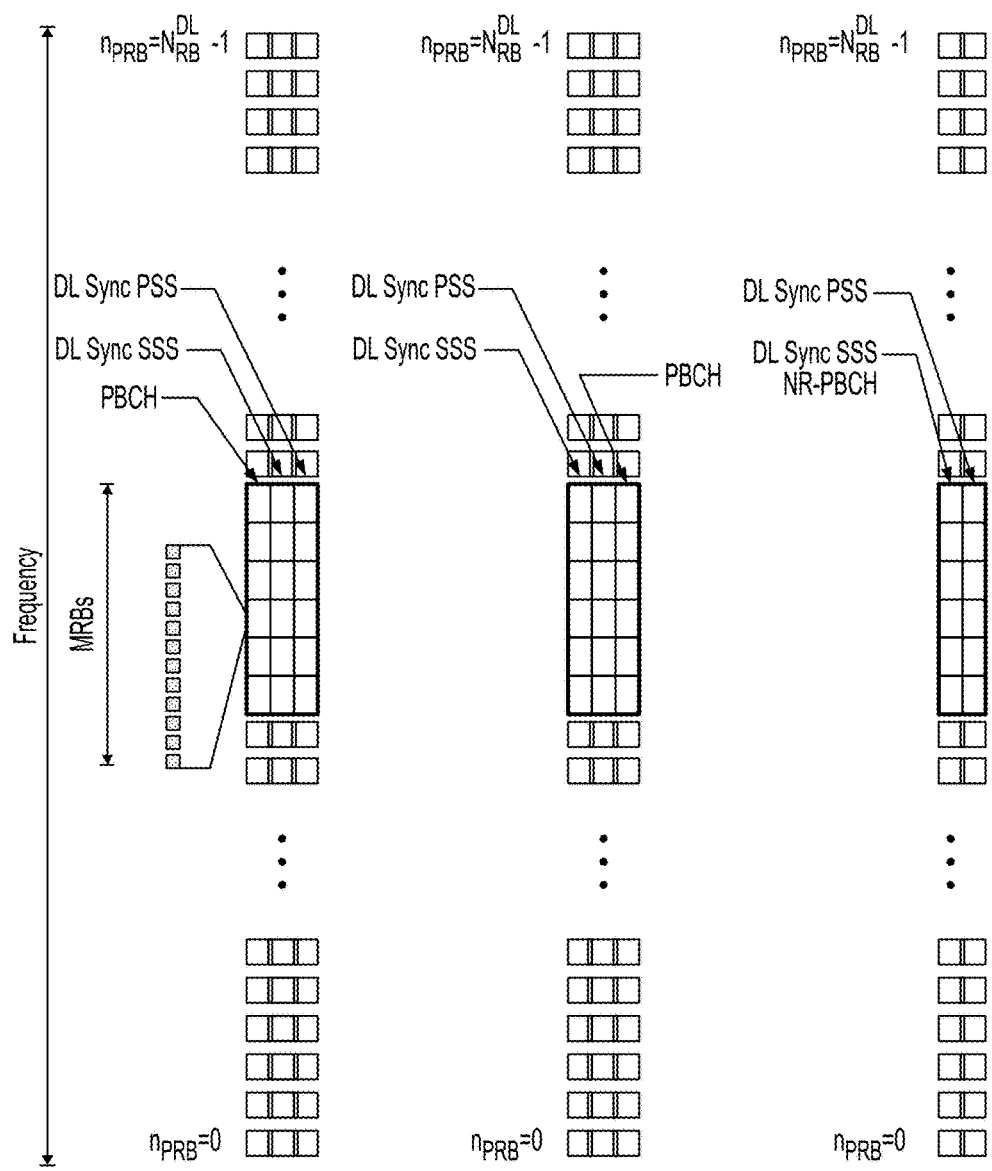
FIG. 21C(i)  FIG. 21C(ii)  FIG. 21C(iii)

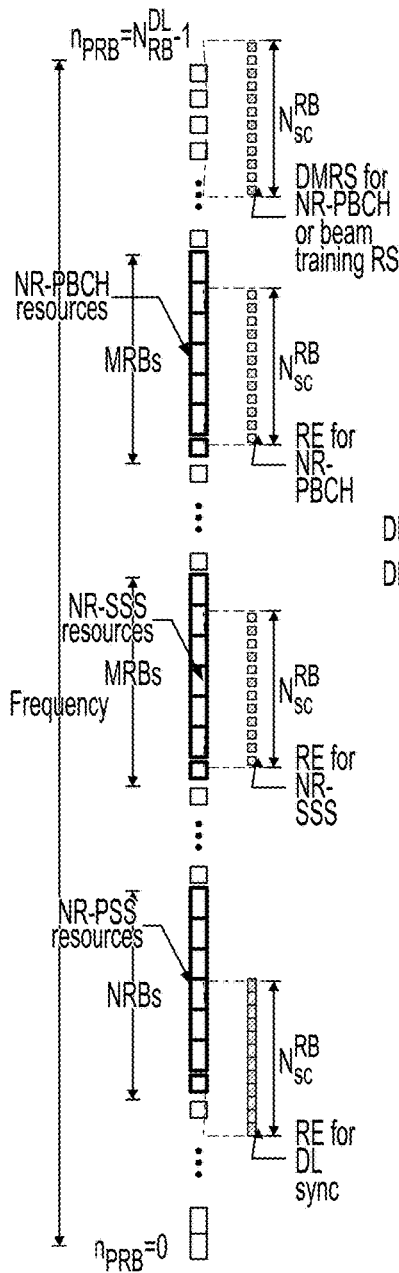
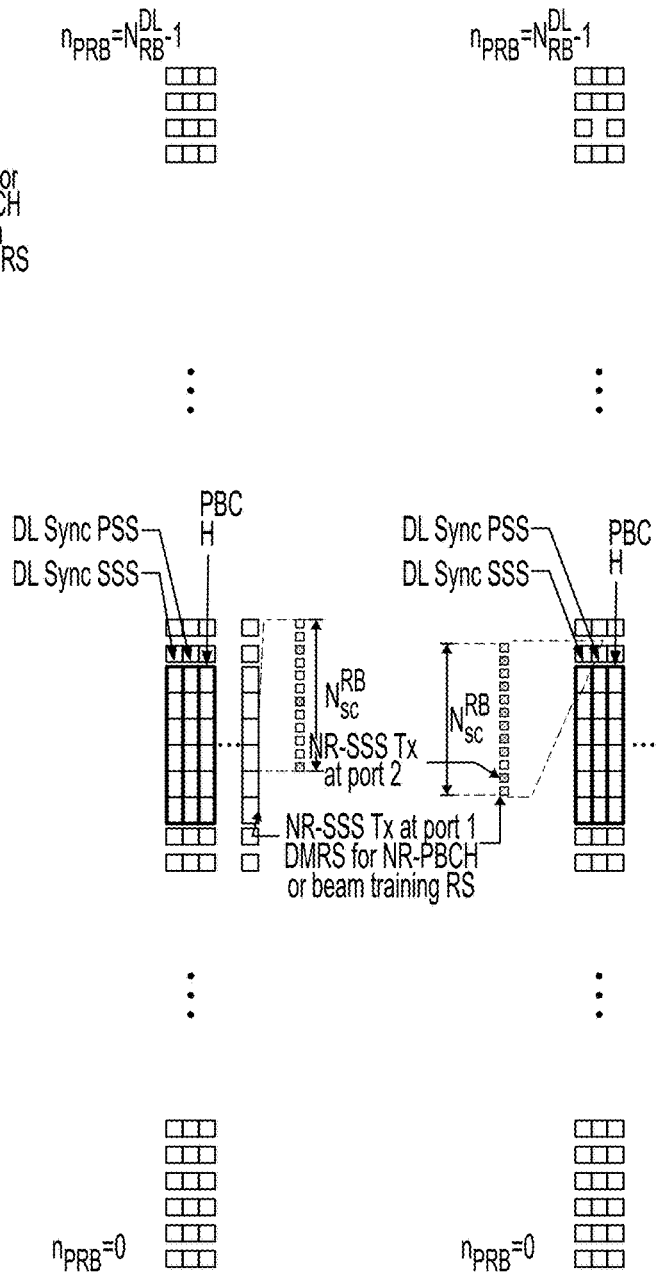
FIG. 26A    FIG. 26B    FIG. 26C

DOWNLINK SYNCHRONIZATION

PRIORITY TO RELATED APPLICATIONS

This application claims the benefit of priority of U.S. Provisional Application No. 62/325,323 filed on Apr. 20, 2016 entitled, "Downlink Synchronization for 5G Networks," U.S. Provisional Application No. 62/373,662 filed on Aug. 11, 2016, entitled "Beamforming Sweeping and Training in a Flexible Frame Structure for New Radio," U.S. Provisional Application No. 62/401,055 filed on Sep. 28, 2016, entitled "Methods for Dynamic Transmission Mode Switching and Initial Access in New Radio," and U.S. Provisional Application No. 62/417,162 filed on Nov. 3, 2016, entitled "Beam Based Mobility and Beam Management in NR," all of which are incorporated by reference in their entireties herein.

FIELD

The present application is directed to apparatuses and methods for downlink synchronization.

BACKGROUND

Downlink Synchronization (DL Sync) is important to 5G applications including, but not limited to, enhanced mobile broadband (eMBB), massive machine type communication (mMTC) and ultra-reliable/low latency (UR/LL). In particular, DL Sync is the provisioning mechanism for symbol, slot and subframe/frame timing for all 5G applications.

Propagation delays are dependent upon the deployment scenario. For example, the maximum propagation delay for outdoor deployment scenarios is 4.0 µs. Meanwhile, the maximum propagation delay for indoor deployment scenarios is about 0.4 µs. However, existing systems, such as 3GPP LTE/LTE-A cells, employ the same cyclic prefix duration regardless of the deployment scenario. Existing systems therefore are undesirable for handling diverse applications.

While 5G systems support various numerologies such as transmission time intervals (TTI)s and subcarrier spacing, protocols for supporting 5G user equipment (UE) to acquire DL symbols, frame timing and cell identification on a cell search stage are unavailable. Based upon current DL Sync designs, the 5G UE cannot blindly detect the supported numerologies.

Separately, the UE needs to perform neighboring cell measurements for cell reselection in a radio resource control (RRC)-idle or RRC-connected state. Reselection requires knowledge of the numerology of the neighbor cell DL sync signals. In 5G systems, however, different DL Sync signal numerology may be used at different cells. Methods are desired to improve neighboring cell measurement in 5G systems.

Applications such as eMBB, mMTC, and UR/LL exhibit different latency and power savings requirements. DL Sync signal design and cell search procedures are needed to support these requirements in 5G systems.

New radio (NR) Access Technology helps identify and develop technology components needed for systems operating at frequencies up to 100 GHz. For example, see 3GPP TR 38.913, Study on Scenarios and Requirements for Next Generation Access Technologies; (Release 14), V0.3.0, as well as RP-161214, Revision of SI: Study on NR Access Technology, NTT DOCOMO. To compensate for the increased path loss in these High Frequency NR (HF-NR) systems, beamforming is expected to be widely used. However, the existing initial access signal design such as DL synchronization, reference signal and PBCH design, which is based on omnidirectional or sector-based transmission, does not support the functions required for beamforming based access (e.g., beam sweeping, beam pairing, beam training, etc.).

Present network access procedures are based on omnidirectional transmission or sector-based transmission. For example, this may include cell search procedures and subsequent Physical Broadcast Channel (PBCH) acquisition. However, some functions for beamforming based access are not supported by existing omni-directional or sector-based transmission access procedures. One of these functions includes beamforming pair determination in idle state. Another function includes beamforming training feedback and beamforming training reference signal (BT-RS) transmission, e.g., whether to perform before, during or after RRC Connection setup. Yet another function includes the resources of uplink (UL) channel for beamforming (BF) training feedback in view of time and frequency. A further function includes beamforming based PBCH detection.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to a process and apparatus for DL Sync.

In one aspect of the application, an apparatus on a 5G network is disclosed. The apparatus includes a non-transitory memory including instructions stored thereon for performing configuration of an initial access signal in the 5G network. The apparatus also includes a processor, operably coupled to the non-transitory memory, capable of executing an instruction of monitoring transmission of a downlink sweeping subframe including a beam sweeping block carrying a downlink initial access signal. The processor is capable of also executing the instruction of detecting the downlink initial access signal carrying a synchronization channel. The processor is capable of also executing the instruction of determining, based on the synchronization channel, an identity of the beam sweeping block associated with the downlink initial access signal.

In another aspect of the application, an apparatus on a 5G network is described comprising a non-transitory memory including instructions stored thereon for assigning a principal numerology to a node synchronized with a cell in the 5G network. The apparatus also includes a processor that is operably coupled to the non-transitory memory. The processor is capable of performing the instructions of transmitting a master information block of the cell to the node. The processor is also capable of assigning the principal numerology to the node based upon criteria selected from network load, node location, network slicing configuration for the node, and combinations thereof.

According to yet another aspect, a DL initial access signal contains a DL synchronization channel (signals), a beam reference signal and a PBCH channel; a DL initial access signal which is carried by a DL beam sweeping block, each beam sweeping block containing either a single orthogonal frequency division multiplexing (OFDM) or multiple OFDM symbols; a DL beam sweeping subframe which contains multiple beam sweeping blocks; DL synchronization channels PSS and SSS which can be placed at different OFDM symbols; a beam sweeping block which contains only one DL synchronization channel; a beam reference signal and a PBCH which may co-exist in the same OFDM symbol or in different OFDM symbols; and a PBCH which has a different transmission period than the DL synchronization channel and beam reference signals. If the DL synchronization channel carries both the cell and beam ID, then the UE can detect which DL beam sweeping block is detected and is able to calculate the timing offset between the detected beam sweeping block to the DL sweeping subframe. If the DL synchronization channel only carries the cell ID, then the UE can detect the beam ID from the beam reference signal. Therefore, the UE can know which DL beam sweeping block is detected and is able to calculate the timing offset between the detected beam sweeping block to the DL sweeping subframe.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIGS. 21C(i)-(iii) illustrates a DL sweeping block with multiple OFDM symbols according to an embodiment of the application.

FIGS. 26A-C illustrate exemplary demodulation reference signals for NR-PBCH according to an embodiment of the application.

DETAILED DESCRIPTION OF THE ILLUSTRATIVE EMBODIMENTS

Figure 1:
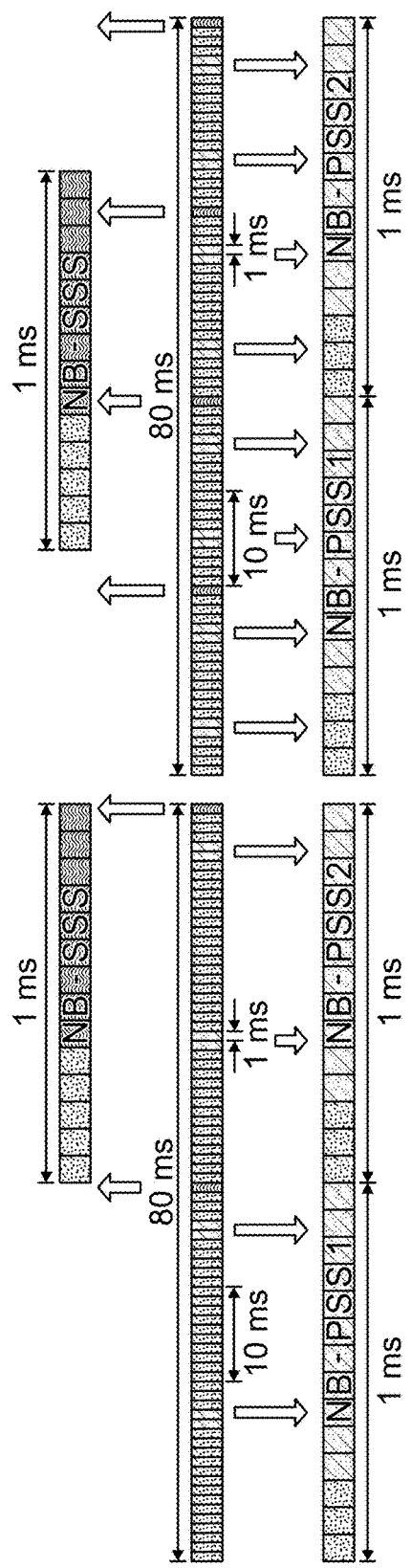
FIG. 1 illustrates a time domain location of narrow band primary synchronization signal and narrow band secondary synchronization signal transmission for narrow band IOT.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

Generally, the application is at least directed to mechanisms for efficient DL Sync of one or more numerologies in 5G systems. In one aspect, frequency resource allocation methods and systems are employed for 5G DL Sync. These mechanisms help support scalable subcarrier spacing. In an embodiment, a method is described whereby a DL sync channel employs the smallest subcarrier spacing supported by 5G cells. For example, if there are three 5G applications respectively supporting subcarrier spacings $\Delta f$, $2\Delta f$ and $4\Delta f$, the DL sync will use the smallest subcarrier spacing among $\Delta f = \min\{\Delta f, 2\Delta f, 4\Delta f\}$ for those applications.

In another embodiment, a method is described whereby the DL Sync supports cells with their own default subcarrier spacing. For instance, this may depend upon deployment scenarios, e.g., indoor vs. outdoor, small cell vs. pico cell, etc. As a result, the 5G UE should be able to blindly perform timing synchronization and acquisition based on subcarrier spacing for $y \times \Delta f$, $y \in 1, 2, \ldots, M$. According to the application, the scalable subcarrier spacing parameter y can be carried on either a primary synchronization signal (PSS) or a secondary synchronization signal (SSS). According to yet another embodiment, a scalable DL sync channel design is envisaged allowing 5G UE to perform blind timing and frequency acquisition regardless of the subcarrier spacing used for DL sync channel (e.g., PSS and/or SSS).

According to another aspect of the application, a method and architecture is provided for designing a DL sync channel using common denominator numerology. That is, a common denominator is supported across all the cells in the network. As a result, all other numerologies can be derived from the common denominator numerology. According to an embodiment, information of other supported system numerologies in the cell, e.g., subcarrier spacings, symbol duration and TTI length, may be broadcasted in the master information block (MIB) in a physical broadcast channel (PBCH). Upon successfully obtaining the DL timing and frequency, the UE will acquire the information of other supported system numerologies by decoding the PBCH (MIB). According to another embodiment, it is envisaged that the 5G system can employ the neighbor cell list to provide information of neighboring cells' DL Sync signals numerology to the UE.

According to even another aspect of the application, methods and architectures are envisaged whereby evolved node base stations can transmit DL sync signals with different periodicities. The periodicities may depend upon timing requirements. In yet even another aspect, 5G UE will perform appropriate detection procedures to process the DL sync signals received from eNBs having different periodicities to acquire its DL timing and frequency.

In one aspect of the application, an apparatus on a 5G network is described including a non-transitory memory including instructions stored thereon for performing downlink synchronization of a cell in the 5G network. The apparatus also includes a processor operably coupled to the non-transitory memory. The processor is capable of performing the instructions of performing a search for a cell in a 5G network. The processor is also capable of detecting a primary synchronization signal of the cell. The processor is also capable of identifying a secondary synchronization signal of the cell. The processor is also capable of synchronizing with the cell. Further the processor is capable of decoding a physical broadcast channel of the cell using sync numerology. In particular, the subcarrier spacing factor is obtained either from the detected primary synchronization signal or the detected second synchronization signal.

Yet another aspect of the application is directed to an apparatus on a 5G network comprising a non-transitory memory including instructions stored thereon for performing synchronization with a neighboring cell. The apparatus also includes a processor that is operably coupled to the non-transitory memory. The processor is capable of performing the instructions of providing the apparatus connected to a first cell. The processor is also capable of decoding a system information block of the first cell. The processor is also capable of determining the system information block includes sync numerology of the neighboring cell. The processor is also capable of performing primary and secondary synchronization signal detection of the neighboring cell. Further, the processor is capable of synchronizing with the neighboring cell.

Definitions/Acronyms

Provided below in TABLE 1 are definitions for terms and phrases commonly used in this application.

TABLE 1

| Acronym | Term or Phrase |
| --- | --- |
| API | Application Program Interface |
| AS | Access Stratum |
| BCCH | Broadcast Control Channel |
| PBCH | Physical Broadcast Control Channel |
| BCH | Broadcast Channel |
| BL | Bandwidth reduced Low complexity |
| CP | Cyclic Prefix |
| CMAS | Commercial Mobile Alert System |
| CN | Core Network |
| C-RNTI | Cell Radio-Network Temporary Identifier |
| CSG | Closed Subscriber Group |
| DL | Downlink |
| DL-SCH | Downlink Shared Channel |
| DRX | Discontinuous Reception |

TABLE 1-continued

| Acronym | Term or Phrase |
|---|---|
| E2E | End to End |
| eMBB | enhanced Mobile Broadband |
| ENB | Evolved Node B |
| E-UTRA | Evolved Universal Terrestrial Radio Access |
| E-UTRAN | Evolved Universal Terrestrial Radio Access Network |
| FFS | For Further Study |
| FFT | Fast Fourier Transform |
| FO | Frequency Offset |
| HD | High Definition |
| IE | Information element |
| IMT | International Mobile Telecommunications |
| KPI | Key Performance Indicators |
| LC-MTC | Low Cost or Low Complexity Machine-Type Communications |
| LTE | Long term Evolution |
| MCL | Maximum Coupling Loss |
| MBB | Mobile Broadband |
| MBSFN | Multicast-Broadcast Single-Frequency Network |
| MIB | Master Information Block |
| MTC | Machine-Type Communications |
| mMTC | massive Machine Type Communication |
| MVNO | Mobile Virtual Network Operator |
| NAS | Non-access Stratum |
| NB-PSS | Narrow-band primary synchronous sequence |
| NB-SSS | Narrow-band secondary synchronous sequence |
| NGMN | Next Generation Mobile Networks |
| PCI | Physical Cell Identity |
| PDCCH | Physical Downlink Control Channel |
| PHICH | Physical Hybrid-ARQ Indicator Channel |
| PHY | Physical Layer |
| PLMN | Public Land Mobile Network |
| PRACH | Physical Random Access Channel |
| PRB | Physical Resource Block |
| PSS | Primary Synchronization Signal |
| RAN | Radio Access Network |
| RAT | Radio Access Technology |
| RNTI | Radio Network Temporary Identifier |
| RRC | Radio Resource Control |
| SFN | System Frame Number |
| SI | System Information |
| SIB | System Information Block |
| SMARTER | Feasibility Study on New Services and Markets Technology |
| SR | Scheduling Request |
| SSS | Secondary Synchronization Signal |
| TAU | Tracking Area Update |
| TBS | Transport Block Size |
| TDD | Time Division Duplex |
| TM | Time Multiplexing |
| TTI | Transmission Time Interval |
| UE | User Equipment |
| UHD | Ultra-high definition |
| UL | Uplink |
| UR/LL | Ultra-Reliable - Low Latency |
| URLLC | Ultra-Reliable and Low Latency Communications |
| WLAN | Wireless Local Area Network |
| WPC | Wireless Planning Coordination |
| ZC | Zadoff-Chu |

Support of Shorter TTI in 3GPP Release 14

In the current 3GPP 4G/4.5G system, the resolution is to support shorter TTIs. The shorter TTI length is defined to be equal to multiple of OFDM symbols duration. Therefore, the generic formula of a shorter TTI in 3GPP Release 14 can be expressed as:

$$TTI_{4G}(x, z) = x\left(\frac{1}{\Delta f} + T_{CP}(z)\right) = x(66.67 + T_{CP}(z))\mu s,$$

where $x=1, 2, 3, 4, 7, 14$, $T_{CP}(z=1)=4.7$ μs for normal CP case and $T_{CP}(z=2)=16.67$ μs for extended CP case and subcarrier spacing $\Delta f=15$ KHz in 4G.

Cell Search for NB-IoT

The NB-IoT is a work item in 3GPP Release 13, and details of DL sync design for NB-IoT are still under discussion in 3GPP Release 14. The path forward for DL Sync signals in NB-IoT is that the narrow band PSS (NB-PSS) does not provide information of the cell identity as in LTE. NB-PSS provides time synchronization. It is used to estimate and compensate for frequency offsets (FO). NB-PSS is generated in the frequency domain and is spread across $N_{PSS}$ OFDM symbols in time. The NB-PSS is composed of Zadoff-Chu (ZC) sequences with length $N_{ZC}$ and root $u_i$, and each NB-PSS(n) can be expressed as:

$$NB\text{-}PSS(n) = e^{-\frac{j\pi u_i n(n+1)}{N_{ZC}}},$$

$n=0, 1, \ldots, N_{ZC}-1$, where $N_{ZC}$ is the sequence length and $N_{ZC}=11$. Each OFDM symbol carries a sequence corresponding to a unique root index. For $N_{PSS}$ ($N_{ZC}=11$) symbols are transmitted in a subframe for NB-PSS transmission, for each i-th symbol ($i=1, 2, \ldots, N_{PSS}$), its root index is $u_i$. The NB-PSS sequences for $N_{PSS}$ symbols are repeated every 10 ms in time. The time domain location of NB-PSS and NB-SSS transmission is illustrated in FIG. 1. For NB-SS, it is still under discussion in R14 and one of NB-SSS design method is based on ZC sequence masking with a scrambling sequence.

Neighbor Cell Search

When a UE performs measurements in order to facilitate cell reselection and handover, it may use system information to get information about neighbor cells. For example, in LTE, SIB-4 and SIB-5 provide information about the neighbor cells in the intra-frequency and inter-frequency bands. More information about SIB-4 is provided in TABLES 2, 3 and 4 below.

The IE SystemInformationBlockType4 contains neighboring cell related information relevant only for intra-frequency cell re-selection. The IE includes cells with specific re-selection parameters as well as blacklisted cells.

TABLE 2

```
-- ASN1START

SystemInformationBlockType4 ::=    SEQUENCE {
    intraFreqNeighCellList             IntraFreqNeighCellList   OPTIONAL,   -- Need OR
    intraFreqBlackCellList             IntraFreqBlackCellList                OPTIONAL,   --
                                                                                         Need OR
    csg-PhysCellIdRange                PhysCellIdRange          OPTIONAL,   -- Cond CSG
    ...,
    lateNonCriticalExtension           OCTET STRING             OPTIONAL
}

IntraFreqNeighCellList ::=         SEQUENCE (SIZE (1..maxCellIntra)) OF IntraFreqNeighCellInfo
```

TABLE 2-continued

```
IntraFreqNeighCellInfo ::=      SEQUENCE {
    physCellId                      PhysCellId,
    q-OffsetCell                    Q-OffsetRange,
    ...
}

IntraFreqBlackCellList ::=      SEQUENCE (SIZE (1..maxCellBlack)) OF PhysCellIdRange

-- ASN1STOP
```

TABLE 3

SystemInformationBlockType4 field descriptions csg-PhysCellIdRange

Set of physical cell identities reserved for CSG cells on the frequency on which this field was received. The received csg-PhysCellIdRange applies if less than 24 hours has elapsed since it was received and the UE is camped on a cell of the same primary PLMN where this field was received. The 3 hour validity restriction (section 5.2.1.3) does not apply to this field. The UE shall not apply any stored csg-PhysCellIdRange when it is in any cell selection state defined in TS 36.304.
intraFreqBlackCellList List of blacklisted intra-frequency neighbouring cells.
intraFreqNeighbCellList List of intra-frequency neighbouring cells with specific cell re-selection parameters.
q-OffsetCell Parameter "Qoffset$_{s,n}$" in TS 36.304.

TABLE 4

| Conditional Presence | Explanation |
| --- | --- |
| CSG | This field is optional, need OP, for non-CSG cells, and mandatory for CSG cells. |

SystemInformationBlockType5 (SIB-5)

The IE SystemInformationBlockType5 includes information relevant only for inter-frequency cell re-selection i.e., information about other E-UTRA frequencies and inter-frequency neighboring cells relevant for cell re-selection. The IE includes cell re-selection parameters common for a frequency as well as cell specific re-selection parameters. This is shown in TABLE 5 below.

TABLE 5

```
-- ASN1START

SystemInformationBlockType5 ::=         SEQUENCE {
    interFreqCarrierFreqList            InterFredCarrierFredList,
    ...,
    lateNonCriticalExtension            OCTET STRING   (CONTAINING
    SystemInformationBlockType5-v8h0-IEs)               OPTIONAL,
    [[ interFredCarrierFredList-v1250   InterFredCarrierFredList-v1250    OPTIONAL, --
    Need OR
       interFredCarrierFredListExt-r12  InterFredCarrierFredListExt-r12   OPTIONAL --
    Need OR
    ]],
    [[ interFredCarrierFredListExt-v1280  InterFredCarrierFredListExt-v1280 OPTIONAL -
    - Need OR
    ]],
    [[ interFredCarrierFredList-v13xy   InterFredCarrierFredList-v13xy    OPTIONAL, -
    - Need OR
       interFredCarrierFredListExt-v13xy InterFredCarrierFredListExt-v13xy OPTIONAL -
    - Need OR
    ]]
}

SystemInformationBlockType5-v8h0-IEs ::= SEQUENCE {
    EnterFreqCarrierFreqList-v8h0   SEQUENCE (SIZE (1..maxFreq)) OF InterFreqCarrierFreqInfo-
    v8h0            OPTIONAL,       -- Need OP
    nonCriticalExtension            SystemInformationBlockType5-v9e0-IEs
    OPTIONAL
}

SystemInformationBlockType5-v9e0-IEs ::= SEQUENCE {
    EnterFreqCarrierFreqList-v9e0   SEQUENCE (SIZE (1..maxFreq)) OF InterFreqCarrierFreqInfo-
    v9e0            OPTIONAL,       -- Need OR
    nonCriticalExtension            SystemInformationBlockType5-v10 0-IEs         OPTIONAL
}

SystemInformationBlockType5-v10O-IEs ::= SEQUENCE {
    EnterFreqCarrierFreqList-v10j0          SEQUENCE (SIZE (1..maxFreq)) OF InterFreqCarrierFreqInfo-
    v10J0           OPTIONAL,       -- Need OR
```

TABLE 5-continued

| | | | |
|---|---|---|---|
| • | nonCriticalExtension | SEQUENCE {} | OPTIONAL |
| • | } | | |
| • | InterFreqCarrierFreqList ::= | SEQUENCE (SIZE (1..maxFreq)) OF InterFreqCarrierFreqInfo | |
| • | InterFreqCarrierFreqList-v1250 ::=<br>InterFreqCarrierFreqInfo-v1250 | SEQUENCE (SIZE (1.. maxFreq)) OF | |
| • | InterFreqCarrierFreqListExt-r12 ::=<br>InterFreqCarrierFreqInfo-r12 | SEQUENCE (SIZE (1.. maxFreq)) OF | |
| • | InterFreqCarrierFreqListExt-v1280 ::=<br>InterFreqCarrierFreqInfo-v10j0 | SEQUENCE (SIZE (1.. maxFreq)) OF | |
| • | InterFreqCarrierFreqList-v13xy ::=<br>InterFreqCarrierFreqInfo-v13xy | SEQUENCE (SIZE (1.. maxFreq)) OF | |
| • | InterFreqCarrierFreqListExt-v13xy ::=<br>InterFreqCarrierFreqInfo-v13xy | SEQUENCE (SIZE (1.. maxFreq)) OF | |
| • | InterFreqCarrierFreqInfo ::= | SEQUENCE { | |
| • | dl-CarrierFreq | ARFCN-ValueEUTRA, | |
| • | q-RxLevMin | Q-RxLevMin, | |
| • | p-Max | P-Max | OPTIONAL, -- Need OP |
| • | t-ReselectionEUTRA | T-Reselection, | |
| • | t-ReselectionEUTRA-SF | SpeedStateScaleFactors | OPTIONAL, -- Need OP |
| • | threshX-High | ReselectionThreshold, | |
| • | threshX-Low | ReselectionThreshold, | |
| • | allowedMeasBandwidth | AllowedMeasBandwidth, | |
| • | presenceAntennaPort1 | PresenceAntennaPort1, | |
| • | cellReselectionPriority | CellReselectionPriority | OPTIONAL, -- Need OP |
| • | neighCellConfig | NeighCellConfig, | |
| • | q-OffsetFreq | Q-OffsetRange | DEFAULT dB0, |
| • | EnterFreqNeighCellList | InterFreqNeighCellList | OPTIONAL, -- Need OR |
| • | EnterFreqBlackCellList | InterFreqBlackCellList | OPTIONAL, -- Need OR |
| • | ..., | | |
| • | [[ | q-QualMin-r9 Q-QualMin-r9 | OPTIONAL, -- Need OP |
| • | threshX-Q-r9 | SEQUENCE { | |
| • | threshX-HighQ-r9 | ReselectionThresholdQ-r9, | |
| • | threshX-LowQ-r9 | ReselectionThresholdQ-r9 | |
| • | } | | OPTIONAL -- Cond RSRQ |
| • | ]], | | |
| • | [[ q-QualMinWB-r11 | Q-QualMin-r9 | OPTIONAL -- Cond WB-RSRQ |
| • | ]] | | |
| • | } | | |
| • | InterFreqCarrierFreqInfo-v8h0 ::= | SEQUENCE { | |
| • | multiBandInfoList | MultiBandInfoList | OPTIONAL -- Need OR |
| • | } | | |
| • | InterFreqCarrierFreqInfo-v9e0 ::= | SEQUENCE { | |
| • | dl-CarrierFreq-v9e0 | ARFCN-ValueEUTRA-v9e0 | OPTIONAL, -- Cond dl-FreqMax |
| • | multiBandInfoList-v9e0 | MultiBandInfoList-v9e0 | OPTIONAL -- Need OR |
| • | } | | |
| • | InterFreqCarrierFreqInfo-v10j0 ::= | SEQUENCE { | |
| • | freqBandInfo-r10 | NS-PmaxList-r10 | OPTIONAL, -- Need OR |
| • | multiBandInfoList-v10j0 | MultiBandInfoList-v10 0 | OPTIONAL -- Need OR |
| • | } | | |
| • | InterFreqCarrierFreqInfo-v1250 ::= | SEQUENCE { | |
| • | reducedMeasPerformance-r12 | ENUMERATED {true} | OPTIONAL, -- Need OP |
| • | q-QualMinRSRQ-OnAllSymbols-r12 | Q-QualMin-r9 | OPTIONAL -- Cond RSRQ2 |
| • | } | | |
| • | InterFreqCarrierFreqInfo-r12 ::= | SEQUENCE { | |
| • | dl-CarrierFreq-r12 | ARFCN-ValueEUTRA-r9, | |
| • | q-RxLevMin-r12 | Q-RxLevMin, | |

TABLE 5-continued

| | | | |
|---|---|---|---|
| • p-Max-r12 Need OP | P-Max | OPTIONAL, -- | |
| • t-ReselectionEUTRA-r12 | T-Reselection, | | |
| • t-ReselectionEUTRA-SF-r12 Need OP | SpeedStateScaleFactors | OPTIONAL, -- | |
| • threshX-High-r12 | ReselectionThreshold, | | |
| • threshX-Low-r12 | ReselectionThreshold, | | |
| • allowedMeasBandwidth-r12 | AllowedMeasBandwidth, | | |
| • presenceAntennaPort1-r12 | PresenceAntennaPort1, | | |
| • cellReselectionPriority-r12 Need OP | CellReselectionPriority | OPTIONAL, -- | |
| • neighCellConfig-r12 | NeighCellConfig, | | |
| • q-OffsetFreq-r12 | Q-OffsetRange | DEFAULT dB0, | |
| • interFreqNeighCellList-r12 Need OR | InterFreqNeighCellList | OPTIONAL, -- | |
| • interFreqBlackCellList-r12 Need OR | InterFreqBlackCellList | OPTIONAL, --- | |
| • q-QualMin-r12 Need OP | Q-QualMin-r9 | OPTIONAL, -- | |
| • threshX-Q-r12 | SEQUENCE { | | |
| • threshX-HighQ-r12 | ReselectionThresholdQ-r9, | | |
| • threshX-LowQ-r12 | ReselectionThresholdQ-r9 | | |
| • } RSRQ | | OPTIONAL, -- Cond | |
| • q-QualMinWB-r12 WB-RSRQ | Q-QualMin-r9 | OPTIONAL, -- Cond | |
| • multiBandInfoList-r12 OR | MultiBandInfoList-r11 | OPTIONAL, -- Need | |
| • reducedMeasPerformance-r12 OP | ENUMERATED {true} | OPTIONAL, -- Need | |
| • q-QualMinRSRQ-OnAllSymbols-r12 RSRQ2 | Q-QualMin-r9 | OPTIONAL, -- Cond | |
| • } | | | |
| • | | | |
| • InterFreqCarrierFreqInfo-v13xy ::= | SEQUENCE { | | |
| • cellReselectionSubPriority-r13 - Need OP | CellReselectionSubPriority-r13 | OPTIONAL, - | |
| • redistributionInterFreqInfo-r13 OP | RedistributionInterFreqInfo-r13 | OPTIONAL --Need | |
| • } | | | |
| • | | | |
| • InterFreqNeighCellList ::= InterFreqNeighCellInfo | SEQUENCE (SIZE (1..maxCellInter)) OF | | |
| • | | | |
| • InterFreqNeighCellInfo ::= | SEQUENCE { | | |
| • physCellId | PhysCellId, | | |
| • q-OffsetCell | Q-OffsetRange | | |
| • } | | | |
| • | | | |
| • InterFreqBlackCellList ::= | SEQUENCE (SIZE (1..maxCellBlack)) OF PhysCellIdRange | | |
| • | | | |
| • RedistributionInterFreqInfo-r13 ::= | SEQUENCE { | | |
| • redistributionFactorFreq-r13 | RedistributionFactor-r13 | OPTIONAL, --Need OP | |
| • redistributionNeighCellList-r13 -Need OP | RedistributionNeighCellList-r13 | OPTIONAL - | |
| • } | | | |
| • | | | |
| • RedistributionNeighCellList-r13 ::= RedistributionNeighCell-r13 | SEQUENCE (SIZE (1..maxCellInter)) OF | | |
| • | | | |
| • RedistributionNeighCell-r13 ::= | | | |
| • physCellId | SEQUENCE { | | |
| • redistributionFactorCell-r13 | PhysCellId, | | |
| • } | RedistributionFactor-r13 | | |
| • | | | |
| • RedistributionFactor-r13 ::= | INTEGER(1..10) | | |
| • | | | |
| • -- ASN1STOP | | | |

5G TTI

The 5G system needs to support a generalized scalable numerology and TTI, optimized multiple access for different use cases. Hence, the generalized scalable TTI in 5G can be expressed as three scalable parameters such as scalable symbol time factor x, scalable subcarrier spacing factor y and guard interval $T_{guard}(z)$ (this can be named as cyclic prefix for OFDM symbol waveform). Hence, the 5G TTI duration can be expressed in the following equation:

$$TTI_{5G}(x, y, z) = \frac{x}{\Delta f} = \frac{x}{y * \Delta f} = x\left(\frac{\frac{1}{\Delta f}}{y} + T_{guard}(z)\right) \mu s,$$

where x, y, z can be a positive integer and Δf is the minimum subcarrier spacing used in 5G. If we set the minimum subcarrier spacing Δf=7.5 kHz as an example, then the symbol interval is equal to $$\frac{1}{\Delta f} = 133.34 \ \mu s.$$

In 5G, the subcarrier spacing can be adaptive to diverse deployments, spread bandwidth and symbol duration. In addition, $T_{guard}(z)$ can be set to more than 2 distinct values than in current LTE systems to adapt diverse deployments or propagation delay. For instance, an exemplary set of PHY numerology for 5G use cases/applications is shown in TABLE 6 below.

TABLE 6

|  | 5G numerology case 1 | 5G numerology case 2 | 5G numerology case 3 |
| --- | --- | --- | --- |
| Subcarrier spacing | Δf = 15 KHz, with y = 1 | Δf = 30 KHz with y = 2 | Δf = 60 KHz with y = 4 |
| $T_{guard}(z)$ | $T_{guard}(z = 1) =$ 4.7 μs | $T_{guard}(z = 2) =$ 2.35 μs | $T_{guard}(z = 3) =$ 0.9 μs |
| Minimum TTI | 71.37 μs | 35.68 μs | 17.57 μs |

Figure 2A:
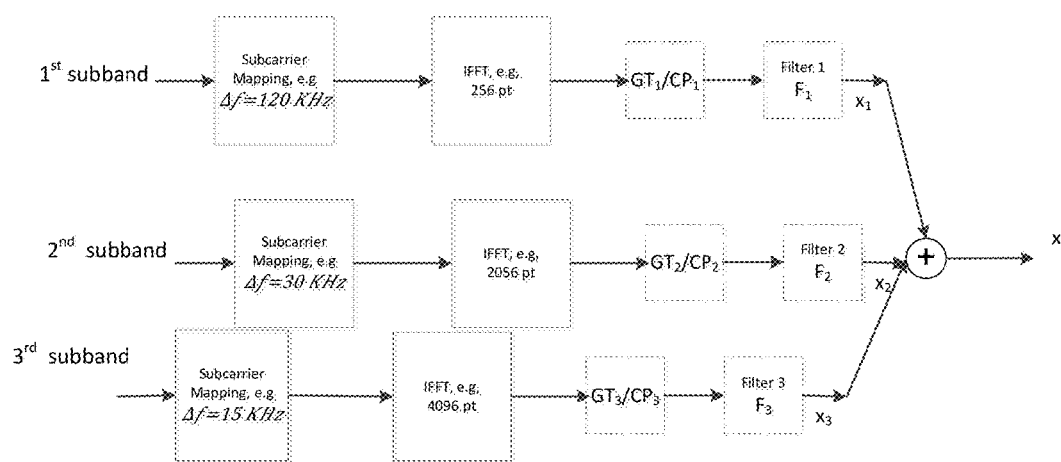
FIG. 2A illustrates an exemplary scalable transmission time interval in 5G.

An example of 5G transmitter(s) using various (scalable) numerologies such as FFT sizes, subcarrier spacings, CP sizes (or guard interval), pulse shaping filter and TTI length is depicted in FIG. 2A.

Figure 2B:
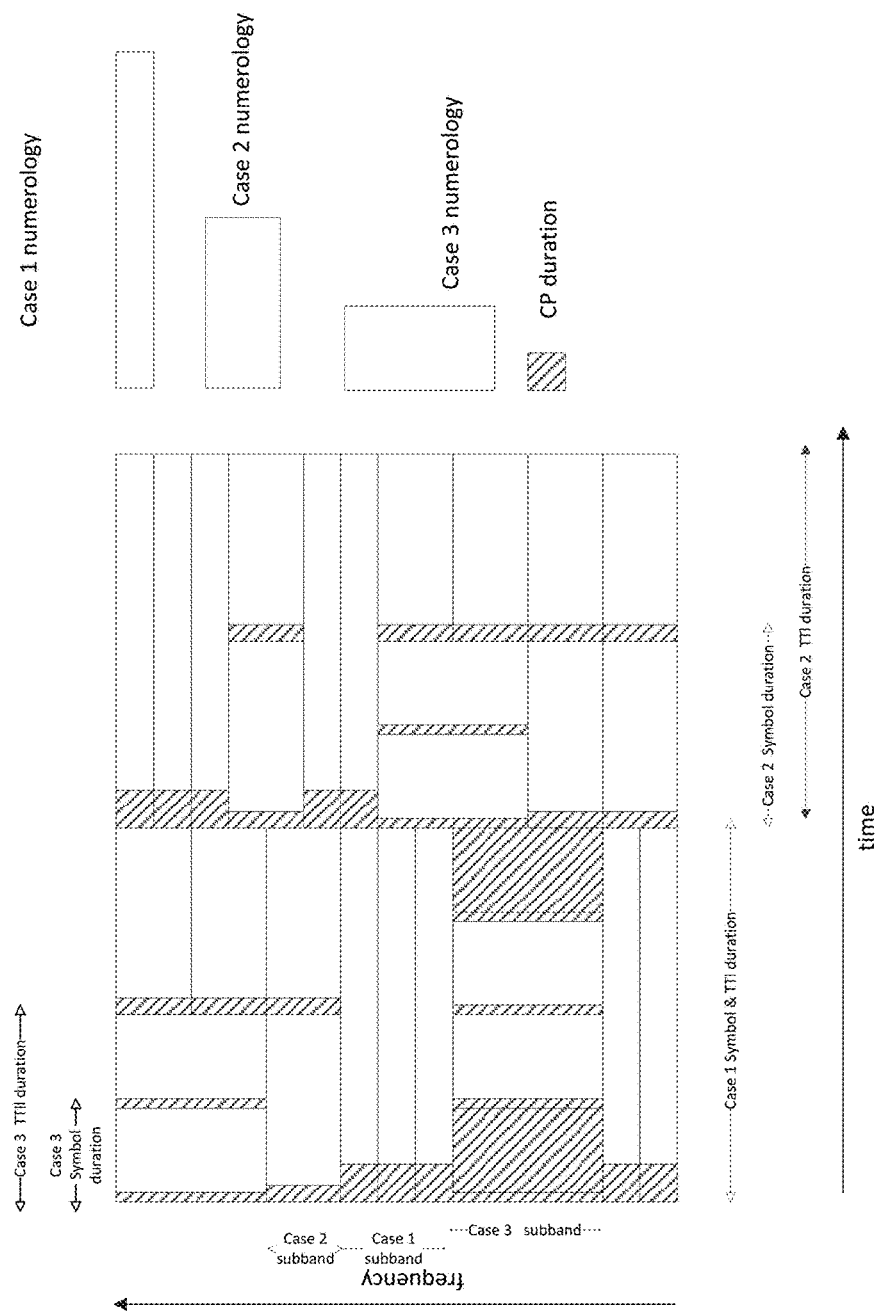
FIG. 2B illustrates multiple numerologies multiplexed in the time-frequency resource grid.

An example of 5G numerologies multiplexed in the time-frequency resource grid based on TABLE 2B above, and is illustrated in FIG. 2B. Specifically, there are 3 numerologies are multiplexing either in different sub bands or partial overlapped in frequency resource. In addition, 5G can allow different numerologies are multiplexing in time domain as well.

General Architecture

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 3A:
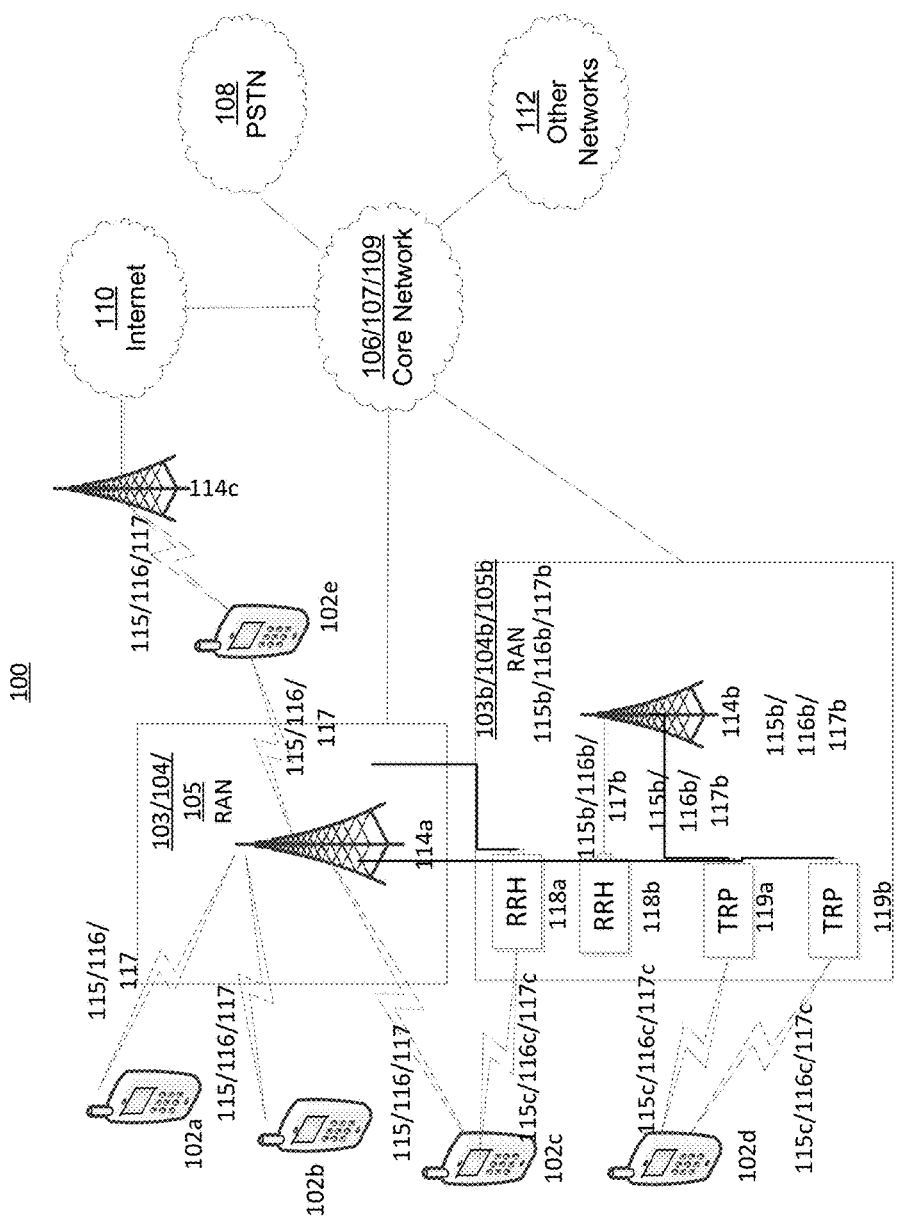
FIG. 3A illustrates an exemplary communications system according to an embodiment of the application.

FIG. 3A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 3A-E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 3A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet an embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 3A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over interne protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 3A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 3A may be configured to communicate with the base station 114a, which may employ a cellular-based radio technology, and with the base station 114c, which may employ an IEEE 802 radio technology.

Figure 3B:
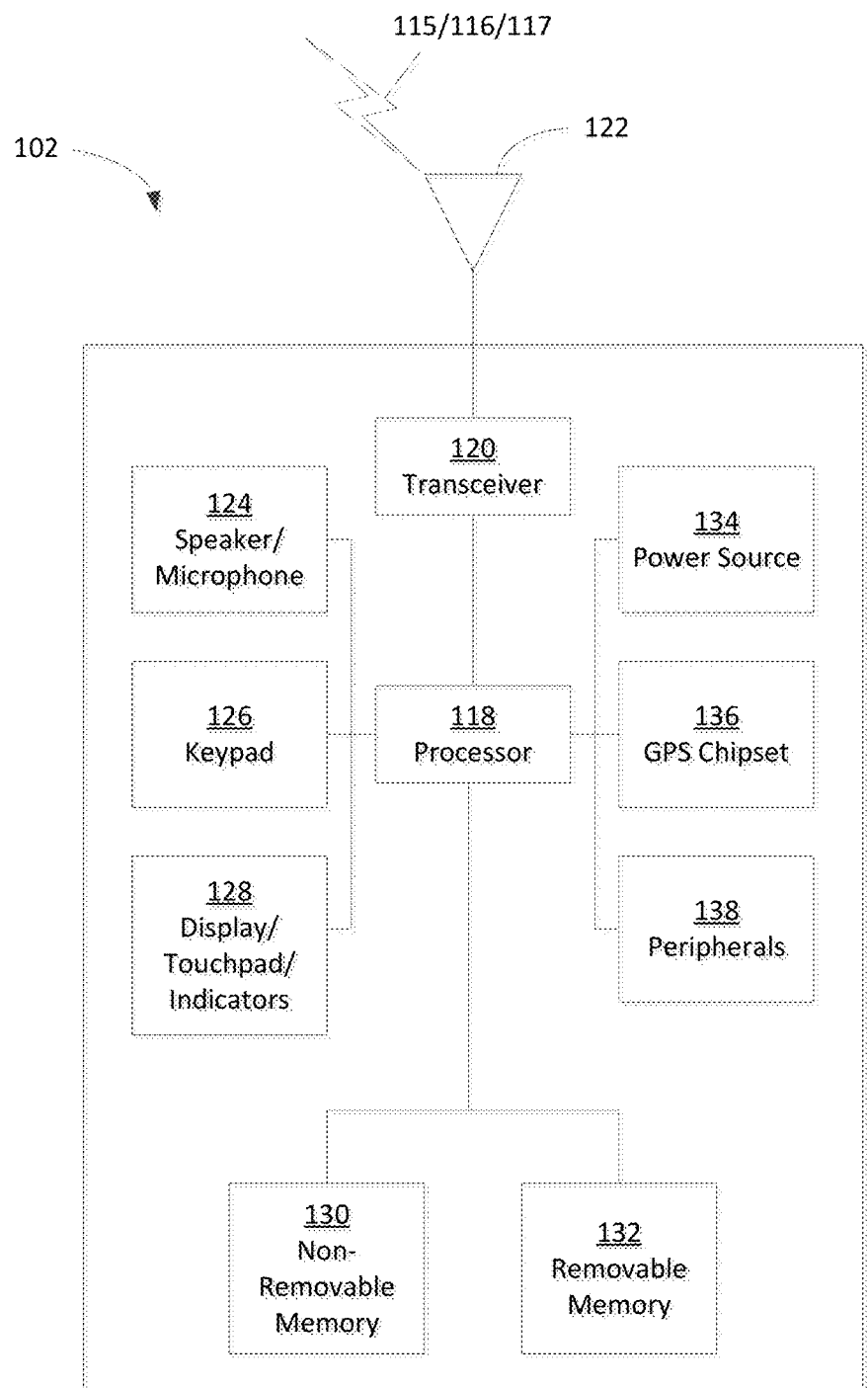
FIG. 3B illustrates an exemplary apparatus configured for wireless communication according to an embodiment of the application.

FIG. 3B is a block diagram of an example apparatus or device configured for wireless communications in accordance with the embodiments illustrated herein, such as for example, a WTRU 102. As shown in FIG. 3B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 3B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 3B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 3A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 3A may be configured to communicate with the base station 114a, which may employ a cellular-based radio technology, and with the base station 114b, which may employ an IEEE 802 radio technology.

FIG. 3B is a block diagram of an example apparatus or device configured for wireless communications in accordance with the embodiments illustrated herein, such as for example, a WTRU 102. As shown in FIG. 3B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 3B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 3B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 3B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 3C:
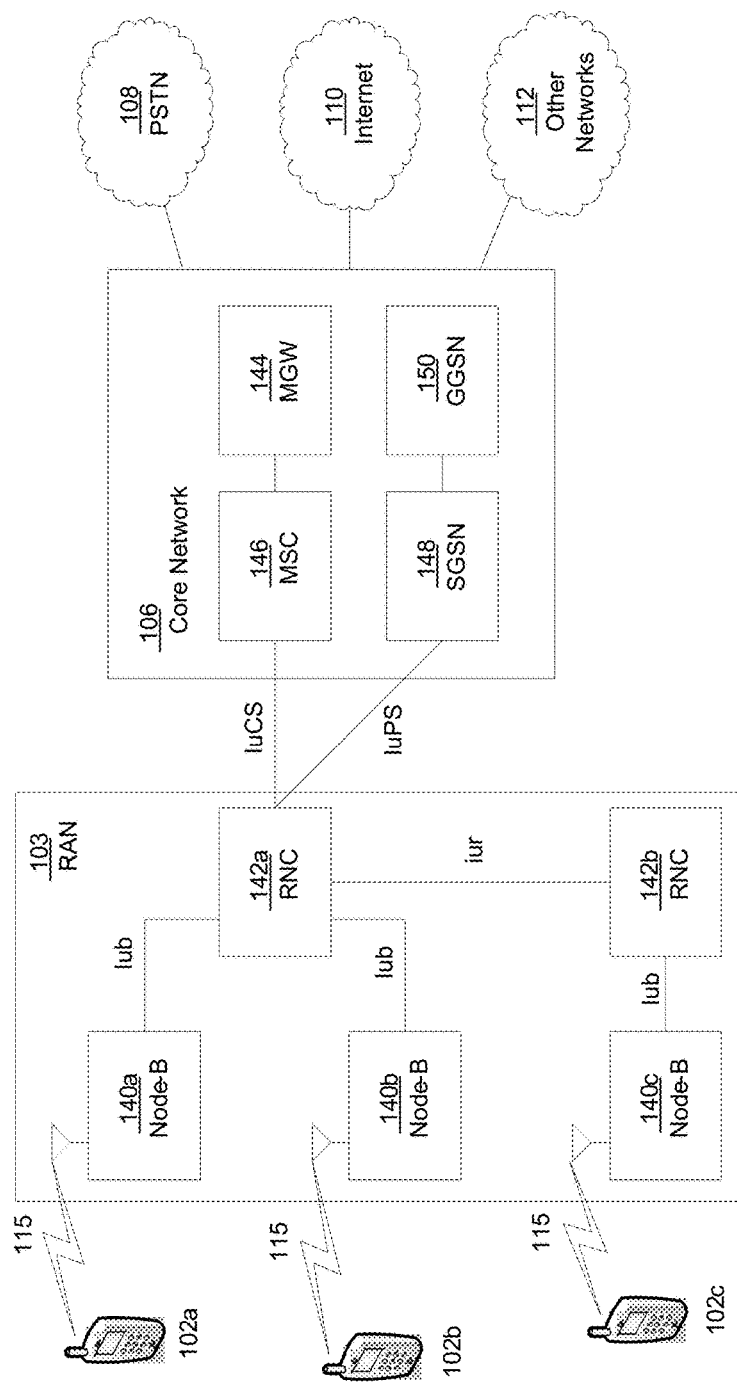
FIG. 3C illustrates a system diagram of a radio access network and a core network according to an embodiment of the application.

FIG. 3C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 3C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 3C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 3C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 3D:
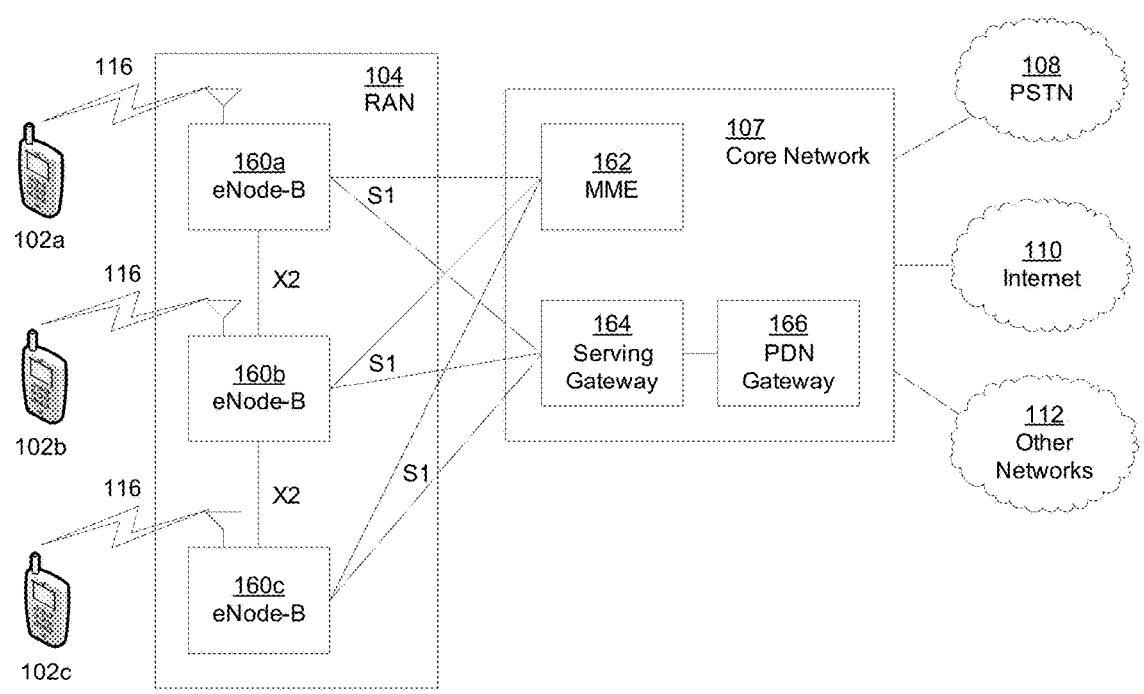
FIG. 3D illustrates a system diagram of a radio access network and a core network according to another embodiment of the application.

FIG. 3D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 3D, the eNode-Bs 160a, 160b, 160c may communicate with one another over an X2 interface.

The core network 107 shown in FIG. 3D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 3E:
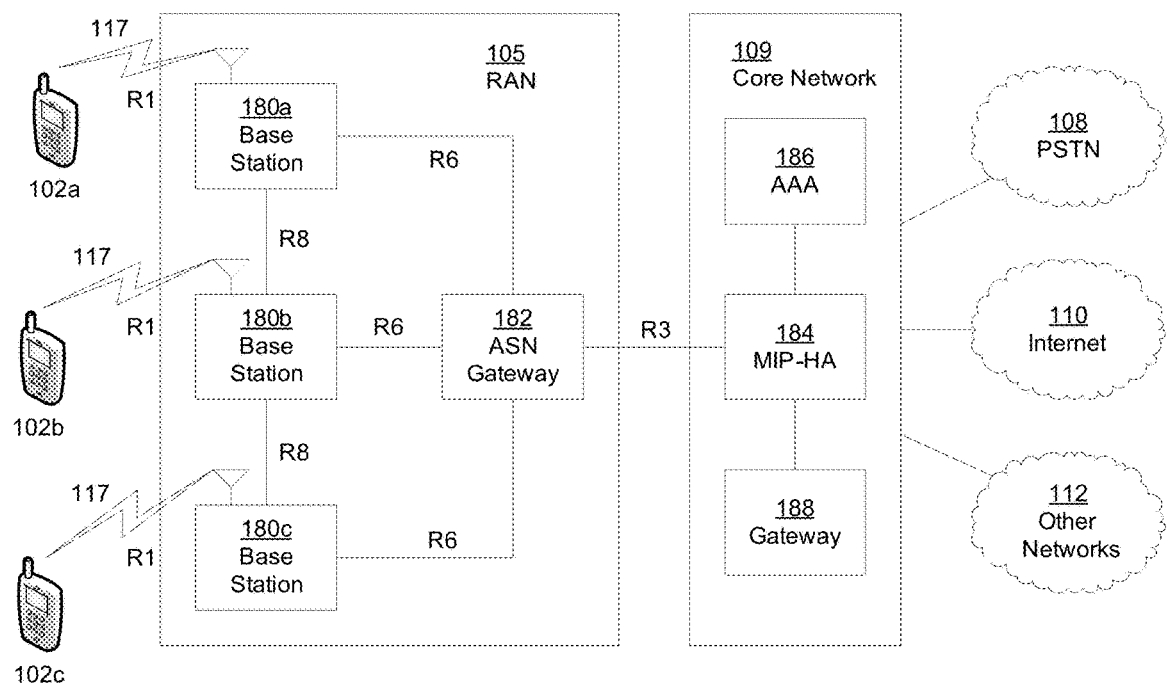
FIG. 3E illustrates a system diagram of a radio access network and a core network according to yet another embodiment of the application.

FIG. 3E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 3E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a,

180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, and 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, and 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 3E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, and 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 3E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 3A, 3C, 3D, and 3E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 3A, 3B, 3C, 3D, and 3E are provided by way of example only, and it is understood that the subject matter disclosed and claimed herein may be embodied or implemented in any similar communication system, whether presently defined or defined in the future.

Figure 3F:
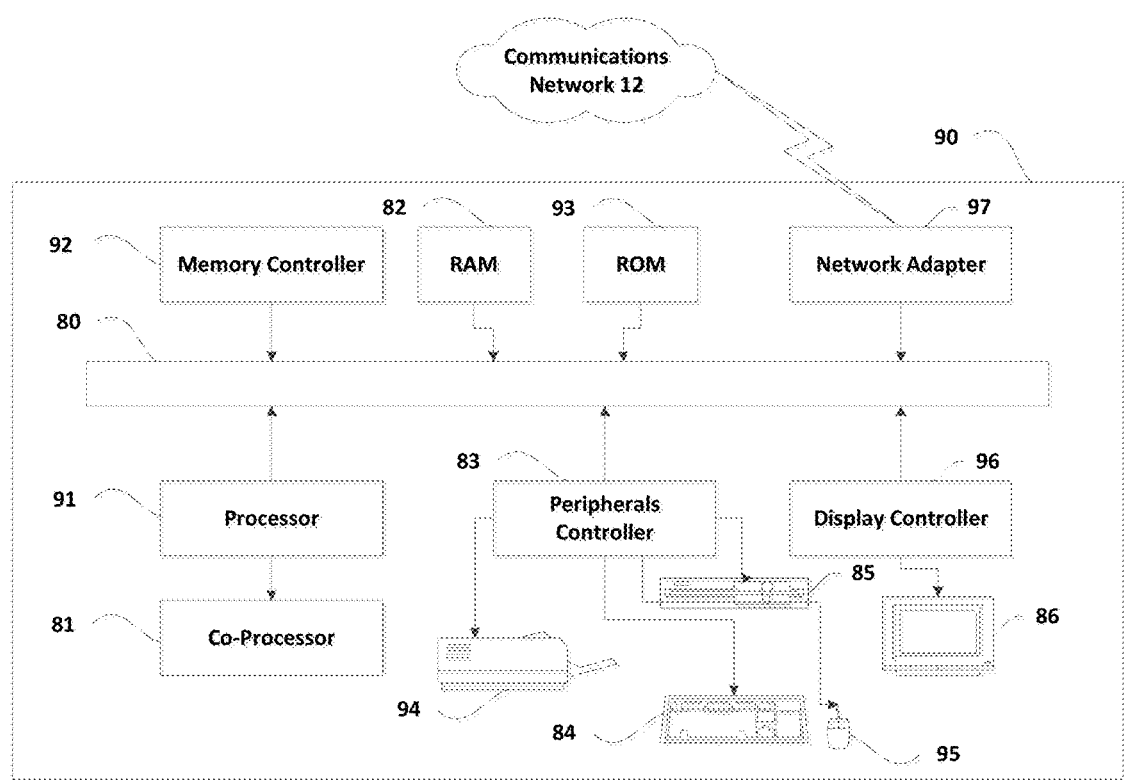
FIG. 3F illustrates a block diagram of an exemplary computing system in communication with one or more networks previously shown in FIGS. 3A, 3C, 3D and 3E according to an embodiment of the application.

FIG. 3F is a block diagram of an exemplary computing system 90 in which one or more apparatuses of the communications networks illustrated in FIGS. 3A, 3C, 3D and 3E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 3A, 4B, 3C, 3D, and 3E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

NR-SS Signal Design

According to an aspect of the application, a scalable DL Sync channel design is described. The design allows a 5G UE, such as shown in FIGS. 3A-E and described above, to perform blind timing and frequency acquisition regardless of the subcarrier spacing. This may be used for primary and/or secondary synchronization channels. It is envisaged in accordance with this application that the DL Sync design methods are able to support different numerologies. As a result, the 5G UE should be able to perform timing synchronization and acquisition for all 5G numerologies either based on a specific subcarrier spacing for y×Δf or a common DL Sync.

Figure 4A:
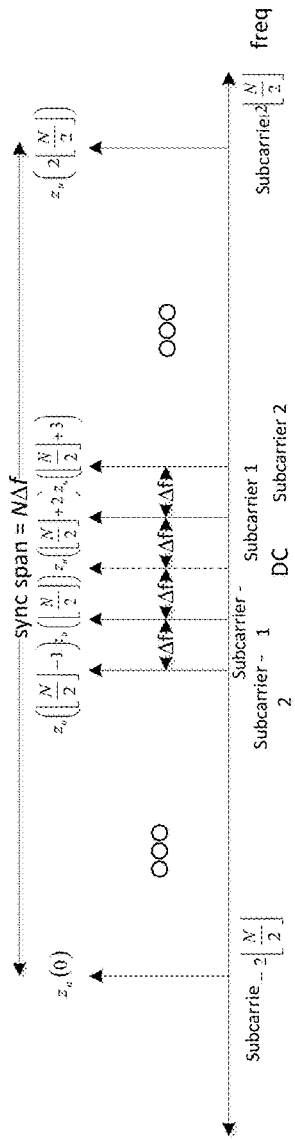
FIGS. 4A-B illustrate exemplary downlink sync sequence frequency allocations for different subcarrier spacings according to an embodiment of the application.

According to an embodiment, a DL sync protocol is provided to support minimum subcarrier spacing. In other words, if the particular 5G application supports various subcarrier spacings, e.g., Δf, 2Δf . . . MΔf, the DL sync will use the smallest subcarrier spacing. Preferably, the DL sync design is based on ZC sequences to carry the scalable spacing factor y. An exemplary sequence for PSS frequency allocation based on the smallest subcarrier spacing for a 5G application is illustrated in FIG. 4A.

Figure 4B:
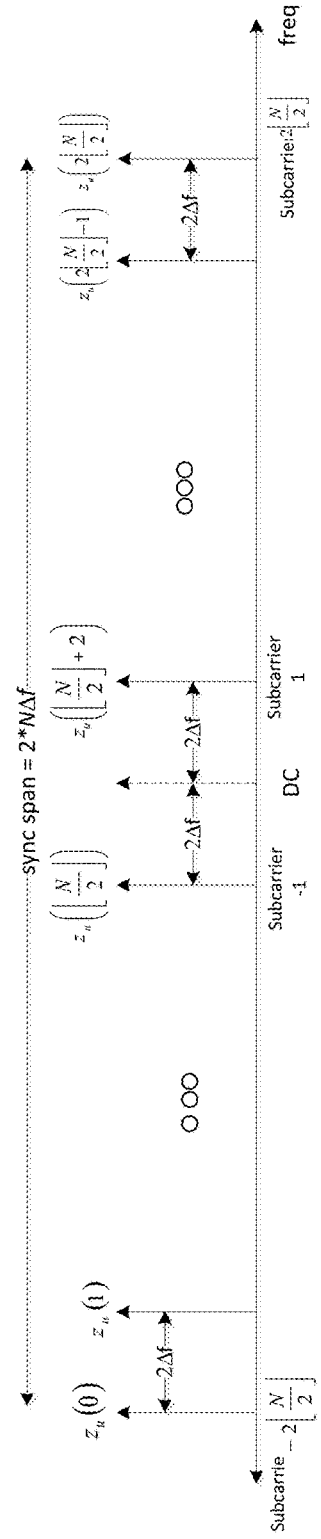

According to another embodiment, a DL Sync architecture is designed to support cells having their own default subcarrier spacing=y×Δf based upon the deployment, e.g., indoor/outdoor, small cell/pico cell, etc. Here, the scalable subcarrier spacing factor is y ∈ 1,2, . . . , M and Δf denotes the smallest subcarrier spacing supported in the 5G system. Accordingly, if a 5G system supports a specific subcarrier spacing with y×Δf and M being the maximum scalable subcarrier spacing factor, then the DL sync channel (PSS and SSS) spans N×y×Δf in frequency domain. N is the DL sync channel length. Preferably, the DL Sync design is based on ZC sequences to carry the scalable spacing factor y. An exemplary sequence for PSS frequency allocation based 2Δf subcarrier spacing for a 5G application is shown in FIG. 4B.

According to an embodiment, the scalable subcarrier spacing factor can be carried on the PSS signal. The PSS signal can use either BPSK, QPSK or a higher order modulation, such as quadrature amplitude modulation (QAM), to carry extra information for the scalable subcarrier spacing factor y. For example, the PSS signal can be generated as the following equation:

$$PSS(n) = de^{\frac{-j\pi un(n+1)}{N}},$$

$$n=0,1,\ldots,N-1, \quad (1)$$

where d is a BPSK, QPSK or QAM symbol. The amount of information is limited by the modulation order. For instance, if d ∈ QPSK, then the relationship mapping between d and y can be shown in TABLE 7 below:

TABLE 7

| Value of d | Value of y |
|---|---|
| 1 + j | 1 |
| −1 + j | 2 |
| −1 − j | 3 |
| 1 − j | 4 |

According to another embodiment, the scalable subcarrier spacing factor can be carried on the SSS. An exemplary design of a SSS sequence construction is given by $$SSS^{(p)}(n)=a_{u(p)}(yn)*b_y(n) \quad (2)$$

where $a_{u(p)}$, p={0,1} is an alternative form of a ZC sequence with root u(p), the scalable subcarrier spacing factor y and length N expressed as:

$$a_{u(p)}(n) = e^{\frac{-j\pi u(p)n(n+N)}{N}},$$

$$n=0,1,\ldots,N-1. \quad (3)$$

If a ZC sequence $a_{u(p)}(n)$ with an odd length N, and the root u(p) is co-prime with N, then the decimated sequence with factory of $a_{u(p)}(n)$, denoted as $a_{u(p)}(yn)$ is still a ZC sequence. The corresponding ZC sequence $a_{u(p)}(yn)$ will have the following property:

$$a_{u(p)}(yn) = z_{mod(u(p)y^2, N)}(n), \quad (4)$$

or the root of sequence has the following relationship:

$$v(p) = mod(u(p)y^2, N). \quad (5)$$

For example, if N=31, u(0)=23, and y=2 then the decimated sequence $a_{u(0)=23}(2n)$ becomes equivalent to a ZC sequence with root $v(0)=30=mod(23\times 2^2, N)$, i.e., $$a_{u(0)=23}(2n) = \{a_{u(0)=23}(0), a_{u(0)=23}(2), \ldots, a_{u(0)=23}(2(N-1))\} =$$
$$\{a_{v(0)=30}(0), a_{v(0)=30}(1), \ldots, a_{v(0)=30}(N-1)\} = a_{v(0)=30}(n),$$

The sequence $b_y(n)$ is the scrambling (or masking) sequence with length N composed of cyclic shifts of a base sequence b(n). The y is the indicator of a cyclic shift $\in 1, \ldots, M$. The primitive sequence b(n) can be chosen either from a m-sequence or a gold sequence. When a UE performs the SSS detection, the output will have the estimation of $v^{(0)}=u^{(0)}y^2$ and $v^{(1)}=u^{(1)}y^2$, respectively. In addition, the estimation of the y value can be obtained from the output of M correlators. This is due to the proposed $SSS^{(p)}(n)$ having a low cross-correlation for each different value of y. Therefore, the u(p) can be derived from (Eq 6). Finally, the synthesized $N_{ID}^{(1)}$ can be expressed as:

$$N_{ID}^{(1)} = Q(u(0), u(1)), \quad (6)$$

where $Q(\cdot)$ is an mapping function for $N_{ID}^{(1)}$.

Figure 5:
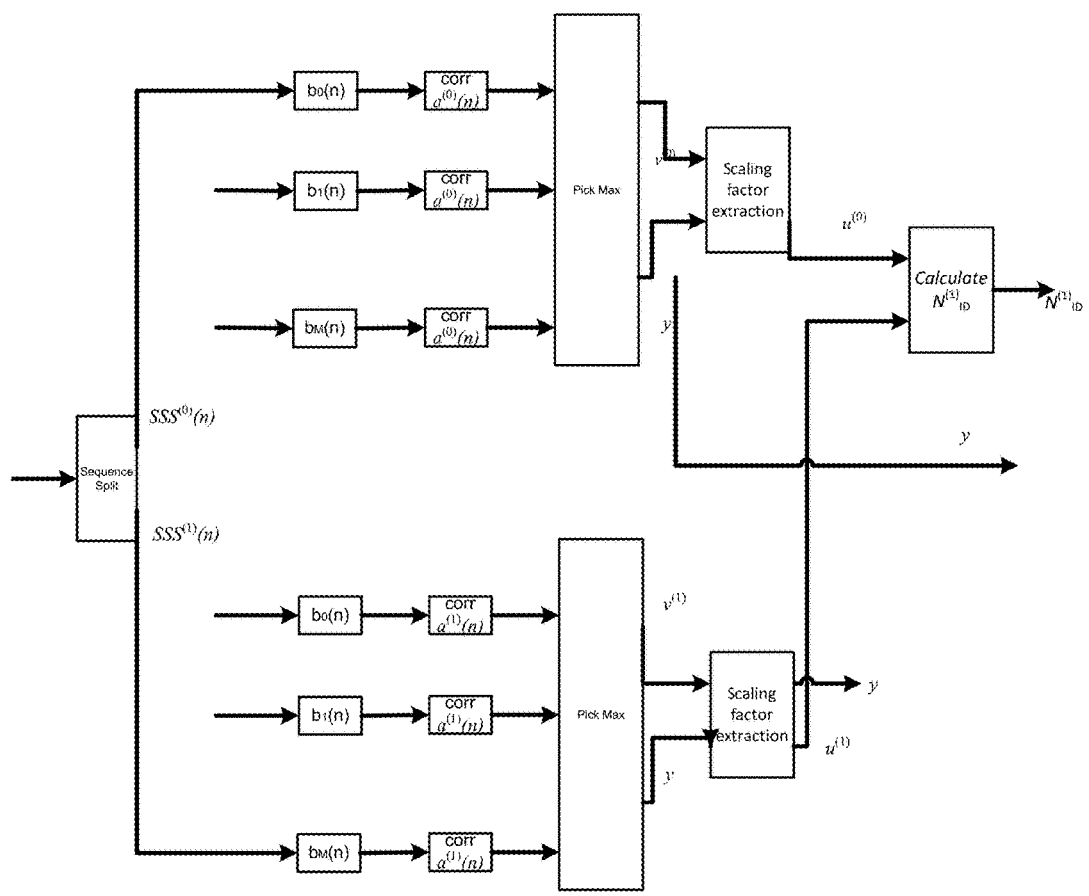
FIG. 5 illustrates an exemplary secondary synchronization signal detection function diagram according to an embodiment of the application.
Figure 6A:
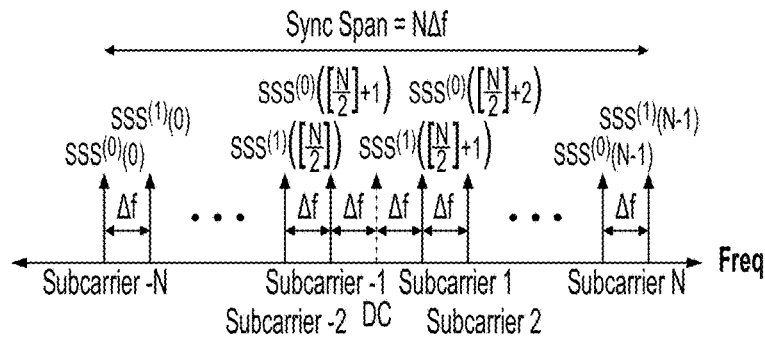
FIGS. 6A-D illustrate exemplary secondary synchronization signal downlink sync sequence frequency allocations according to an embodiment of the application.
Figure 6B:
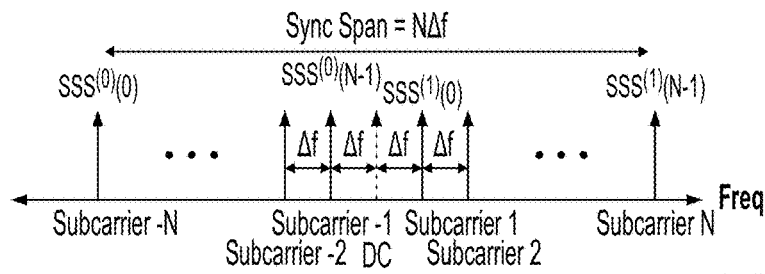
Figure 6C:
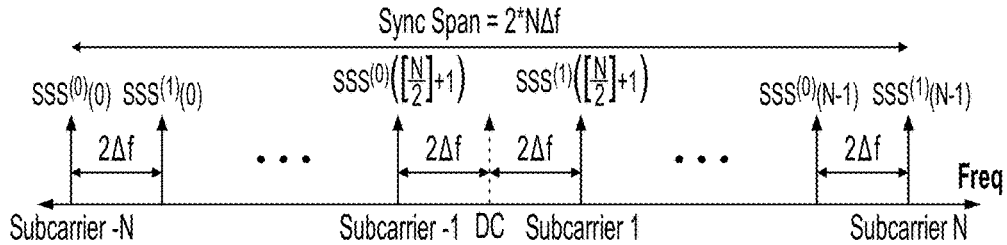
Figure 6D:
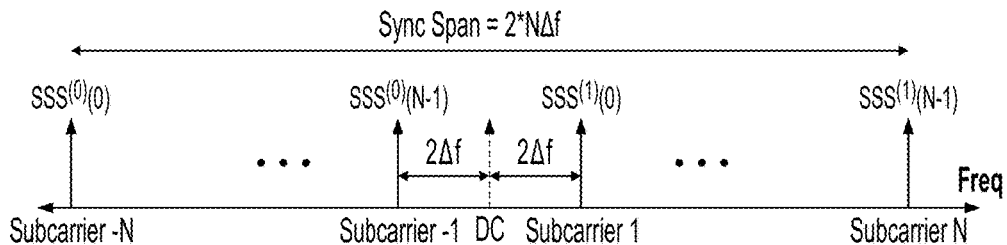

According to an exemplary embodiment, SSS detection function architecture is illustrated in FIG. 5. Here, the SSS resource mapping can be a block interleaver. Alternatively, the SSS resource mapping can be a subcarrier interleaver. In one embodiment, the SSS resource mapping can follow the above-mentioned techniques. In accordance with this embodiment, FIG. 6A illustrates a SSS DL sync sequence frequency allocation for 2Δf subcarrier spacing on a smallest subcarrier spacing with symbol interleaving. FIG. 6B illustrates a SSS DL sync sequence frequency allocation for 2Δf subcarrier spacing on the smallest subcarrier spacing with block interleaving. Moreover, FIG. 6C illustrates a SSS DL sync sequence frequency allocation for 2Δf subcarrier spacing with 2Δf subcarrier spacing with symbol interleaving. FIG. 6D illustrates a SSS DL sync sequence frequency allocation for 2Δf subcarrier spacing with 2Δf subcarrier spacing with block interleaving.

According to yet another embodiment, a UE synchronization procedure with a scalable subcarrier spacing factor is described. Here, the scalable subcarrier spacing factor is embedded either in the PSS or the SSS. In a first step, the UE performs primary synchronization signal detection. In a second step, the UE performs secondary synchronization signal detection. Then, the UE performs cell identification detection. This is following by confirmation. Lastly, the UE performs PBCH decoding.

Figure 7A:
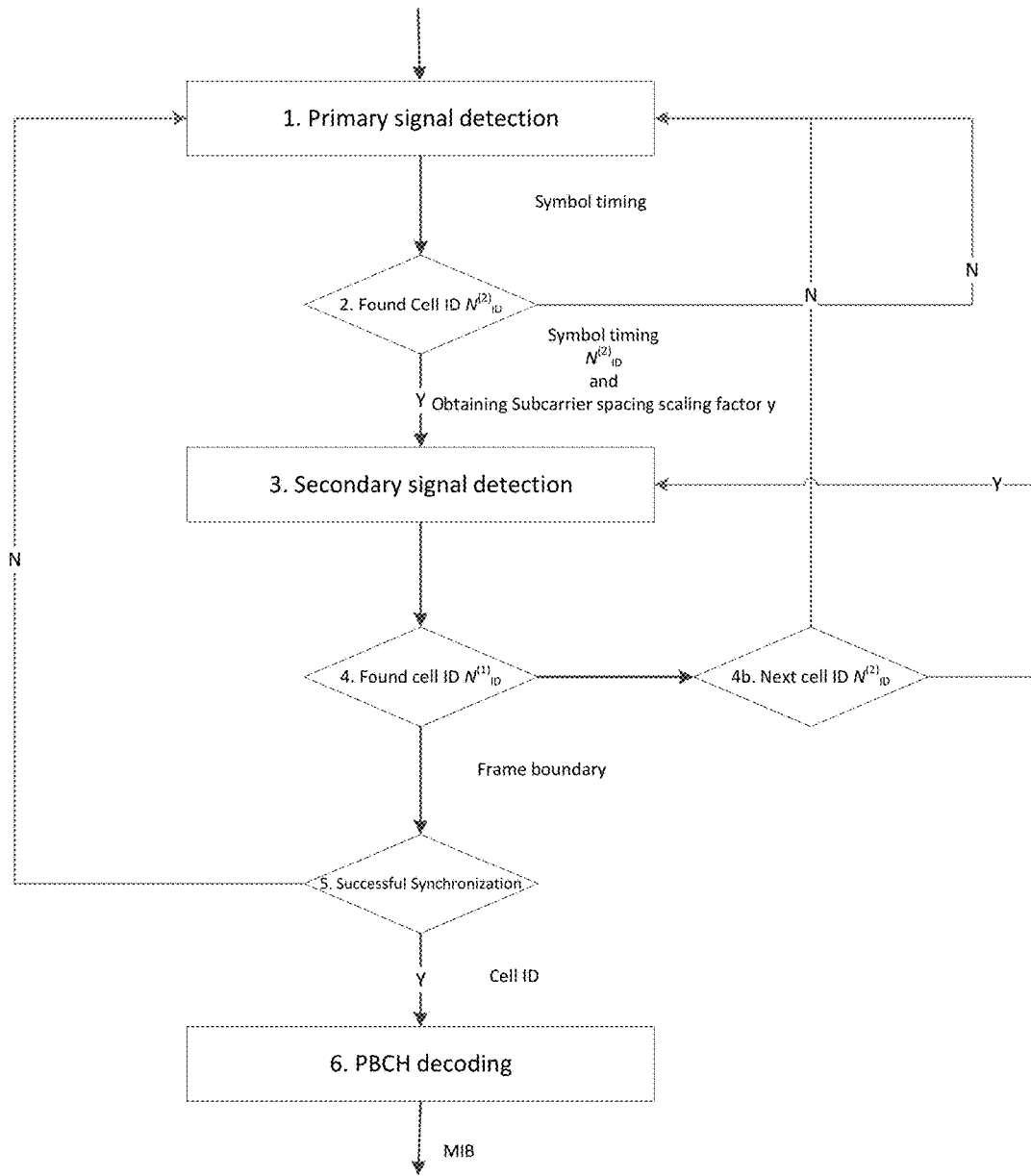
FIG. 7A illustrates an exemplary initial synchronization procedure in 5G supporting a scalable subcarrier spacing factor embedded in a primary synchronization signal according to an embodiment of the application.

According to an embodiment, as shown for example in FIG. 7A, the following protocols are followed if the scalable subcarrier spacing factory is carried on the PSS. Arabic numerals are recited for the steps. For instance, in the PSS detection stage (step 1), the UE cross-correlates a received PSS with Q possible PSS sequences. Here, Q is the maximum number of different PSS sequences that can be supported. The UE also chooses the strongest peak, associated with the largest correlation result, to obtain the corresponding $N_{ID}^{(2)}$ and its corresponding root sequence u (step 2). Next, the UE proceeds to obtain symbol d and derives the corresponding scalable subcarrier spacing factor y (step 2b). Thereafter, the UE obtains the symbol timing boundary acquired from the time position of the correlation peak. This is also the symbol timing boundary of SSS.

Next, in the SSS detection stage, the UE performs the step of cross-correlating a received signal with the P possible SSS sequences (step 3). P is the maximum number of different SSS sequences that can be supported. Next, the UE selects the strongest peak and obtains the corresponding $N_{ID}^{(1)}$ (step 4). If the UE cannot find reliable correlation results, the UE returns back to the cross-correlating step to detect the next $N_{ID}^{(2)}$ (step 4b). Otherwise, the UE calculates cell ID $N_{ID}^{cell}$ via $N_{ID}^{(1)}$ and $N_{ID}^{(2)}$ for synchronization (step 5). Then the UE moves on to physical broadcast channel (PBCH) decoding in step 6.

Figure 7B:
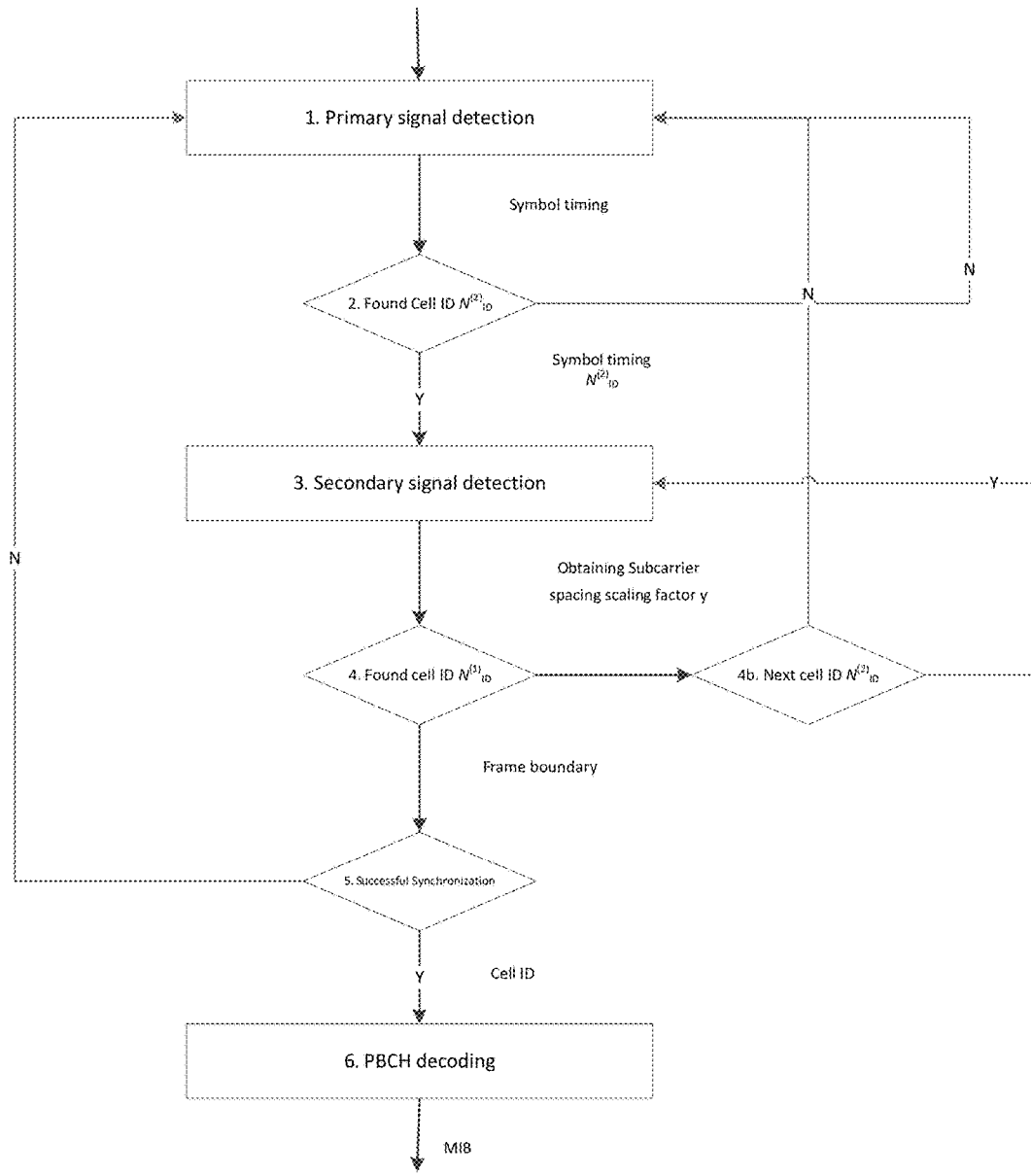
FIG. 7B illustrates an exemplary initial synchronization procedure in 5G supporting a scalable subcarrier spacing factor embedded in a secondary synchronization signal according to an embodiment of the application.

According to another embodiment, as shown in FIG. 7B for example, the scalable subcarrier spacing factor y may be derived via the SSS. The following protocols are employed in this scenario. Specifically, in the PSS detection stage, the UE may cross-correlate received signals with the Q possible PSS sequences (step 1). Q is the maximum number of PSS sequences that can be supported. Next, the UE selects the strongest peak and obtains the corresponding $N_{ID}^{(2)}$ with its root sequence u (step 2). Then, the waveform, e.g., OFDM, F-OFDM, symbol is obtained. The waveform symbol originates from the acquired time position of the correlation peak. This also provides the timing boundary of SSS.

Next, in the SSS detection stage, the UE performs the step of cross-correlating a received signal with the P possible SSS sequences (step 3). P is the maximum number of different SSS sequences that can be supported. Next, the UE selects the strongest peak and obtains the corresponding root sequence v. The corresponding scalable subcarrier spacing factor y is also derived (prior to step 4). After obtaining the root v and the scalable subcarrier spacing factor y, the root u is obtained (via equation (6)) to calculate the corresponding $N_{ID}^{(1)}$ value (step 4). If the UE cannot find reliable correlation results, the UE returns back to the previously described cross-correlating step to detect the next $N_{ID}^{(2)}$ (step 4b). Otherwise, the UE calculates cell ID $N_{ID}^{cell}$ via $N_{ID}^{(1)}$ and $N_{ID}^{(2)}$ for synchronization (step 5). Then the UE moves on to PBCH decoding in step 6.

Enlarging DL Synchronization Channel Preamble Identification

Figure 8:
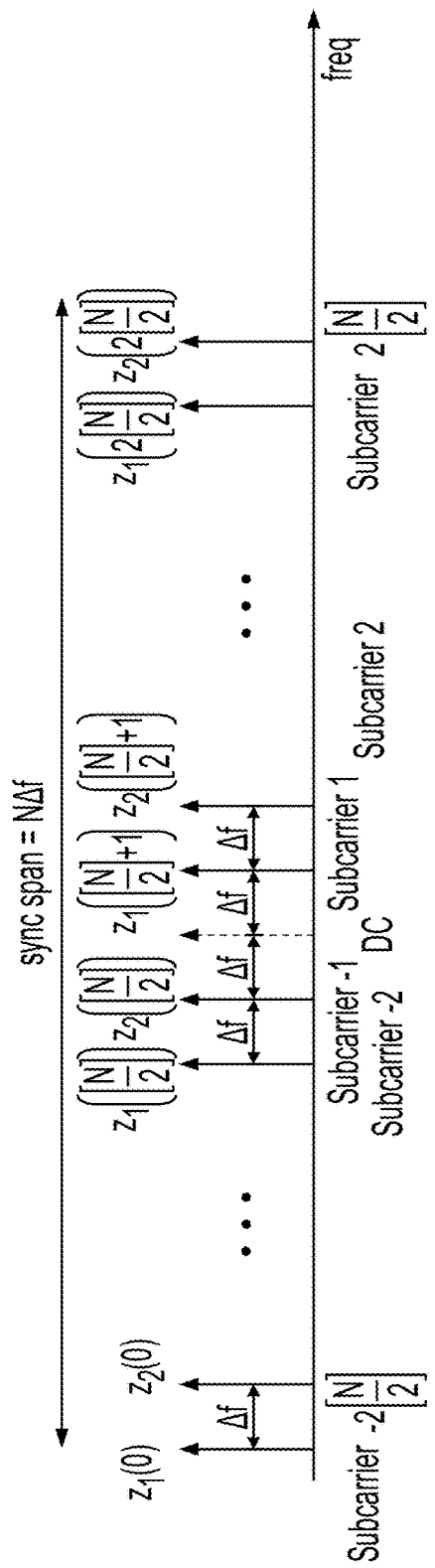
FIG. 8 illustrates exemplary CAZAC sequences according to an embodiment of the application.

A DL synchronization preamble design is proposed to enlarge the preamble ID design for the purpose of carrying more preamble identification. The DL synchronization channel signal can use two combinations of CAZAC or ZC sequences. Those two CAZAC sequences can be a subcarrier interleave or a block interleave. FIG. 8 shows two CAZAC sequences as subcarrier interleave in FD.

According to an aspect of the application, solutions are described to improve and provide beamforming based initial access for NR systems. In another aspect, beamforming training in RRC_Connected states are described, In yet another aspect, flexible frame structures designed for NR systems are described.

In an embodiment, an apparatus on a network is described including a non-transitory memory with instructions stored thereon for beamforming training in the network. The apparatus also includes a processor, operably coupled to the non-transitory memory, capable of executing the instructions of (i) receiving, from a node, a beamformed training reference signal; (ii) determining a number of beams in the beamformed training reference signal; (iii) selecting a beam from the number of beams; (iv) calculating a symbol timing, subframe and frame timing of the selected beam; and (v) decoding a beam identification for the selected beam.

In an aspect, the processor is further capable of executing the instructions of decoding a physical broadcast channel associated with the beam identification. In another aspect, the processor is further capable of executing the instructions of transmitting a beam identification feedback employing uplink transmission beamforming to a new radio node. In yet another aspect, the processor is further capable of executing the instructions of receiving a beam acquisition acknowledgement from the new radio node. In yet even another aspect, the processor is further capable of executing the instructions of decoding a physical broadcast channel associated with the beam identification.

It is envisaged in an embodiment, that the BF sweeping and BF training may be conducted at NR-node, Transmission and Reception Point (TRP) or Remote Radio Head (RRH). As a result, the NR-node, TRP and RRH may be interchangeable. Moreover, the time interval containing DL and/or UL transmissions are flexible for different numerologies and RAN slices may be statically or semi-statically configured. Such time intervals are referred to as Subframes.

Beamforming Based Initial Access

In an embodiment, the NR-node can transmit periodic beamformed training reference signal (BT-RS) to UEs to perform initial access. The periodical BT-RS can be served for two major functions for UE during the initial access stage.

Figure 9:
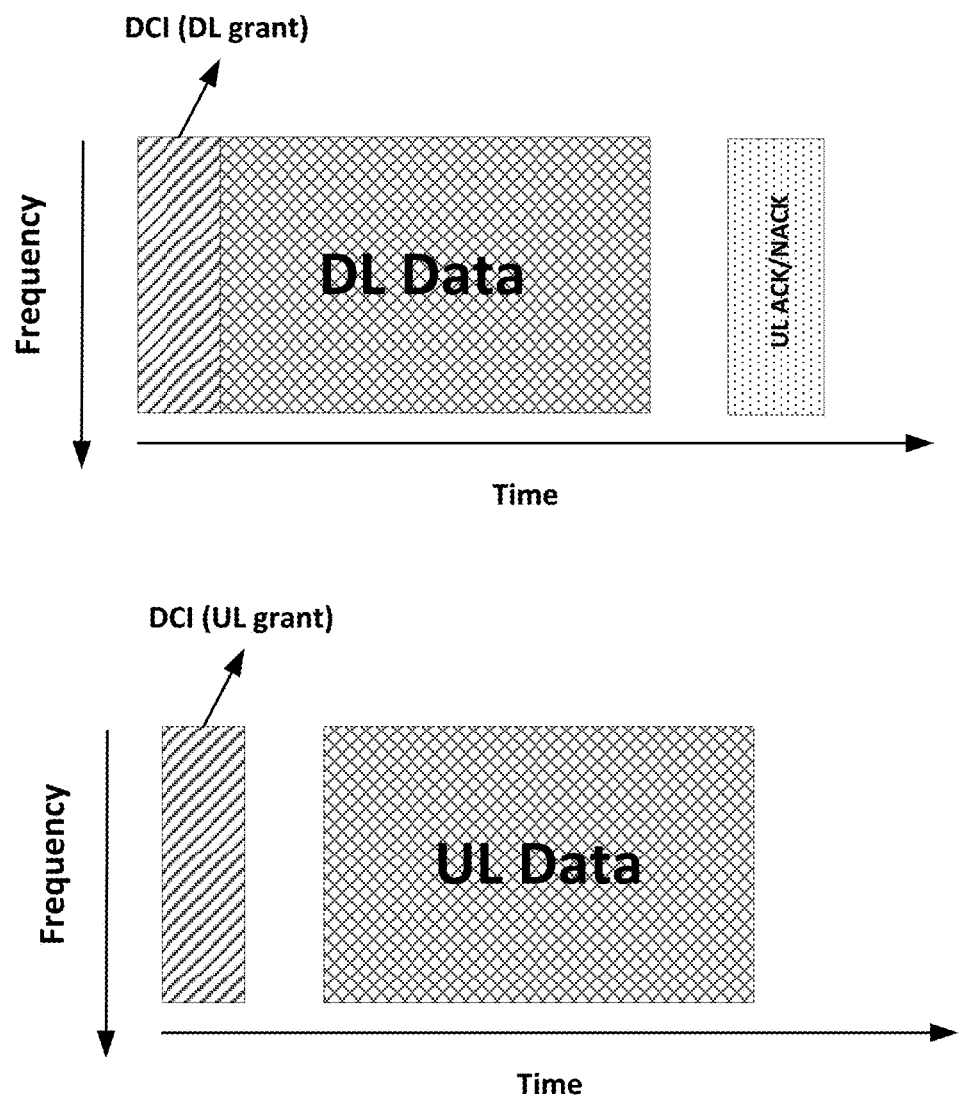
FIG. 9 illustrates a flexible frame structure in new radio according to an embodiment of the application.
Figure 10A:
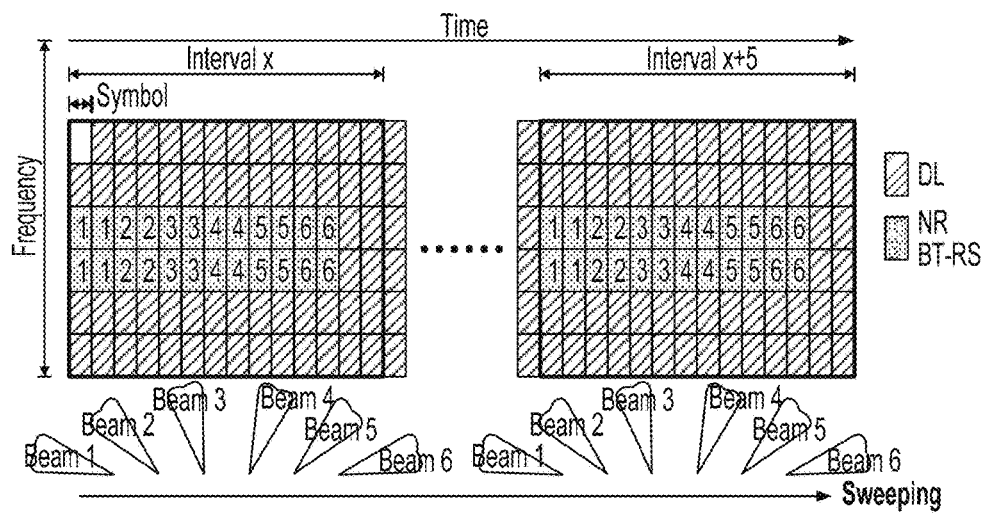
FIGS. 10A-C illustrate beam sweeping techniques according to an embodiment of the application according to an embodiment of the application.
Figure 10B:
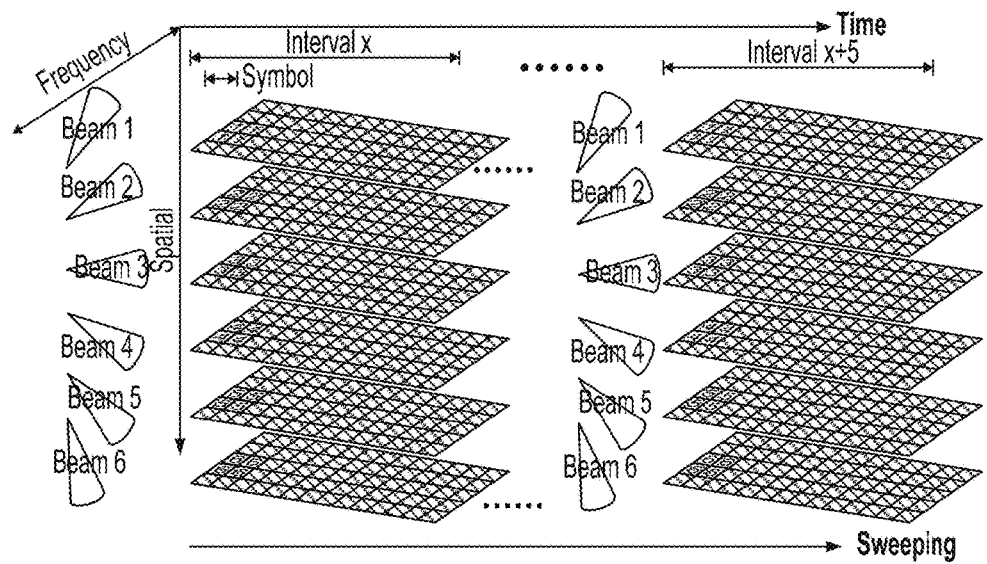

One of these functions includes DL timing-frequency synchronization and PBCH demodulation. The BT-RS is transmitted via sweeping through N (wide) beams at each periodical initial access DL transmission interval. If each beam initial access DL transmission duration is set to Q OFDM symbols and K beams conducts DL beam sweeping simultaneously at each beam transmission duration, then the total transmission duration for all N beams is equal to $$\left\lceil \frac{N}{K} \right\rceil \times Q \; OFDM$$

symbols. The BT-RS can occupy L sub-bands in the frequency domain. All numerologies or slice subbands can share the same BT-RS subbands, or each Numerology or slice subband has its own BT-RS subbands. An example of total N=6 beams is setup for initial access shown in FIG. 9. If BR-RS is only configured for single beam transmission at each beam transmission duration, i.e., K=1, then each beam transmission duration is set to Q=2 symbols. The periodicity P of BT-RS is set to 5 time interval x, as an example in the illustration. Hence, the total BT-RS transmission duration is equal to $$\left\lceil \frac{6}{1} \right\rceil \times 2 = 12 \; OFDM$$

symbols per time interval that carries BT-RS. The sequential beam seeping is shown in FIG. 10A. Parallel sweeping is shown in FIG. 10B with the total BT-RS transmission duration is equal to $$\left\lceil \frac{6}{6} \right\rceil \times 2 = 2$$

symbols. Hybrid sweeping is shown in FIG. 10C with the total BT-RS transmission duration is equal to $$\left\lceil \frac{6}{3} \right\rceil \times 2 = 6$$

symbols.

Figure 10C:
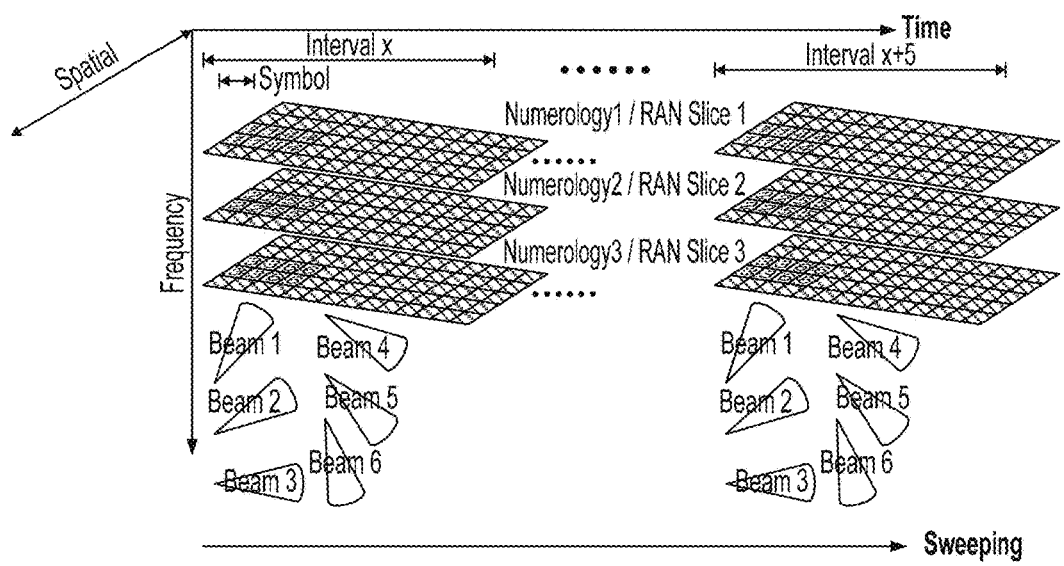

The periodicity of BT-RS transmission P, number of symbol duration for beam transmission duration Q, simultaneous number of beams transmission K can be independently configured to each support multiple numerologies or RAN slice in a NR system, as shown in FIG. 10C numerology or 3 RAN slice sub-bands contain their own BT-RS individually in frequency.

There are two possible options for the BT-RS configuration. One option is where each supported numerology or RAN slice has its own BT-RS setup/configuration. Another option is where multiple numerologies or RAN slices share the same BT-RS setup/configuration.

In the following examples, we assume 2 different numerologies are supported in a NR system. Without losing generality, we assume one numerology (numerology 1) has a wider subcarrier spacing than the other (numerology 2). Hence, numerology 1 has shorter symbol time than numerology 2. In this example shown in FIG. 11, it assumes broadcast with $N_1=5$, $K_1=1$ and $Q_1=1$ for numerology 1 and $N_2=3$, $K_2=1$ and $Q_2=2$ for numerology 2. The periodicity of numerology 1 BT-RS is set to 2 subframes (i.e. P=2) and the periodicity of numerology 2 BT-RS is set to 5 subframes (i.e., P=5) in this example. Different numerology can also share a same BT-RS setup for initial access, i.e., UE only need to detect a shared BT-RS setup for all supported numerologies.

Figure 11:
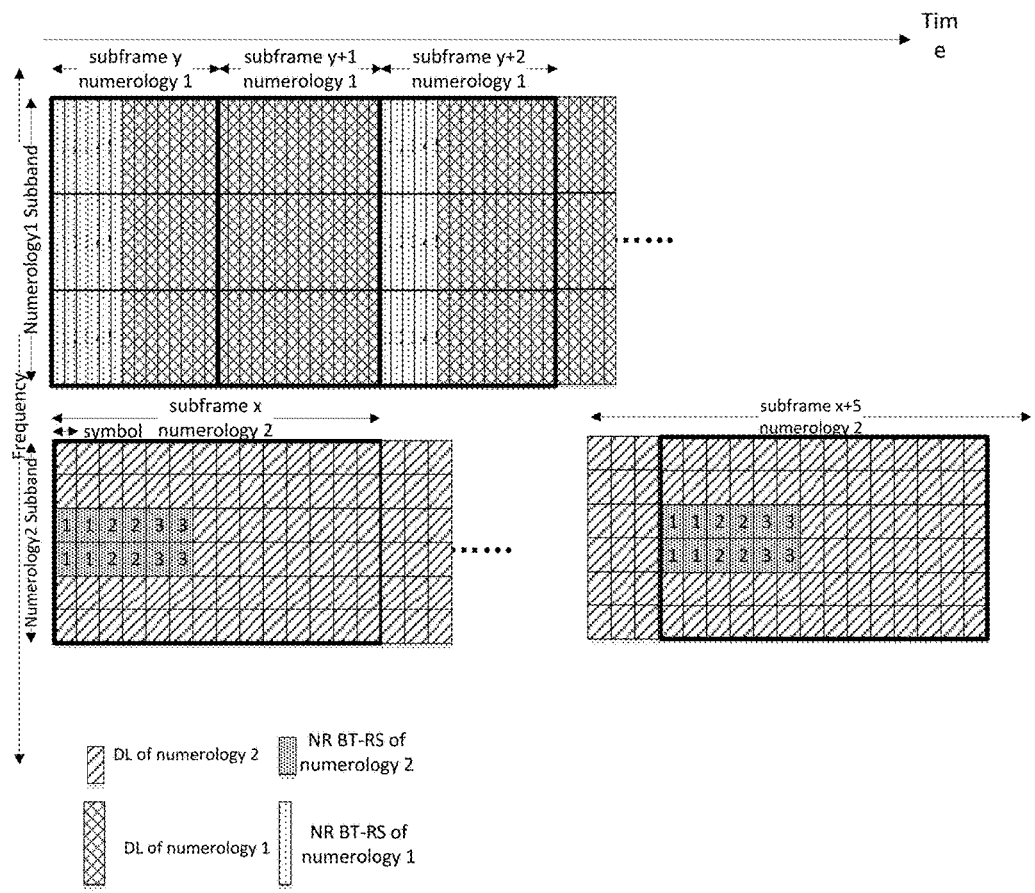
FIG. 11 illustrates 2 beamformed training reference signals (BT-RSs) in new radio with two different numerologies according to an embodiment of the application.

In FIG. 11, a shared BT-RS with two supported numerologies is shown. In this example, a NR-Node/TRP supports two numerologies and only a shared BT-RS setup for UE to perform initial access. The BT-RS may be allocated at either numerology subband depending on the BF sweeping requirements such as latency, device capability etc.

Figure 12:
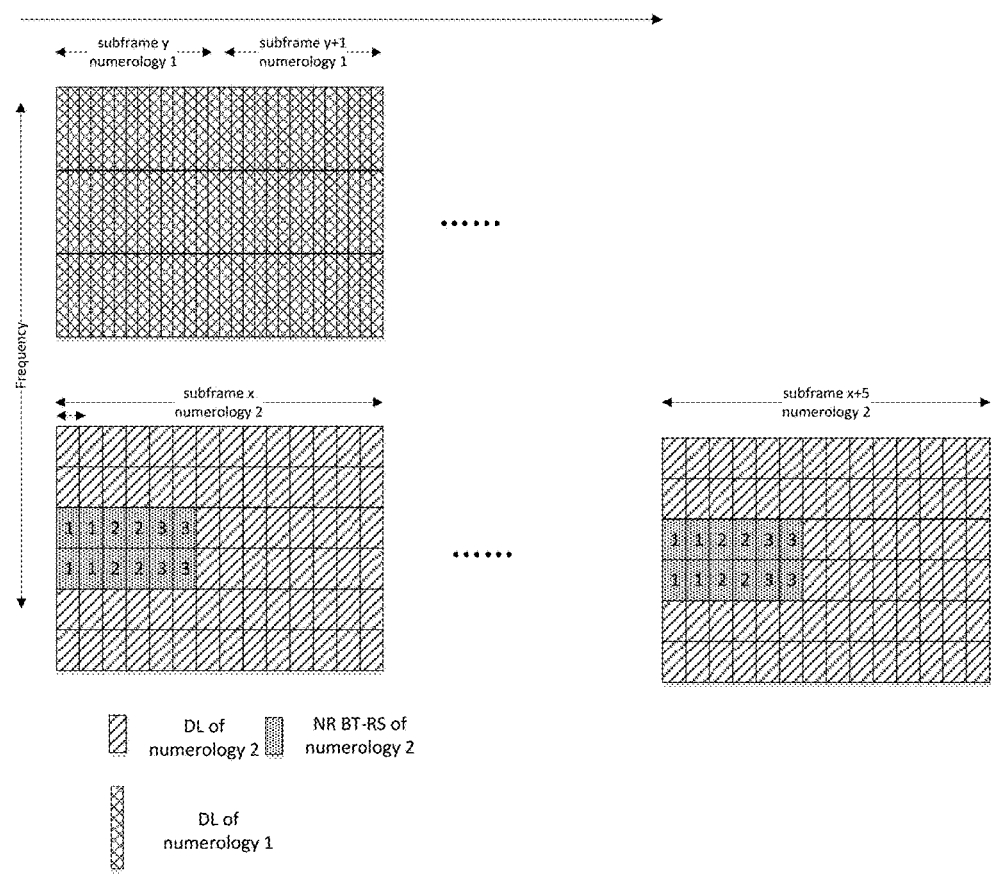
FIG. 12 illustrates a shared BT-RS in a new radio with two different numerologies according to an embodiment of the application.
Figure 13A:
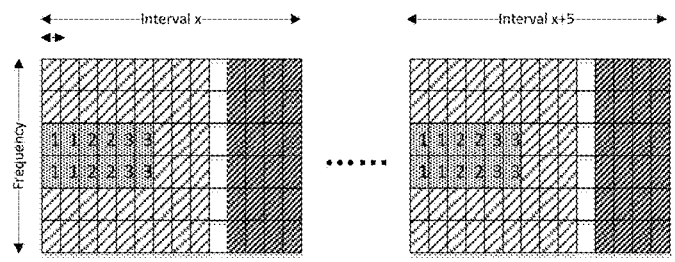
FIG. 13A illustrates a predefined BT-RS configuration in a self-contained subframe according to an embodiment of the application.
Figure 13B:
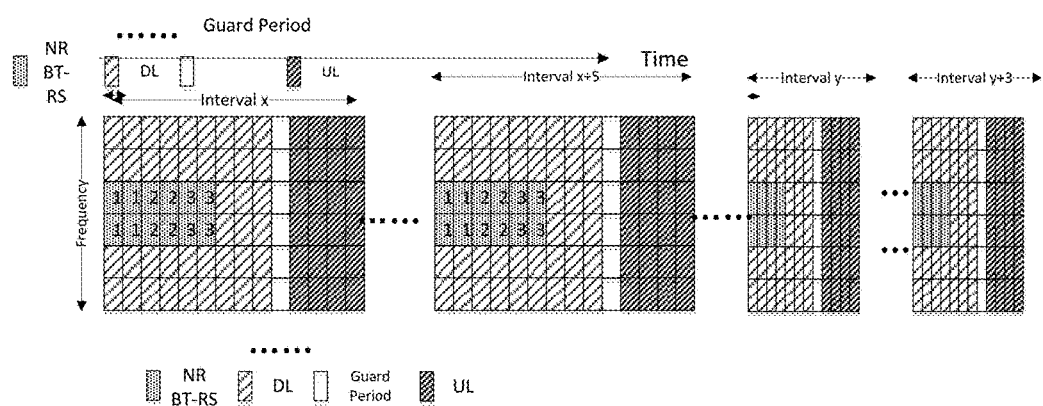
FIG. 13B illustrates a semi-statically configured BT-RS configuration in a self-contained subframe according to an embodiment of the application.

Furthermore, BT-RS can be supported in a self-contained subframe. In a self-contained subframe, BT-RS can be placed at known frequency-time DL resources i with interval x. In FIG. 12, NR BT-RS is placed at the beginning DL symbols and its peridocity is set to P=5 intervals. The BT-RS setup may be predefined with a fixed configuration as shown in FIG. 13A, or semi-statically configured when the interval is reconfigured with different numerology as shown in FIG. 13B. The re-configuration by NR-node or TRP may be indicated to UEs via system information broadcasting or high layer signaling such as RRC or MAC message.

Cell (Or Sector Or RAN Slice) Synchronization And Timing Acquisition

In an embodiment, when a UE is in the initial access stage and has no knowledge of a cell/sector/RAN slice timing information. Then a UE can monitor the periodical transmission BT-RS to acquire the symbol timing, subframe and frame timing. The UE can perform timing synchronization based on correlating N beams (or N hypothesis) with or without using RX beamforming. The N can be known to UE because BT-RS can associate with a counter such that UE can figure out how many beams in BT-RS.

A DL initial access signal which contains a DL synchronization channel (signals), a beam reference signal and a PBCH channel; a DL initial access signal which is carried by a DL beam sweeping block, each beam sweeping block containing either a single OFDM or multiple OFDM symbols; a DL beam sweeping subframe which may contain multiple beam sweeping blocks; DL synchronization channels PSS and SSS which can be placed at different OFDM symbols; a beam sweeping block which contains only one DL synchronization channel; a beam reference signal and a PBCH which may co-exist in the same OFDM symbol or in different OFDM symbols; and a PBCH which might have a different transmission period than the DL synchronization channel and beam reference signals.

If the DL synchronization channel carries both the cell and beam ID, then the UE can know which DL beam sweeping block is detected and is able to calculate the timing offset between the detected beam sweeping block to the DL sweeping subframe.

If the DL synchronization channel only carries the cell ID, then the UE can detect the beam ID from the beam reference signal. Therefore, the UE can know which DL beam sweeping block is detected and is able to calculate the timing offset between the detected beam sweeping block to the DL sweeping subframe.

Figure 14A:
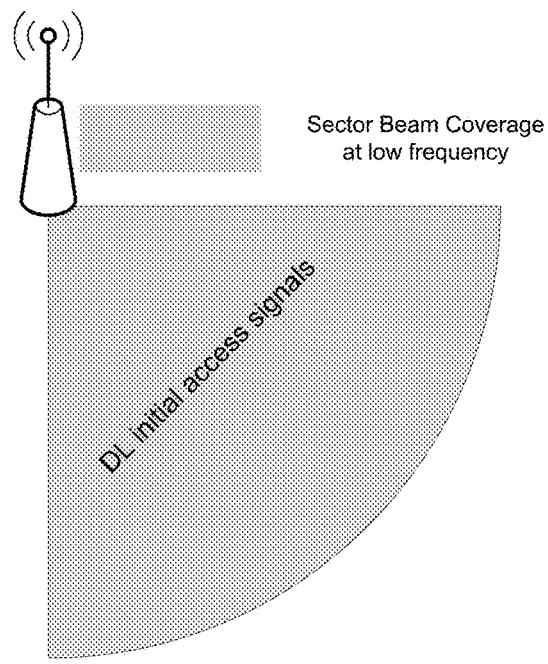
FIGS. 14A-B illustrate an exemplary initial access for single (a) and multi-beams (b) implementations.
Figure 14B:
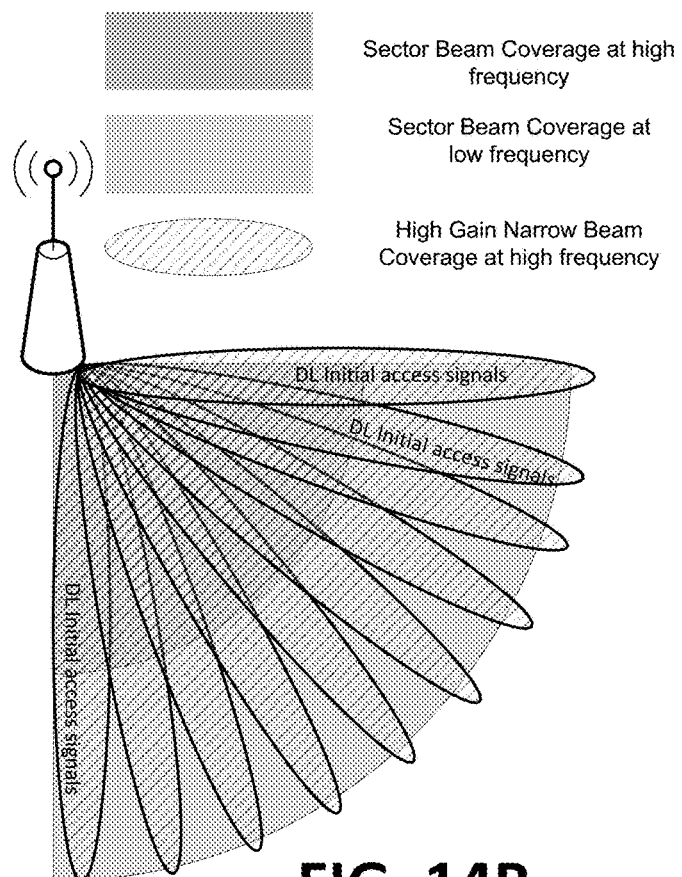

In NR, the initial access procedure consists of four sub-procedures and signals:

1. Initial synchronization and cell search
DL synchronization channels: PSS and SSS
2. Beam training and tracking
Beam reference signals
3. MIB system information delivery
PBCH channel
4. Random access
UL PRACH channel NR supports both LF-NR (i.e., sub 6 GHz) and HF-NR (i.e., above 6 GHz) deployment. In LF-NR, a single wider beam may be sufficient for coverage. However, in HF-NR, a single wider beam may not be sufficient for coverage. Thus, multiple narrow beams are a preferred solution for enhancing the coverage in HF-NR. Hence, NR may support both single beam based (or single sector) and multi-beams (multi-sectors) based approaches for initial access signal transmission. The initial access signal includes DL synchronization channels (e.g., PSS/SSS, beamforming reference signals and PBCH channels). The single and multi-beam implementations for initial access signal transmission are illustrated in FIG. 14. In FIG. 14A, the DL initial access signals are transmitted with a single wider beam. In FIG. 14B, the DL initial access signals are transmitted with each narrow beam and each narrow beam is aiming to different horizontal angels for a 2D beam instant.

Figure 15:
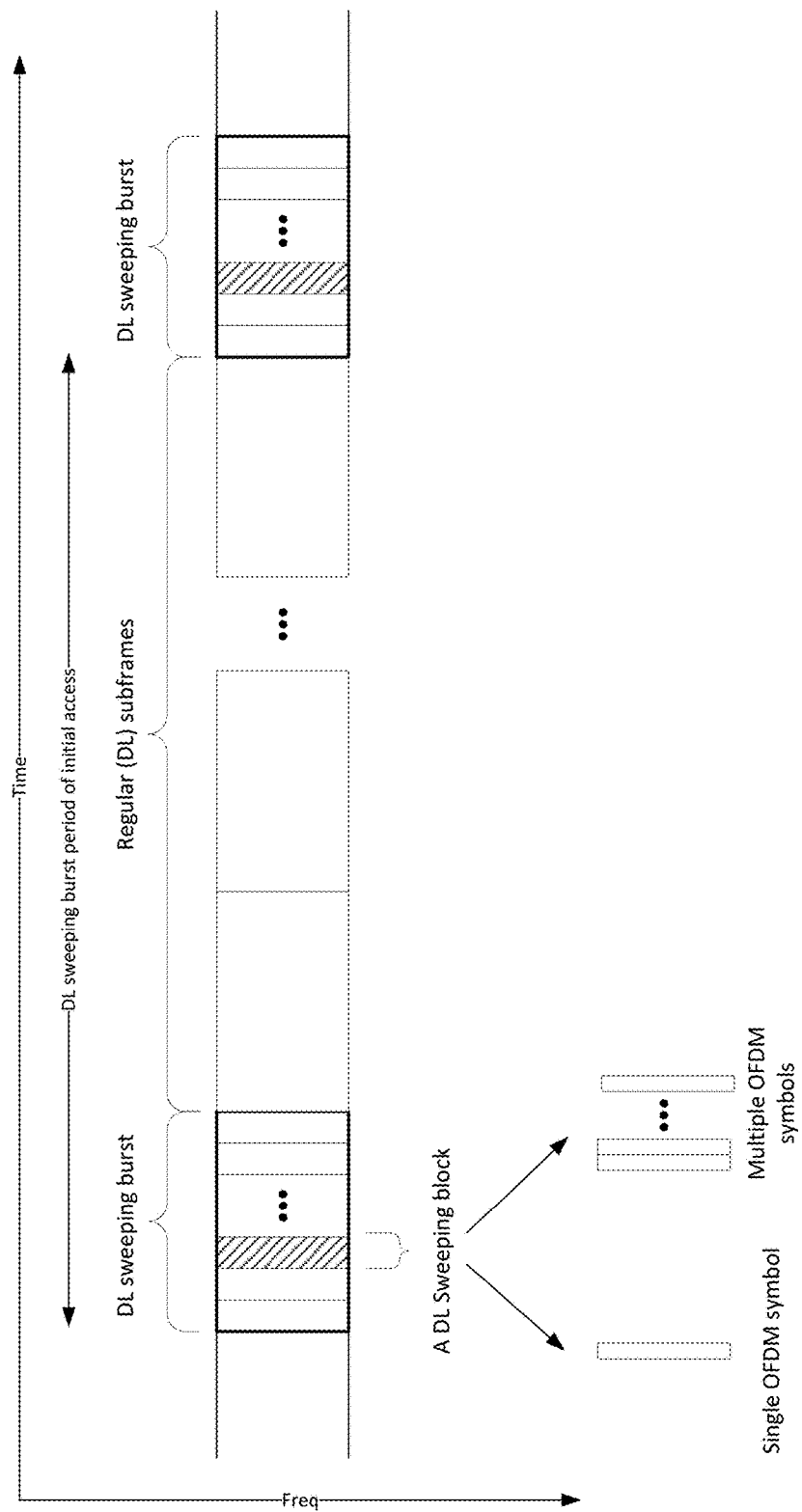
FIG. 15 illustrates an exemplary DL sweeping block and subframe for DL initial access.

Since simultaneously transmitting large amounts of multiple beams may be limited in a NR-node, one possible solution is to transmit multi-beams for DL initial access signals using the beam sweeping method. We define a sweeping block as a time unit for sweeping a beam, e.g., an OFDM symbol or multiple OFDM symbols. Either sweeping a single beam or multiple beams at a sweeping block (time). In addition, the beam sweeping subframe may consist of multiple sweeping blocks. FIG. 15 shows an example of a DL sweeping subframe and block. The DL beam sweeping subframe may be periodically transmitted at a time T. This periodic time T may vary with different applications such as URLLC, mMTC or eMBB services. In addition, single or multiple sweeping subframes can be used in NR systems.

The beam sweeping block may carry DL initial access signals such as DL synchronization channels (PSS/SSS), beam tracking reference signals and PBCH channel. If one OFDM symbol is used per beam sweeping block, then the DL synchronization channels, beam reference signal and PBCH should co-exist in an OFDM symbol. In this case, the DL synchronization channel, beam reference channel and PBCH are FDM in an OFDM symbol. If multiple OFDM symbols are used per beam sweeping block then each beam sweeping block can have the following options:

(i) The DL synchronization channels PSS/SSS can be placed at the different OFDM symbols;

(ii) Only one DL synchronization channel is in a beam sweeping block, and PSS is either at the last OFDM symbol or the first symbol in a beam sweeping block;

(iii) The beam reference signal and PBCH can co-exist in the same OFDM symbol or in different OFDM symbols; or (iv) PBCH might have a different transmission period than DL synchronization channel and beam reference signals.

Figure 16A:
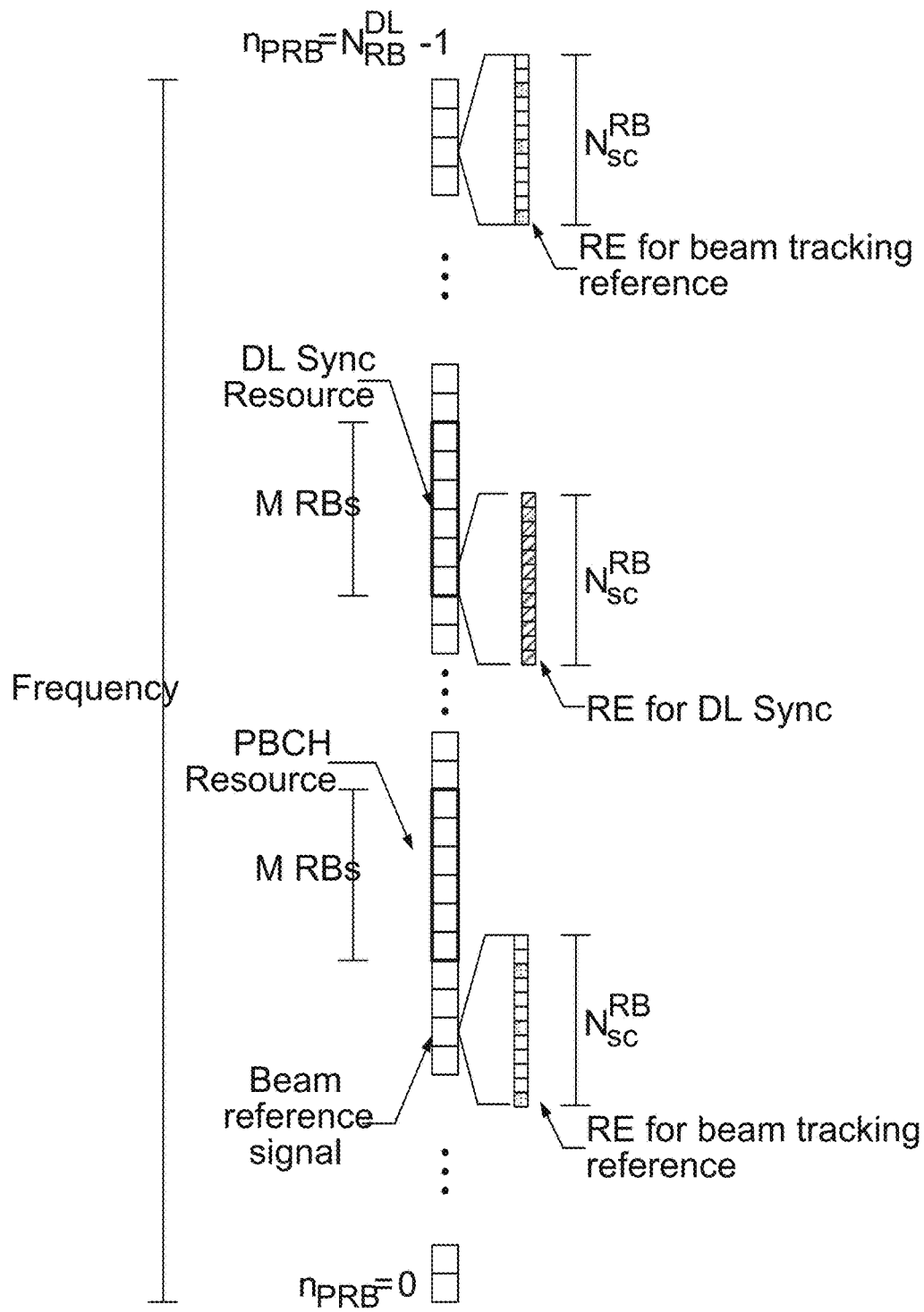
FIGS. 16A-B illustrate an exemplary sweeping block with one OFDM and multiple OFDM symbols.
Figure 16B:
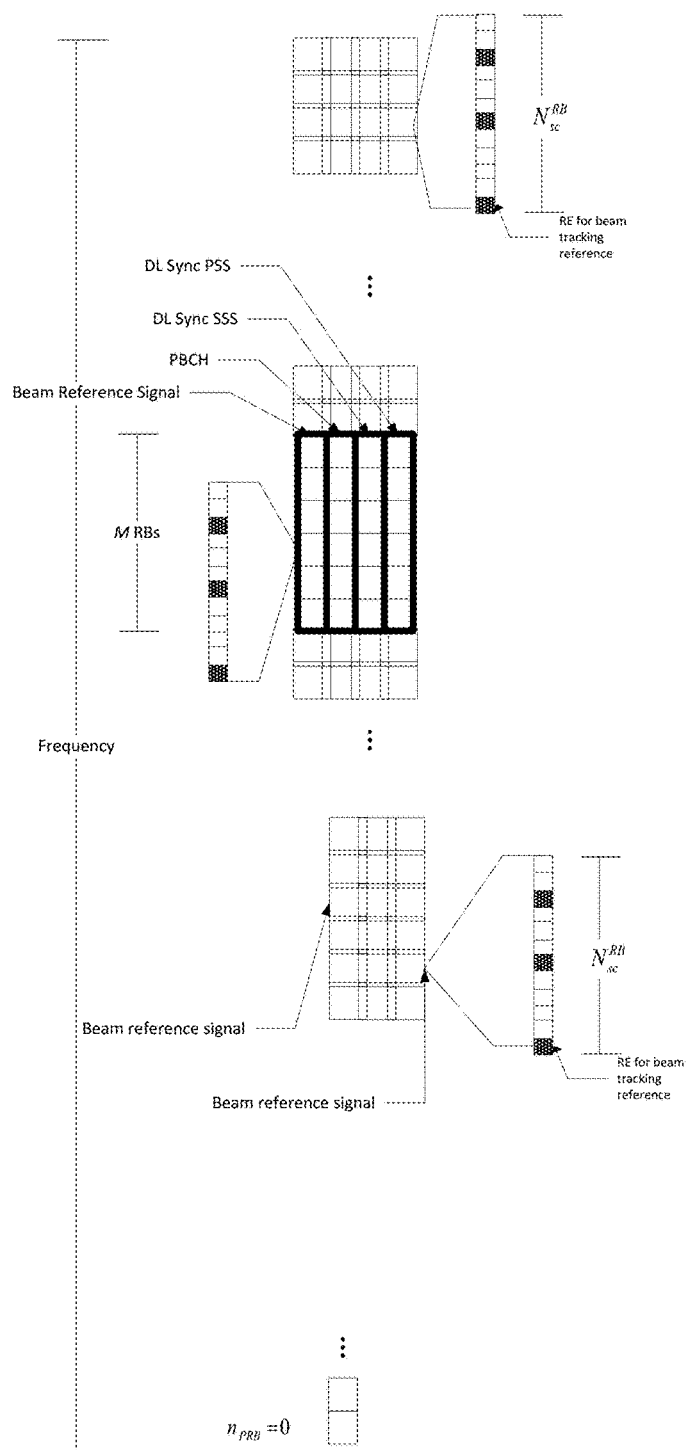

An examplary beam sweeping block with a single OFDM symbol is presented in FIG. 16A. In this example, the DL synchronization and PBCH co-exist. An example of a beam sweeping block with multiple OFDM symbols is presented in FIG. 16B. In this example figure, DL synchronization, PBCH and beam reference signals can be placed at different OFDM symbols. However, only one DL synchronization exists in a beam sweeping block.

Figure 17A:
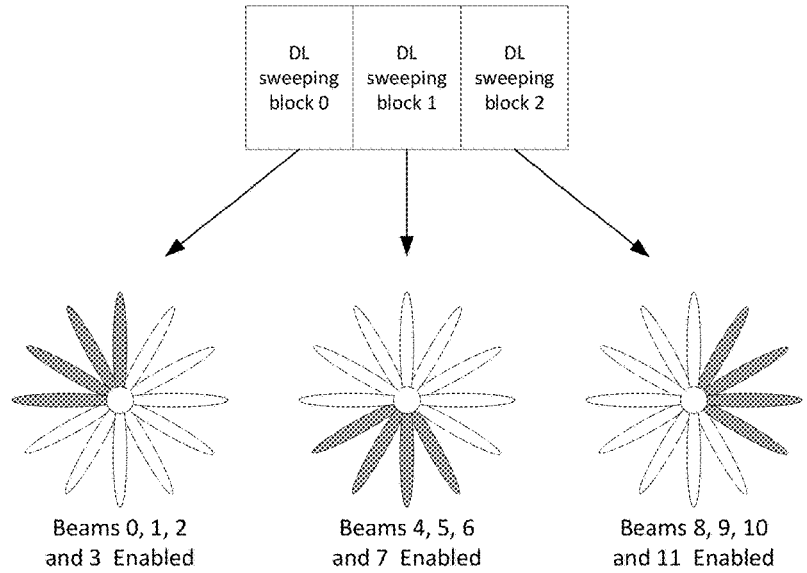
FIGS. 17A-B illustrate an exemplary sweeping subframe with multiple beams enabled per sweeping block.
Figure 17B:
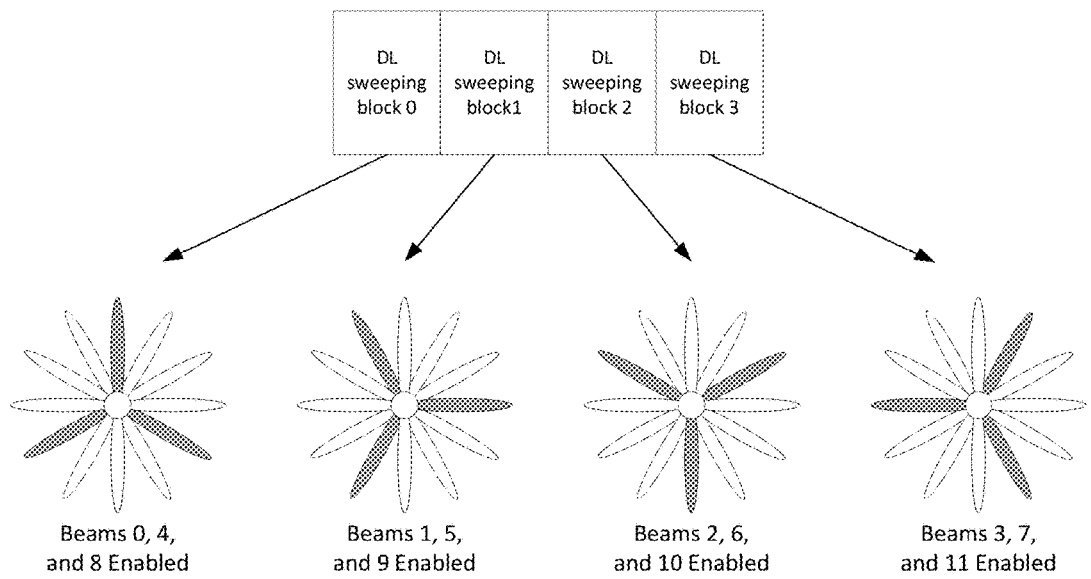

In order to perform beam sweeping, the NR-Node enables a subset of the beams during each sweeping block. Either a single beam or multi-beams can be associated with a beam sweeping block. FIG. 17A shows an example where 1 sector consisting of 4 beams is enabled per sweeping block. In this example, the full set of 12 beams is swept in 3 sweeping blocks. FIG. 17B shows an example where 1 beam in each sector is enabled per sweeping block. In this example, the full set of 12 beams is swept in 4 sweeping blocks.

Figure 18:
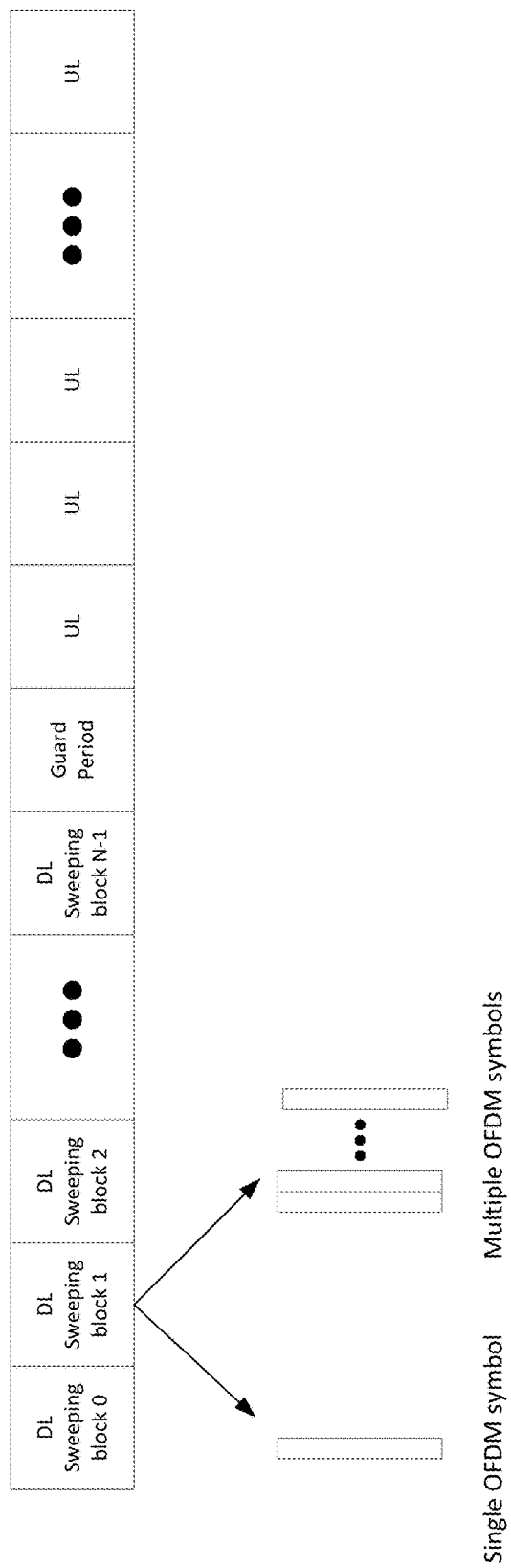
FIG. 18 illustrates an exemplary DL self-contained sweeping subframe structure.

The sweeping block can be adopted for a self-contained subframe. FIG. 18 shows an example of a self-contained sweeping subframe structure with DL sweeping blocks separated by a guard period to allow for Rx/Tx switching.

DL Sync Channel Design in a Beam Sweeping Block

As discussed above, only a single DL synchronization channel (signal) can be present for each beam sweeping block. However, a UE may detect multiple DL synchronization channels during DL sweeping subframes because a DL sweeping subframe contains several sweeping blocks. Hence, those detected multiple DL synchronization channels may cause the OFDM symbol or subframe timing ambiguity. Hence, the timing offset needs to be compensated to resolve this timing ambiguity due to multi-beam transmission of DL synchronization channels (signals). This may be accomplished by the following:

If the DL synchronization channel carries both the cell and beam ID, then the UE can detect the cell and beam ID from the DL synchronization channel. Therefore, the UE can know which DL beam sweeping block is detected and is able to calculate the timing offset from the detected beam sweeping block to the DL sweeping subframe;

If the DL synchronization channel only carries the cell ID, then the UE can detect the beam ID from the beam reference signal. Therefore, the UE can know which DL beam sweeping block is detected and able to calculate the timing offset from the detected beam sweeping block to the DL sweeping subframe. For example, the beam reference signal may be tied to the cell ID but its frequency and/or time resources may be different for the different beams within the cell—this is one way to enable the UE to uniquely identify the beam using the beam reference signals.

A unique beam ID may be used for each beam in a cell, which enables beams of a given TRP to be distinguished from each other within the same TRP. Beams from multiple TRPs within a geographical area should comprise a unique beam ID for each of them, so that beams can be distinguished from each other without ambiguity. The design of unique beam ID is necessary to enable measurement of the beams and intra-beam handoffs. Especially in >6 GHz deployments, it is expected that a cell will support several hundreds of beams through TRPs. It is desirable to minimize the number of hypotheses searches in the process of determining the beam ID. Thus, a beam identification procedure is proposed where a beam can be identified in a 2-step process as outlined below:

Step 1: Determine the cell ID—We propose that the cell ID be identified in the first step to minimize the number of searches for the beam ID. This is an important step because once the cell ID is determined, the UE may quit searching for a beam in that cell if it is black listed. For example, the cell ID may be determined using a PSS and SSS similar to that in LTE. However, note that this step cannot provide the frame timing as the PSS and SSS are on beams that occur at different times within a subframe/frame.

Step 2: Determine the beam ID—the beam ID is obtained after the knowledge of the cell ID is obtained. One way to accomplish this is to provision a tertiary synchronization signal (TSS) in a fixed location within a frame. The TSS sequence may be determined by the cell ID and resources used by the beam ID (or resources of reference signals of the beam). Once the UE obtains the cell ID, it resolves the possible hypotheses for the beams and detects the beam ID. Then, using the location of the TSS and detected beam sweeping block, it obtains the frame timing. The relative location of the detected beam sweeping block indicates its beam ID.

Figure 19:
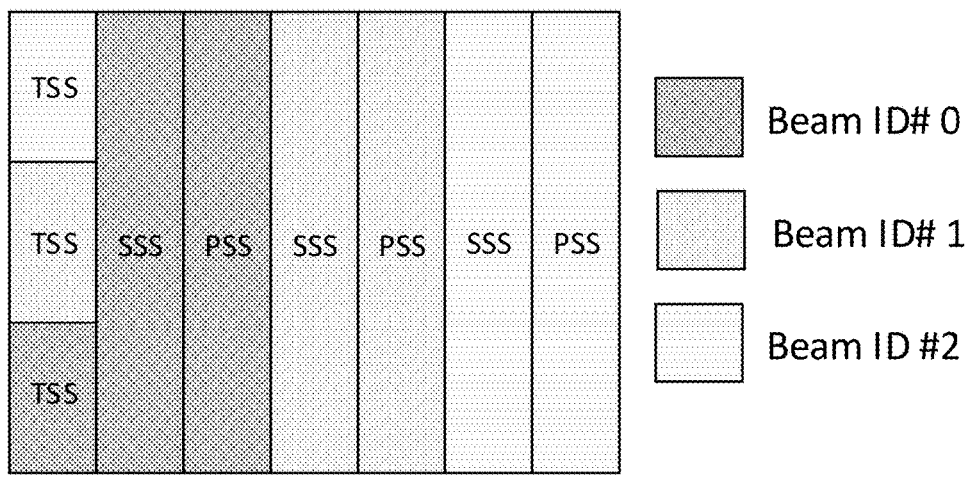
FIG. 19 illustrates an exemplary TSS used for beam ID detection.

An exemplary embodiment is shown in FIG. 19 where there are three beams whose PSS and SSS are transmitted in different symbols in the form of a beam sweep. The TSS resources are allocated in the 0th symbol of the subframe. The TSS on each beam may share different resources as illustrated. The possibility of TSS for different beams sharing the same resources is not excluded, especially when the beams do not overlap spatially. Once the UE detects the best PSS/SSS (based on the beam which provides the best SINR or the highest received signal strength), it determines the cell ID. In this example, once the UE has 3 hypotheses for the time-location of the TSS, it proceeds to decode the TSS and selects the one which maximizes the SINR.

Furthermore, we propose that for the above scheme, the beam reference signal is tied to the cell ID and beam ID. Similarly, all transmissions on a beam will be tied to both cell ID and beam ID. For example, scrambling sequences used to scramble PHY channels such as PBCH, DCI and PDSCH, etc., are generated using both cell ID and beam ID jointly.

Figure 20:
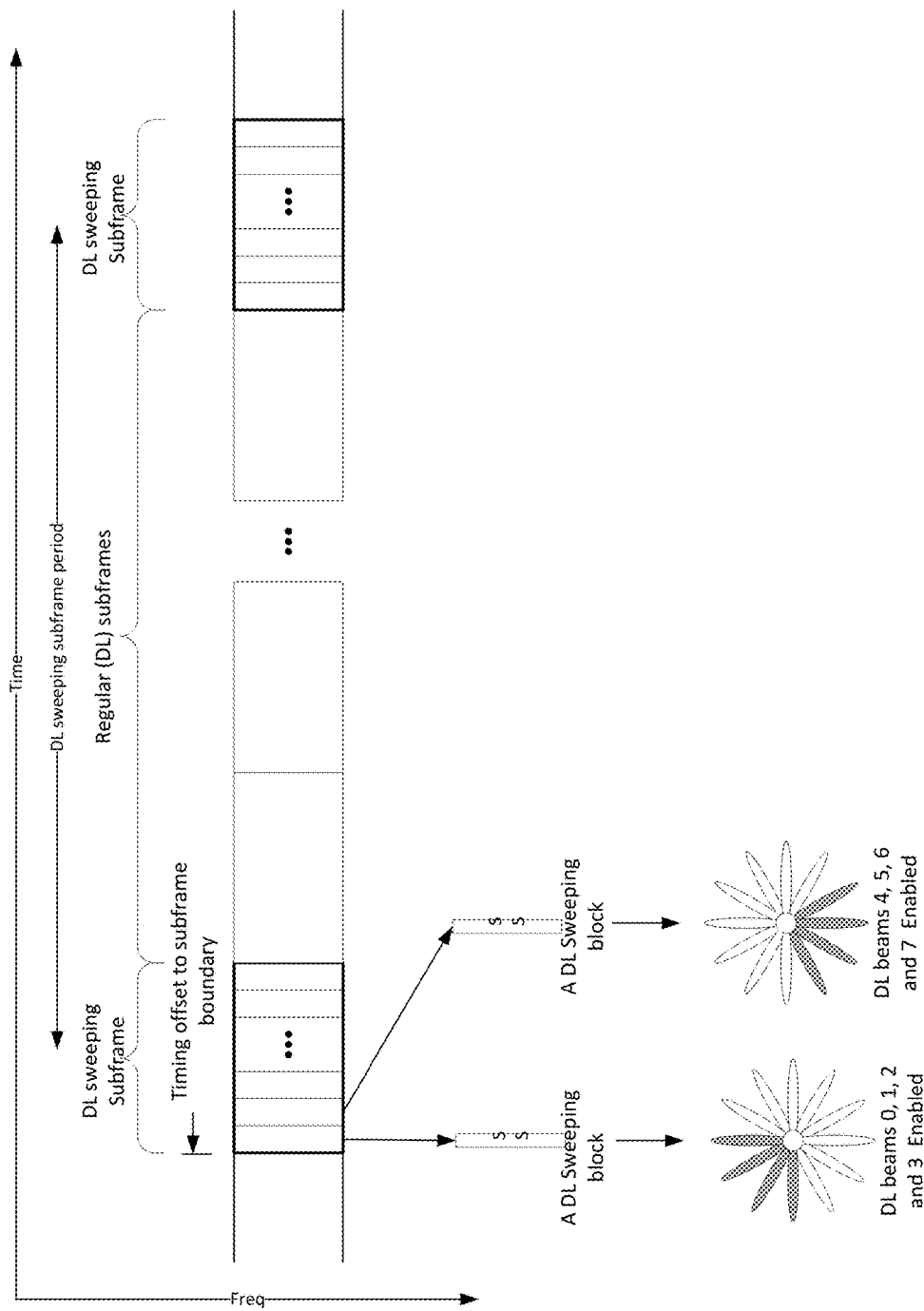
FIG. 20 illustrates an exemplary timing offset from the detected beam sweeping block to the beam sweeping subframe.

FIG. 20 illustrates a scenario where a DL beam sweeping block enables four sweeping beams in a beam sweeping subframe. Since sweeping beams need to be associated with a beam ID, this beam ID can be combined into the DL synchronization channel sequence such as PSS/SSS and without using a beam reference signal to carry beam ID. If the DL synchronization channel carries both a cell and beam ID, a UE detects a best beam from a DL synchronization signal. This is equivalent to the UE knowing which DL beam sweeping block is detected. Therefore, the UE can know the timing offset from the detected sweeping block to the DL sweeping subframe.

Figure 21A:
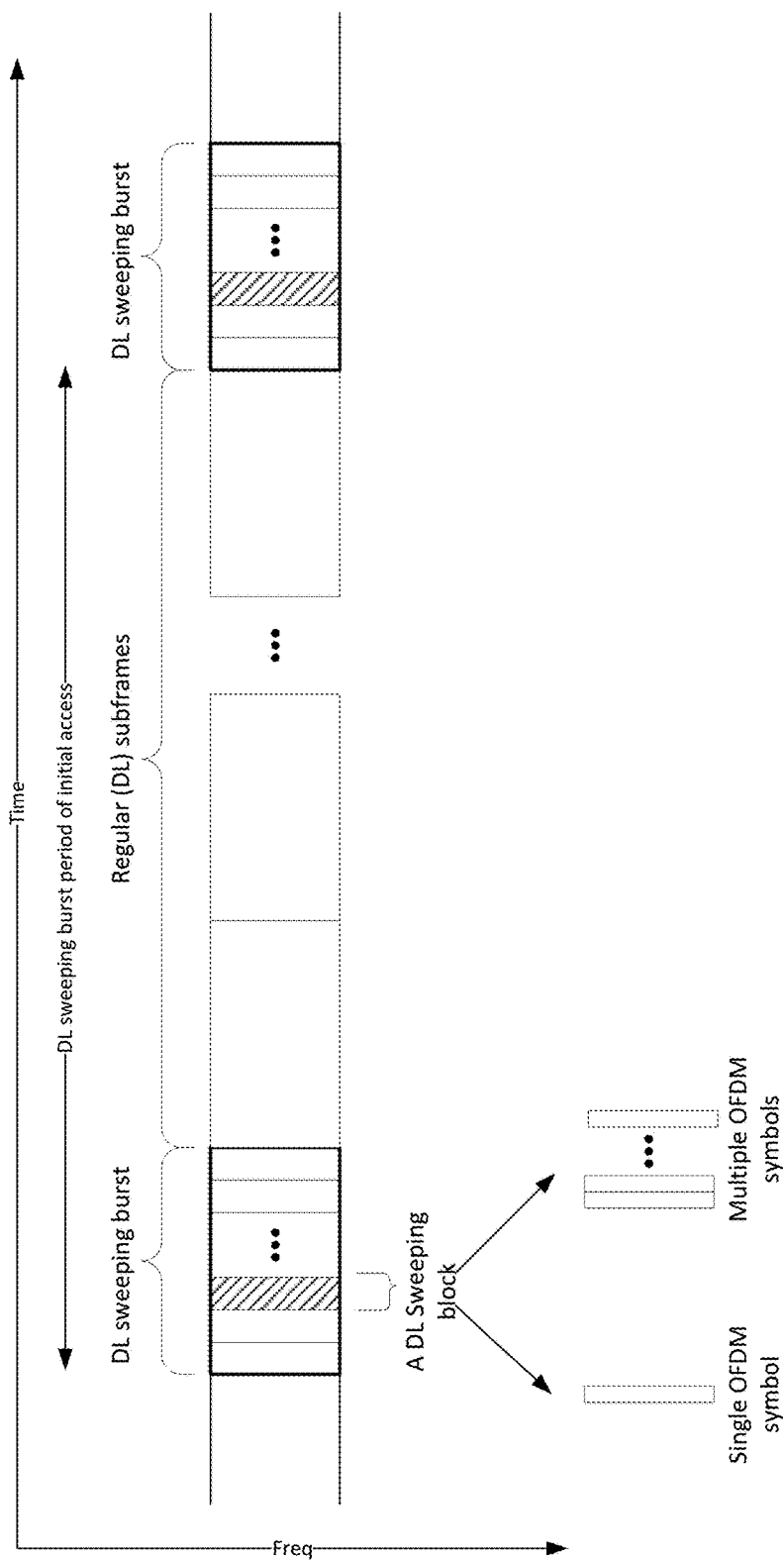
FIG. 21A illustrates an exemplary DL sweeping block and burst for DL initial access.

Aspects for Beamforming Based Initial Access are now described in detail below. The DL synchronization channels for initial signal design in NR systems are addressed. NR supports both LF-NR, i.e., sub 6 GHz and HF-NR, i.e., above 6 GHz deployment. In LF-NR, a single wider beam may be sufficient for coverage. However, in HF-NR, a single wider beam might not be sufficient for coverage. Thus multiple narrow beams are a preferred solution for enhancing the coverage. Hence, a NR system may support both single beam-based (or single sector) and multi-beam-based (multi-sectors) approaches for initial access signal transmission. The initial access signal includes DL synchronization channels, i.e. PSS/SSS and PBCH channel. Furthermore, we define a DL initial access beam sweeping block which can be treated as a unit of beam sweeping time unit for broadcasting DL synchronization channels and NR-PBCH for initial access. Each sweeping block may consist of at least one or more CP-OFDM symbols. Multiple blocks can form a beam sweeping burst. Here, the length of a sweeping burst refers to the number of beam sweeping blocks in a burst. For example, if a beam sweeping burst length is equal to M then there are N sweeping blocks in a burst. In FIG. 21A, an example of a DL sweeping burst and block for DL synchronization channels and NR-PBCH are depicted. The DL beam sweeping burst may be periodically transmitted with a periodical time T. This period T may be varied with different applications such as URLLC, mMTC or eMBB services or with different frequency bands (or frequency ranges) and numerology.

The NR-PSS may be mainly used for the detection of symbol timing and/or subcarrier spacing. If NR-SSS can be used for deriving a subframe index and deriving a symbol to subframe index, the NR-SSS identification carries both the partial cell ID NID(2) and symbol to the subframe counter/index Nloc. A UE may detect multiple DL synchronization channels during a DL sweeping burst because a DL sweeping subframe contains several sweeping blocks. Hence, those detected multiple DL synchronization channels may cause the CP-OFDM symbol to subframe timing ambiguity. Hence, it is recognized herein that the timing offset might need to be compensated to resolve this timing ambiguity due to multi-beam transmission of DL synchronization channels (signals). In one embodiment, if the DL synchronization channels carry the cell ID and symbol to a subframe index/counter, a UE can detect the cell ID and fetch the symbol to subframe index/counter from the DL synchronization channels only. Therefore, the UE can know which DL beam sweeping block is detected and is able to calculate the timing offset from the detected beam sweeping block to the DL sweeping subframe from the counter value from NR-SSS. In some cases in which a cell owns multiple TRPs, then different Tx-TRP from a same cell may transmit the same cell ID via NR-PSS and NR-SSS.

In addition, a periodic beam sweeping burst for DL synchronization and NR-PBCH can be applied in an NR system. For example, different NR cells may set up the different sweeping burst length, and the length of burst could vary with the frequency bands (or frequency ranges), or numerology. The PBCH can co-exist in the same OFDM symbol or in different OFDM symbols with NR-PSS/NR-SSS if a CP-OFDM symbol for an initial access block. In some cases, the NR-PBCH may have different channel BW than DL synchronization channels. Subcarrier spacing for NR-PSS, NR-SSS and NR-PBCH can be the same or different.

In an exemplary beam sweeping block, it may carry DL synchronization channels (NR-PSS/SSS) and the NR-PBCH channel. If a beam sweeping block is associated with a single CP-OFDM system, then the DL synchronization channels (NR-PSS, NR-SSS) and NR-PBCH might need to co-exist in an OFDM symbol. In this case, the DL synchronization channels and NR-PBCH are frequency division multiplexed (FDM) in an OFDM symbol. In some cases, if NR-SSS needs to be the demodulation reference signal for NR-PBCH, then the RE of the NR-SSS and NR-PBCH can be interleaved at the allocated RBs. In an example, the REs of the NR-SSS and NR-PBCH are interleaved at the allocated RBs for NR-SSS and NR-PBCH. In another example, the NR-SSS and NR-PBCH are located at different resource blocks, and the resource location of NR-PBCH and NR-SSS may be dependent on frequency bands/ranges.

Figure 21B:
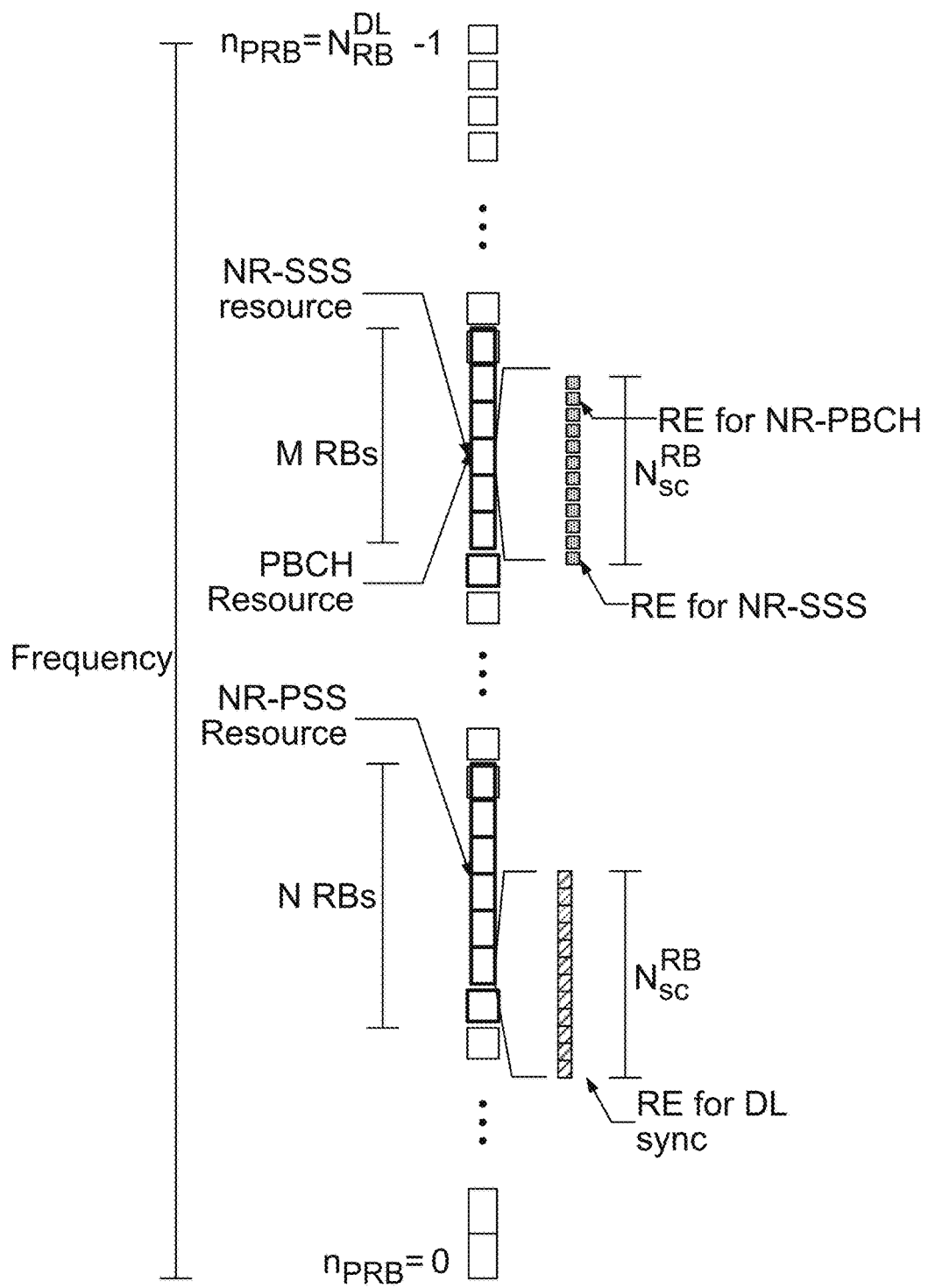
FIGS. 21B(i)-(iii) illustrates a DL sweeping block with one OFDM symbol according to an embodiment of the application.

Referring now to FIG. 21B, in particular FIG. 21B(i) and FIG. 21B(ii), an example of a sweeping block with a single OFDM symbol is presented. In this example, NR-SSS and NR-PBCH may be allocated to the same RBs, but they are REs interleaved. As shown in FIG. 21B(iii), the NR-SSS and NR-PBCH may be located at different resource blocks. The location of NR-SSS and NR-PBCH might be dependent on frequency bands/ranges. In some cases, if a sweeping block is a composite of multiple CP-OFDM symbols, the NR-PSSS, NR-SSS and NR-PBCH may be placed at different CP-OFDM symbols. In FIGS. 21C(i)-(iii), examplary DL sweeping blocks are depicted. The NR-PBCH resource can be at the same CP-OFDM as NR-SSS.

According to another aspect of the application, eNBs in 5G networks are employed to support plural principal numerologies for PHY channel transmission. "Principal numerology" describes a set of PHY channel parameters that define the CP length, subcarrier spacing and symbol duration for DL control and data channels and possibly some system information. For example, the eNB uses "common sync signal numerology" for signaling the DL synchronization signals and channels (PBCH) to carry system information. The system information may especially include critical system information. The eNBs in the network use the same sync numerology although they may support different principal numerologies.

In an embodiment, the principal numerologies of the eNB may be unknown to a UE before it synchronizes to the cell. However, the UE knows the sync numerology. In so doing, the UE employs the parameters of the sync signal numerology to perform its initial cell search. The UE then decodes available system information for the cell.

Moreover, the transmitted system information using sync numerology carries a field numerologyConfig-k for the $k^{th}$ supported principal numerology of the cell. The numerologyConfig-k may contain two fields, such as for example, cpConfig-k and subcarrierSpacing-k indicating the CP length and subcarrier spacing respectively for the $k^{th}$ supported primary numerology, where k≥1. TABLE 8 shows an exemplary configuration for numerologyConfig-k.

TABLE 8

| numerologyConfig-k |
|---|
| cpConfig-k = 2.35 (μs) |
| subcarrierSpacing-k = 30 (KHz) |

The parameters for the sync numerology are given by numerologyConfig-sync. The numerologyConfig-sync may contain two fields, such as for example, cpConfig-K and subcarrierSpacing-k. TABLE 9 describes an exemplary configuration for numerologyConfig-sync.

TABLE 9

| numerologyConfig-sync |
|---|
| cpConfig-k = 4.7 (μs) |
| subcarrierSpacing-k = 15 (KHz) |

Figure 22:
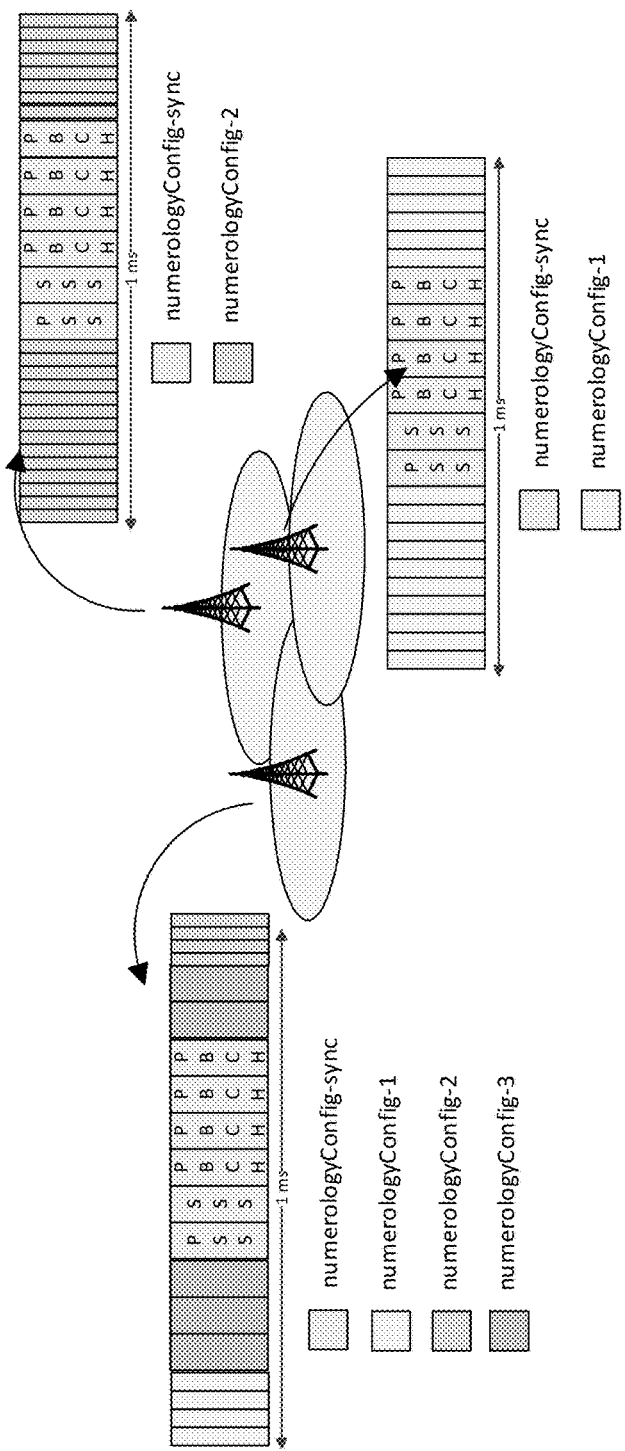
FIG. 22 illustrates a network with multiple cells having common sync numerology according to an embodiment of the application.

FIG. 22 illustrates an exemplary 5G system, such as disclosed in FIGS. 3A-F, with different cells having different configurations for the principal numerology. The cells have a common sync signal numerology. Specifically, the eNB assigns one of the principal numerologies to a UE. Assignment occurs after the eNB synchronizes and connects to the cell through an initial cell search. The eNB may use different criteria for making an assignment. One criterion may include RAN slicing configured for the UE. Here, a UE with low latency requirements may be assigned the principal numerology with the largest carrier spacing and shortest symbol duration. Another criterion may include network load. In this case, if the RAN has high resource utilization, the eNB may assign newly synchronized UEs to principal numerologies with longest symbol duration. Yet another criterion may include UE location. For example, if the RAN is aware that the UE is in an indoor location, it may assign the numerology with the shortest CP.

It is envisaged that the principal numerology assignment is carried on the system information of the cell. The following use cases illustrate different deployments in which the principal numerology is assigned through different blocks of system information or via a RRC connection. In a first use case, consider a 5G eNB with a single principal numerology. The eNB uses its sync numerology to transmit the MIB. The principal numerology is employed to transmit all other system information, and to control data channels. A UE initiates the cell search procedure and obtains the Physical Cell Identity (PCI) of the cell and decodes the MIB using the prior known sync numerology. The MIB contains the numerologyConfig field that specifies the supported principal numerology in the cell. The UE now uses the principal numerology to decode the remaining system information and perform RRC connection.

In a second use case, consider a 5G eNB, such as described above in FIGS. 7C-F, with multiple principal numerologies. The eNB transmits at least some of its system information using the sync numerology. A MIB transmitted via sync numerology carries information of supported principal numerologies. This may include, for example, the mapping of the supported principal numerologies to configured network slices. A UE pre-configured to belong to a certain network slice obtains its principal numerology from this MIB. TABLE 10 below provides an exemplary mapping of numerologyConfig-k to different network slices.

TABLE 10

| numerologyConfig-1 | UR/LL and eMBB UE |
|---|---|
| cpConfig-1 = 2.35 (μs) | |
| subcarrierSpacing-1 = 30 (KHz) | |
| numerologyConfig-2 | mMTC UE and others |
| cpConfig-2 = 4.7 (μs) | |
| subcarrierSpacing-2 = 15 (KHz) | |

Figure 23:
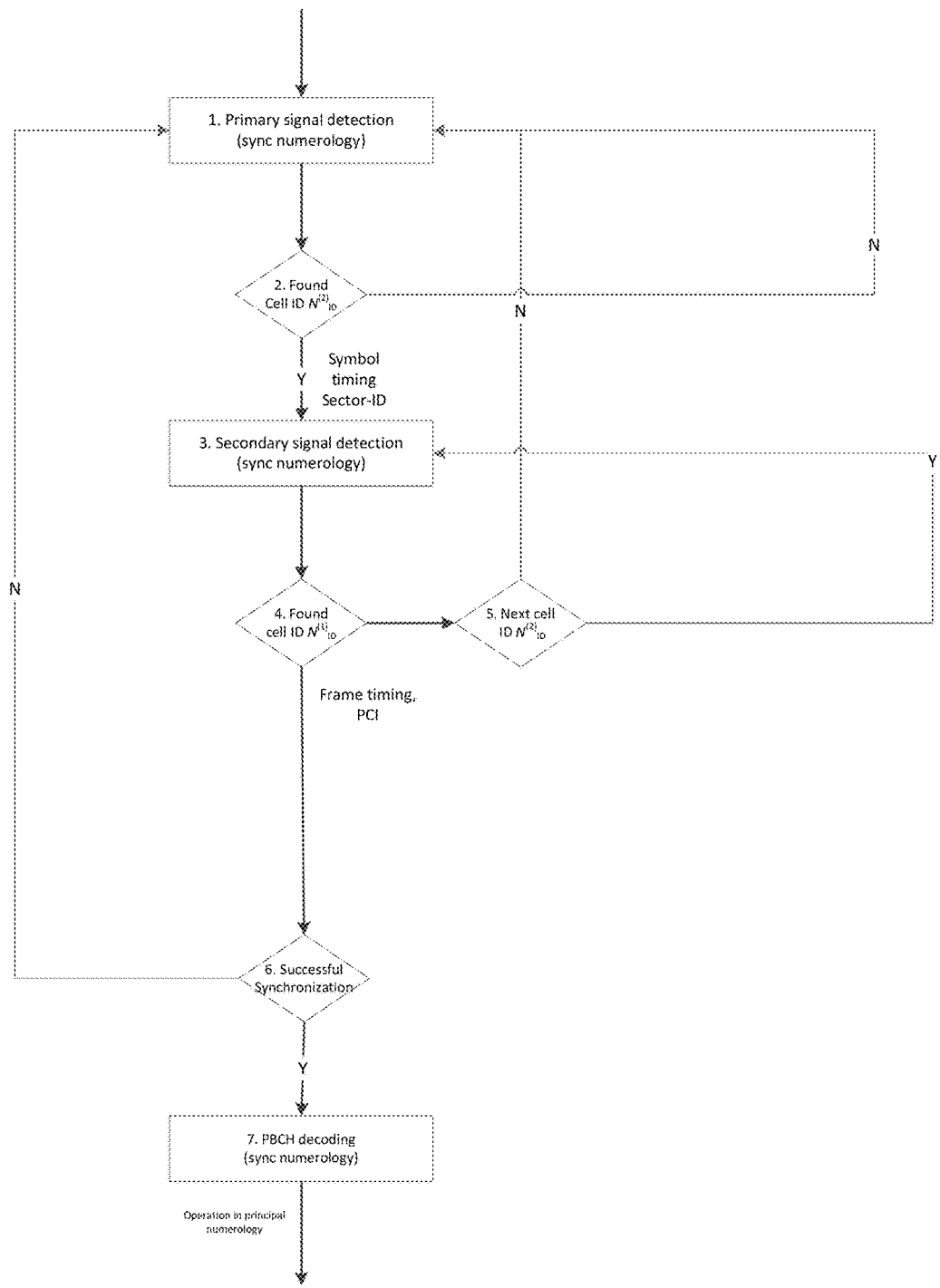
FIG. 23 illustrates an exemplary procedure for detecting a principal numerology according to an embodiment of the application.

It is envisaged in accordance with the application that the 5G system/cell can select the sync signal numerology. In particular, the system requires the lowest sampling rate, smallest subcarrier spacing or the least latency constraints (longest DL symbol duration) among all available numerologies capable of being supported. FIG. 23 is an exemplary illustration of a decision tree for detecting a principal numerology.

According to yet even another embodiment, it is envisaged that information about the numerology used by the DL sync in neighboring cells may be included in system information provided by eNB/cells to UEs to which they are connected. UEs can seamlessly perform synchronization with a neighboring cell when cell re-selection is required. For example, if the neighboring cell information is provided in SIBs such as SIB-4 and SIB-5 in LTE, the information about the neighbor cell's DL sync numerology will be provided through these SIBs through a field called syncNumerologyConfig. This field could be a part of the IntraFreqNeighCellInfo field or InterFreqNeighCellInfo field which exists in the SIBs. TABLES 12 and 13 below show an exemplary configuration of SIB-4 and SIB-5, respectively carrying the syncNumerologyConfig information for the neighboring cells. In TABLE 11, the added field is syncNumerology.

posed solution for information on neighbor cell's numerology of DL sync signals information element.

The field, syncNumerology, includes enough information to fully describe the CP length of the symbol, the subcarrier spacing and symbol duration of the DL sync signals of the neighbor cell. TABLE 13 below describes how information on the syncNumerology of the neighboring cells may be configured.

TABLE 13

| syncNumerology |
| --- |
| cpConfig-k = 4.7 (µs) |
| subcarrierSpacing-k = 15 (KHz) |

Figure 24:
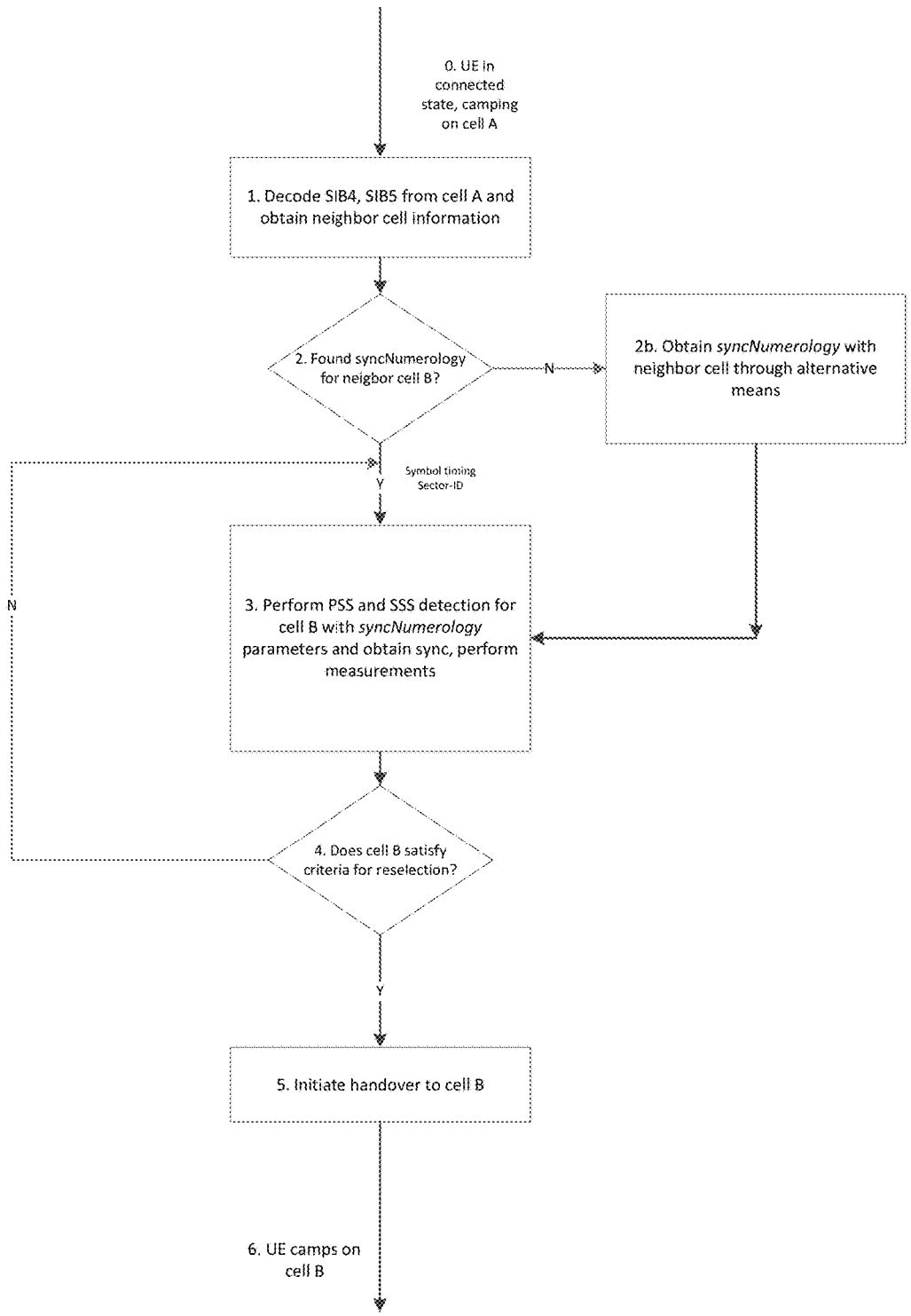
FIG. 24 illustrates a signal flow synchronization procedure with a neighbor cell according to an embodiment of the application.

In an embodiment, FIG. 24 illustrates a decision tree for obtaining the Sync signal numerology of a neighboring cell and performing a cell re-selection. All of the steps are denoted in Arabic numerals. In particular, the UE is in a connected state and camping on Cell A (step 0). In step 1, the UE begins to decode SIB4 and SIB5, based upon the descriptions above, to obtain neighbor cell information. The UE queries in step 2 whether a syncNumerology for neighbor cell B was found. If not, the UE proceeds to step 2b and will find alternative means.

TABLE 11

```
-- ASN1START
SystemInformationBlockType4 ::=   SEQUENCE {
    intraFreqNeighCellList        IntraFreqNeighCellList    OPTIONAL,   -- Need OR
    intraFreqBlackCellList        IntraFreqBlackCellList              OPTIONAL,   -- Need
OR
    csg-PhysCellIdRange           PhysCellIdRange           OPTIONAL,   -- Cond CSG
    ...,
    lateNonCriticalExtension      OCTET STRING              OPTIONAL
}
IntraFreqNeighCellList ::=        SEQUENCE (SIZE (1..maxCellIntra)) OF IntraFreqNeighCellInfo
IntraFreqNeighCellInfo ::=        SEQUENCE {
    physCellId                       PhysCellId,
    q-OffsetCell                     Q-OffsetRange,
    syncNumerology                   SyncNumerology,
    ...
}
IntraFreqBlackCellList ::=        SEQUENCE (SIZE (1..maxCellBlack)) OF PhysCellIdRange
-- ASN1STOP
```

According to yet another embodiment, an apparatus on a 5G network is envisaged including a non-transitory memory with instructions stored thereon for performing synchronization with a neighboring cell. The apparatus includes a processor, operably coupled to the non-transitory memory, capable of executing the instructions of: (i) providing the apparatus connected to a first cell; (ii) decoding a system information block of the first cell; (iii) determining the system information block includes sync numerology of the neighboring cell; (iv) performing primary and secondary synchronization signal detection of the neighboring cell; and (v) synchronizing with the neighboring cell.

In an aspect of this embodiment, the processor is further capable of determining whether the neighboring cell satisfies criteria for cell re-selection. In yet another aspect of this embodiment, the processor is further capable of initiating handover from the first cell to the neighboring cell.

TABLE 12 below illustrates an exemplary SystemInformationBlockType5 (SIB-5) information element with pro- If the answer to step 2 is yes, the UE proceeds to step 3. Here, the UE performs PSS and SSS detection for cell B with syncNumerology parameters and obtains synchronization. It may also perform measurements.

Next, the UE determines in step 4 whether cell B satisfies criteria for cell re-selection. If no, the UE returns to the Symbol timing Sector-ID junction preceding step 3. If yes, the UE proceeds to step 5 in order to initiate handover to cell B. As a result, the UE transfers from cell A to cell B (step 6).

Figure 25A:
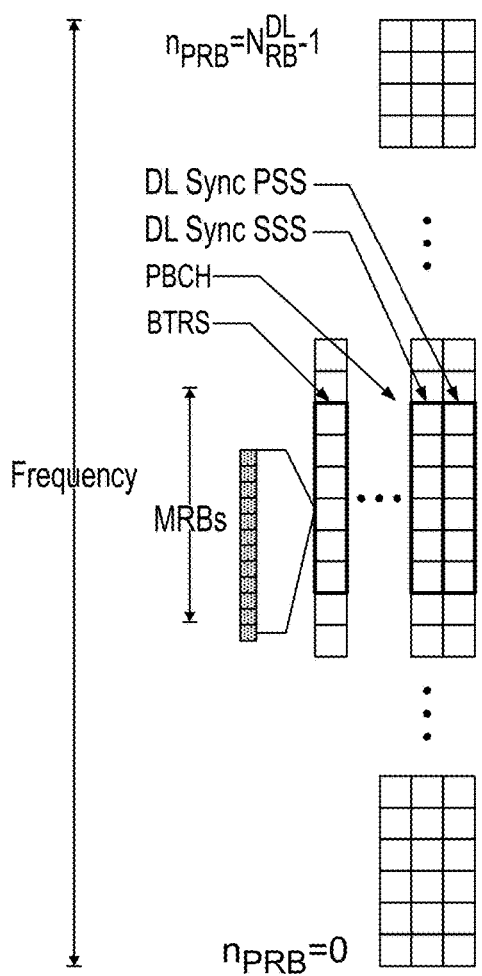
FIGS. 25A-B illustrate a DL sweeping block with multiple OFDM symbols (without associating with a NR-PBCH) according to an embodiment of the application.
Figure 25B:
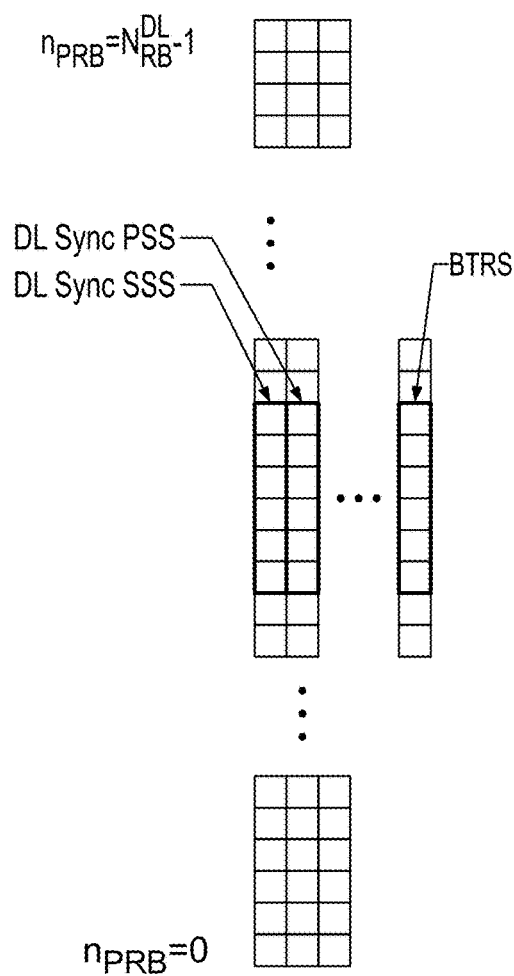

Turning now to the NR-PBCH, in an example, the NR-PBCH might have the same or different transmission periodicity as compared to NR-PSS, NR-SSS. This periodical transmission interval may be dependent on frequency bands (or frequency ranges). For example, the NR-PBCH transmission periodicity may be set to T=10 ms when under 6 GHz and T=5 ms when above 6 GHz. In a DL beam sweeping block, the NR-PBCH can coexist with NR-PSS and NR-SSS or not. Referring to FIGS. 25A-B, an example NR-PBCH that is not bundled with NR-PSS and NR-SSS is depicted. The NR-PBCH might have the same or different transmission period with DL beam sweeping burst T. This may be dependent on frequency bands/ranges. The NR-PBCH may carry the following system information, presented by way of example and without limitation:

Indicate PRACH resources
Indicate PRACH feedback method
   UL beam sweeping methods such as, for example and without limitation:
     Beam sweeping
     Based on best selected Tx beams
Carry symbol to subframe indication/counter
When the symbol to subframe indication or counter
TRP ID: The cell ID and TRP ID can assist UE to derive the beam ID
Supported numerologies
Number of ports for demodulation reference for paging channel/DL control channel
Paging signal broadcast burst period and resource
Multiple beams association or single beam association indication
   One bit indication to indicate DL beam sweeping block is associated with single or multiple beams In an example, the NR-PBCH may be demodulated via NR-SSS and/or the dedicated beam reference signal for NR-PBCH demodulation. If the demodulation reference signal is available for NR-PBCH demodulation, then it may be served as beam training reference (BTRS) as well. The demodulation reference signal for NR-PBCH can be designed to support SFBC or other transmit diversity up to $Z=2^m$ ports. For example, the Z ports can be set as 1, 2, 4 or 8. The UE may need to blind decode a number of hypotheses and verify a number of demodulation reference signals if, for example, the numbers of supported ports for transmit diversity are unknown to the UE. If the number of supporting ports is specified, for example, then the UE can avoid performing blind detection for supporting transmitting diversity, and reduce the detection complexity. The specified ports for supporting transmit diversity can be configured based on different frequency bands, numerologies, or different applications such as, for example, URLLC, MTC or EMBB. In some cases, the demodulation reference for NR-PBCH is defaulted as a quasi-colocation (QCL). When a beam sweeping block has multiple CP-OFDM symbols, for example, the demodulation reference signal for NR-PBCH can be located at a same or different symbol with NR-PBCH. FIGS. 26A-B show examples for demodulation signal designs for NR-PBCH. If NR-SSS is used for NR-PBCH demodulation then NR-SSS needs to be designed to support for NR-PBCH transmit diversity. For example, if NR-PBCH supports up to $Z=2^m$ ports then NR-SSS or partial of NROSSS signal can be transmitted at $Z=2^m$ ports. Those Z ports are default as QCL and ports locations are known to the UE. In FIG. 26C, it shows an example that the NR-SSS support 2 ports.

Turning now to beam training RS (BTRS) for demodulating NR-PBCH, it is recognized herein that it may be desirable to minimize the number of hypotheses searches in the process of determining the beam ID. Thus, in an example embodiment, an initial access identification procedure in which a cell and beam can be identified includes the following steps, presented by way of example and without limitation:

Step-1: Determine the cell ID—The cell ID be identified in the first step to minimize the number of searches for the beam ID. This may be an important step because once the cell ID is determined, the UE may quit searching for a beam in that cell if it is black listed. For example, the cell ID may be determined using a PSS and SSS similar to that in LTE—however note that this step does not provide the frame timing as the PSS and SSS are on beams that occur at different times within a subframe/frame.

Step-2: Determine the beam ID—the beam ID may be obtained after the knowledge of the cell ID is obtained. One way to accomplish this is to provision a beam training reference signal (BTRS) in a fixed location within a frame. The BTRS sequence may be determined by the cell ID and resources used by the beam ID (or resources of reference signals of the beam). Once the UE obtains the cell ID it resolves the possible hypotheses for the beams and detects the beam ID. The RTBS can be used for demodulation of NR-PBCH as well.

Figure 27A:
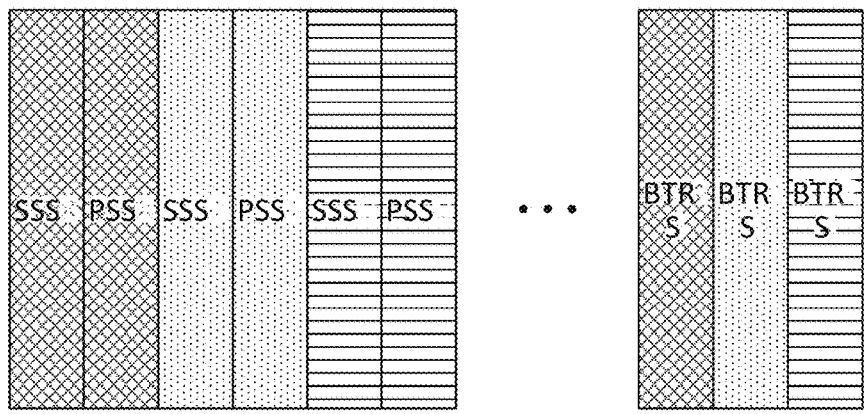
FIGS. 27A-C illustrate an exemplary BT-RS used for beam ID detection according to an embodiment of the application.
Figure 27B:
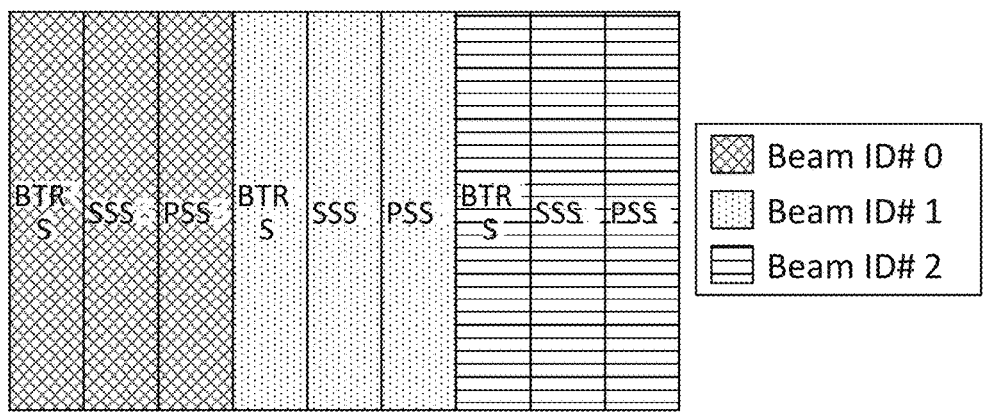
Figure 27C:
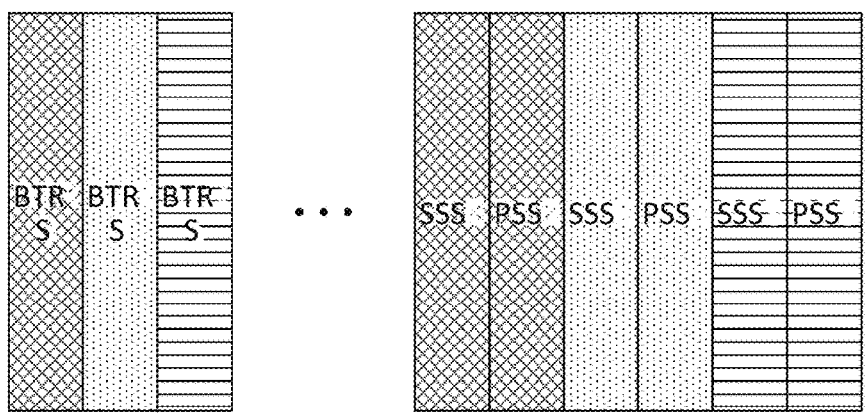

An example is shown in FIGS. 27A-C where there are 3 beams whose NR-PSS and NR-SSS are transmitted in different symbols in the form of a beam sweep. The BTRS resources are allocated in the x-th symbol of a subframe. The setting of the x-th symbol can be dependent on frequency bands (or frequency ranges) or numerology. The BTRS on each beam may share different resources as seen in FIGS. 27A-C. It will be understood, however, that the possibility of BTRS for different beams sharing the same resources is not excluded, especially when the beams do not overlap spatially. Once the UE detected the best NR-PSS/SSS, it determines the cell ID and use this cell ID to derive beam ID. In this example, the UE has 3 hypotheses for the time-location of the BTRS—it proceeds to decode/demodulate the BTRS and validates the one which maximizes the SINR.

Furthermore, in some cases, the BTRS signal is tied to the cell ID. Similarly, the transmissions on a beam may be tied to both cell ID and beam ID—for example scrambling sequences used to scramble PHY channels such as NR-PBCH, DCI and PDSCH, etc. are generated using both cell ID and beam ID jointly.

Figure 28:
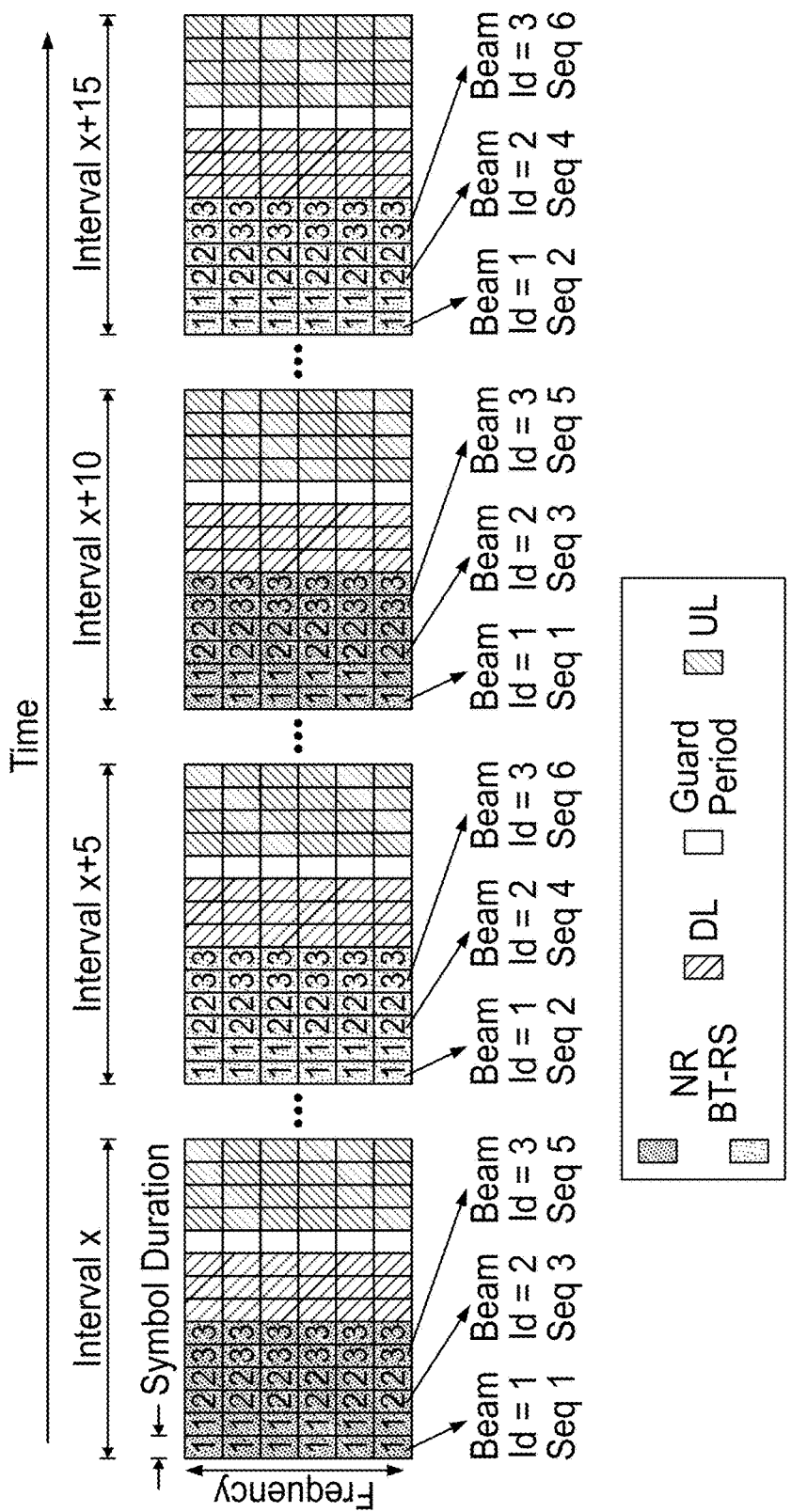
FIG. 28 illustrates an exemplary embodiment of a BT-RS beam identification and association beam sequence in a self-contained subframe of the application.

In an embodiment, the UE selects a beam/cell to perform initial network access based on TXSS signal strength, and/or BF pairing. Each beam i=1, . . . , N will be associated a beam ID and each beam ID can be associated with multiple sequences. The number of sequences associated to a beam ID denotes as J. The association of beam ID and its corresponding beam sequences can be predefined by the system. For example, beam sequences can adopt M-sequence with different shifts or other (semi-) orthogonal sequences to allow UE to distinguish beams i=1, . . . , N while detecting the beamed ID and symbol, subframe timing simultaneously. Since each beam i=1, . . . N has its own unique sequences. Hence, a UE can set up J×N correlators to perform timing detection and beam ID detection. Since the transmission of BT-RS is based on a known periodicity, the delay profile of each beam i=1, . . . , N can be utilized by with the accumulation of each beam correlation output. An example of BT-RS beam ID and associated beam sequences is shown in FIG. 28. Specifically, there are N=3 beams and each beam ID is set as 1, 2 and 3. For each beam ID, it is associated with J=2 sequences. Hence, there are J×N hypothesis to be detected for N beams when a UE performs the timing-and-frequency synchronization during the initial access stage. In this example, since each beam ID is associated with J=2 sequences and each associated sequence is transmitted at a different time or subframe interval. Therefore, those beam sequences associated to a beam ID can be used to distinguish frame timing. In FIG. 28, each beam ID is associated to 2 sequences and each beam sequence is repeated by 5 subframes. In this approach, the frame timing can be distinguished.

Figure 29:
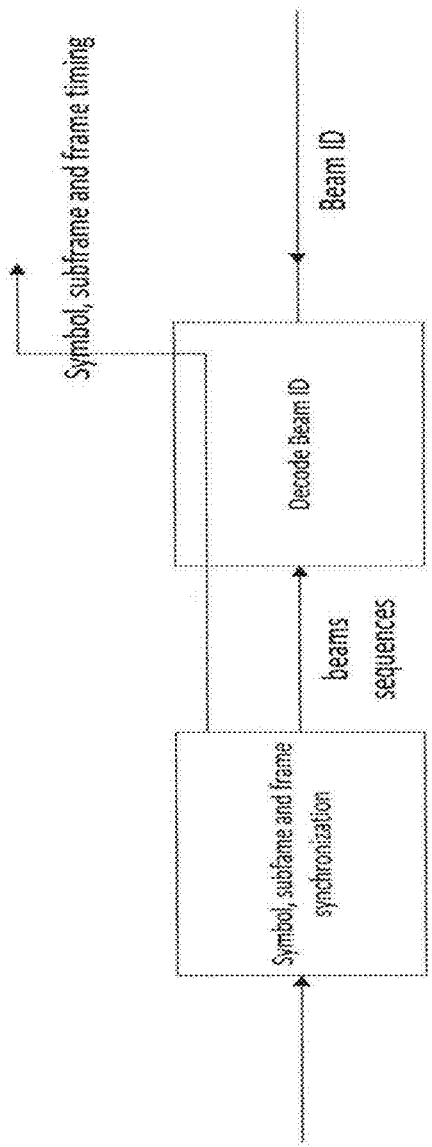
FIG. 29 illustrates a BT-RS beam identification decoding and synchronization detection embodiment of the application.

UE assumes the RX beamforming gain is equal for all directions, and decides cell/sector beam to access based on received signal strength of BT-RS. Since each beam ID is associated with unique sequences, UE can decode the beam ID from the associated beam sequences. In practice, beam sequences are selected based on the received signal strength of BT-RS. UE performs an initial beam search procedure and finds the best beam to camp on. The symbol, subframe timing and beam ID detection and decoding function in a UE is illustrated in FIG. 29.

In another embodiment, the NR-node/TRP transmits its BT-RS and beam formed PBCH. The PBCH should be beam formed the same way as corresponding BT-FS for each beam. BCH will serve the purpose of verifying the ID (beam ID or cell/TRP/RAN slice ID) carried on the preceding BT-RS. The PBCH contents may include Cell or TRP or RAN slice common PBCH content. The common part of PBCH can be broadcast following the beam sweeping Beam-specific BCH content. The content may include a Beam ID. The Beam ID may have a flat structure with a locally unique Beam ID in local area (not carry cell ID and TRP ID and/or RAN slice ID).

Figure 30:
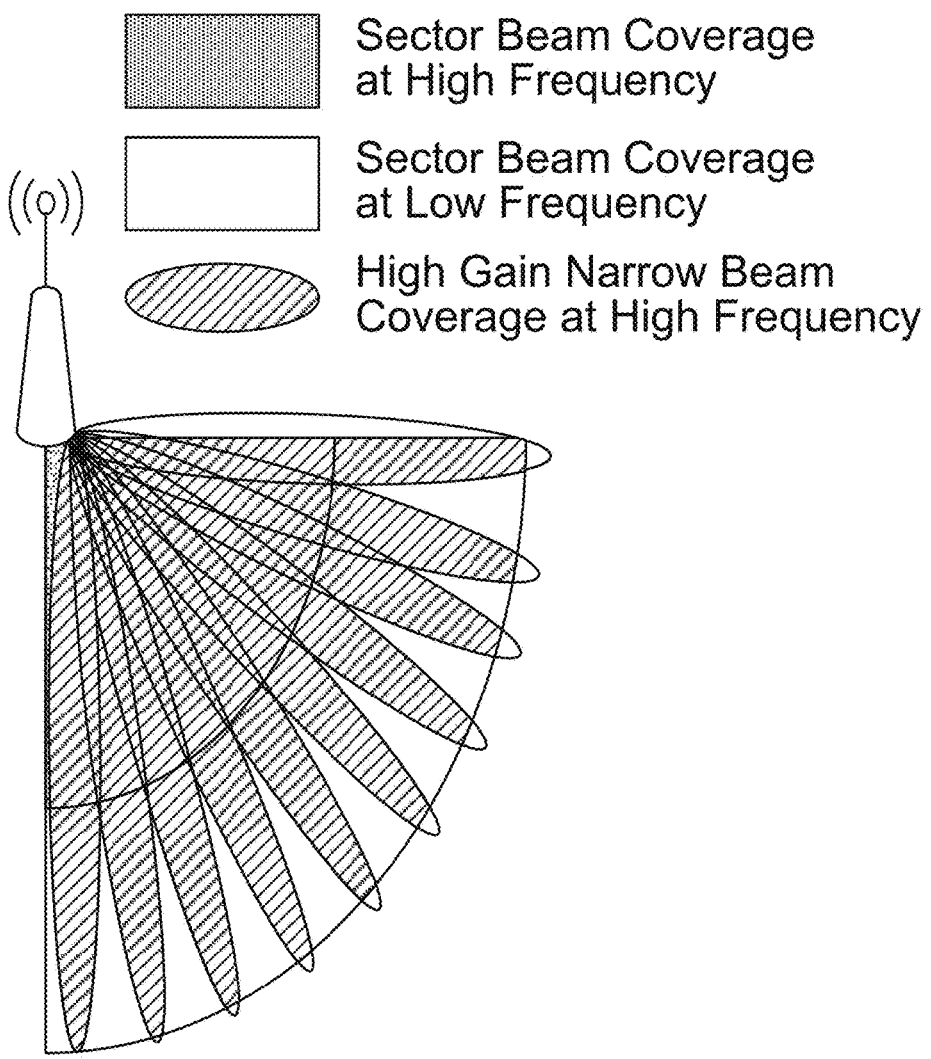
FIG. 30 illustrates cell coverage with sector beams and multiple high gain narrow beams.

The content may also include a hierarchical structure. The hierarchical structure includes a cell ID/TRP ID (if applicable)/RAN slice ID (if applicable)/Beam ID. It may also include nested beams with more than one coverage size as illustrated in FIG. 30. Here, the coarser beams have relatively wider coverage and high gain narrow beams with refined antenna weight vectors. In this case, if there are two sizes of coverage beams, one will be denoted as Type 1 beam and the other as Type 2 beam. The Type 1 beam is a wider beam that includes more than one Type 2 beam. The Beam ID may be cell ID (and/or TRP ID and/or RAN slice)+Level 1 Beam ID+level 2 Beam ID.

If multiple beams are broadcast simultaneously then each beam has its own beam ID. Type 1 beams may be used for broadcasting of "essential" (or "primary" or "most important") system information (e.g., NR equivalent of LTE MIB, SIB1 and SIB2) while Type 2 beams may be used for delivery of system information on demand for e.g., system information not essential for system access for example service specific system information. There are two options for PBCH design for initial access, the first option is that the PBCH is on demand transmission and the second option is PBCH paired with each beam transmission.

PBCH with Each Beam Transmission

Figure 31:
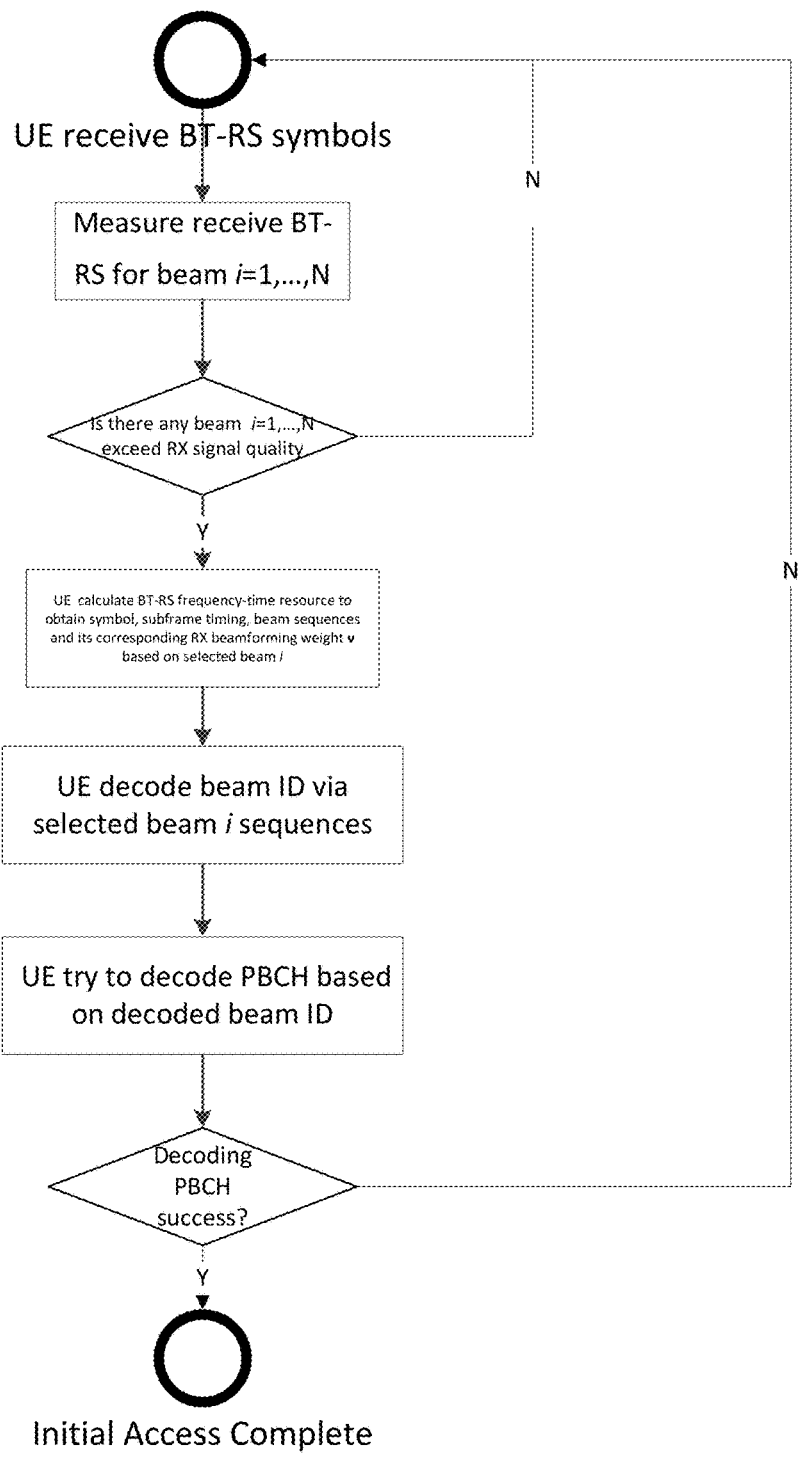
FIG. 31 illustrates an exemplary embodiment of user equipment (UE) initial access procedure for beamforming training when PBCH is paired with a beam transmission according to the application.
Figure 32:
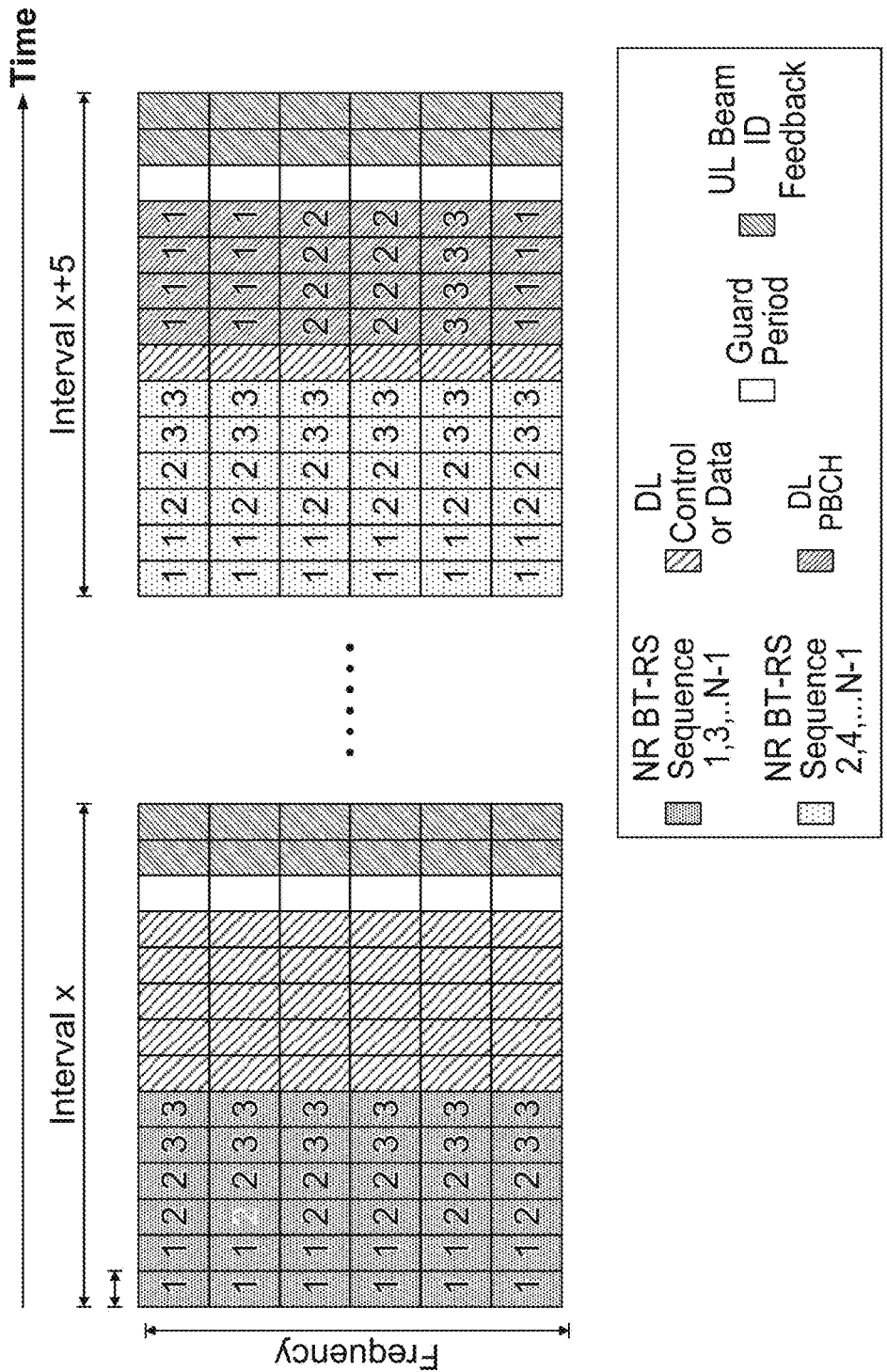
FIG. 32 illustrates placement of BT-RS and PBCH in the frame structure according to an embodiment of the application.

In another embodiment at initial access, the PBCH is always transmitted following DL BT-RS of each Tx beam in the DL Tx beam sweeping. In this way, once a UE successfully detects a valid BT-RS (and corresponding beam) in the DL, and decodes the beam ID, then the UE can start to decode the corresponding beam formed PBCH. The UE will not perform any beamforming feedback or its Tx beam sweeping/training to the NR-Node before it decodes the PBCH. The UE procedure for this method is exemplarily illustrated in FIG. 31. FIG. 32 describes placement of BT-RS and PBCH in the frame structure.

In this option, the UE won't need to decode PBCH until it receives the beam acquisition ACK from NR-node. The beam ID feedback resource has been reserved by NR system and it is known to UE. In addition, contention may occur because multiple UEs may contend if they experience the same beam (or detect the same ID). However, the probability of contention is low because UEs are at different geometric locations and won't undergo the same beam in general. In addition, the NR-node can absorb the uplink propagation due to asynchronization. The feedback mechanism can use the CAZAC sequence proposed in the following equation:

$$BID_{feedback} = e^{j\alpha n} e^{\frac{-j\pi uq(q+1)}{N}},$$

$$q = 0, 1, \ldots, Q-1,$$

where Q is the sequence length, the root of CAZAC sequence u can be set as function of beam ID and $\alpha$ is the cyclic shift.

NR-SS Periodicity

Figure 33:
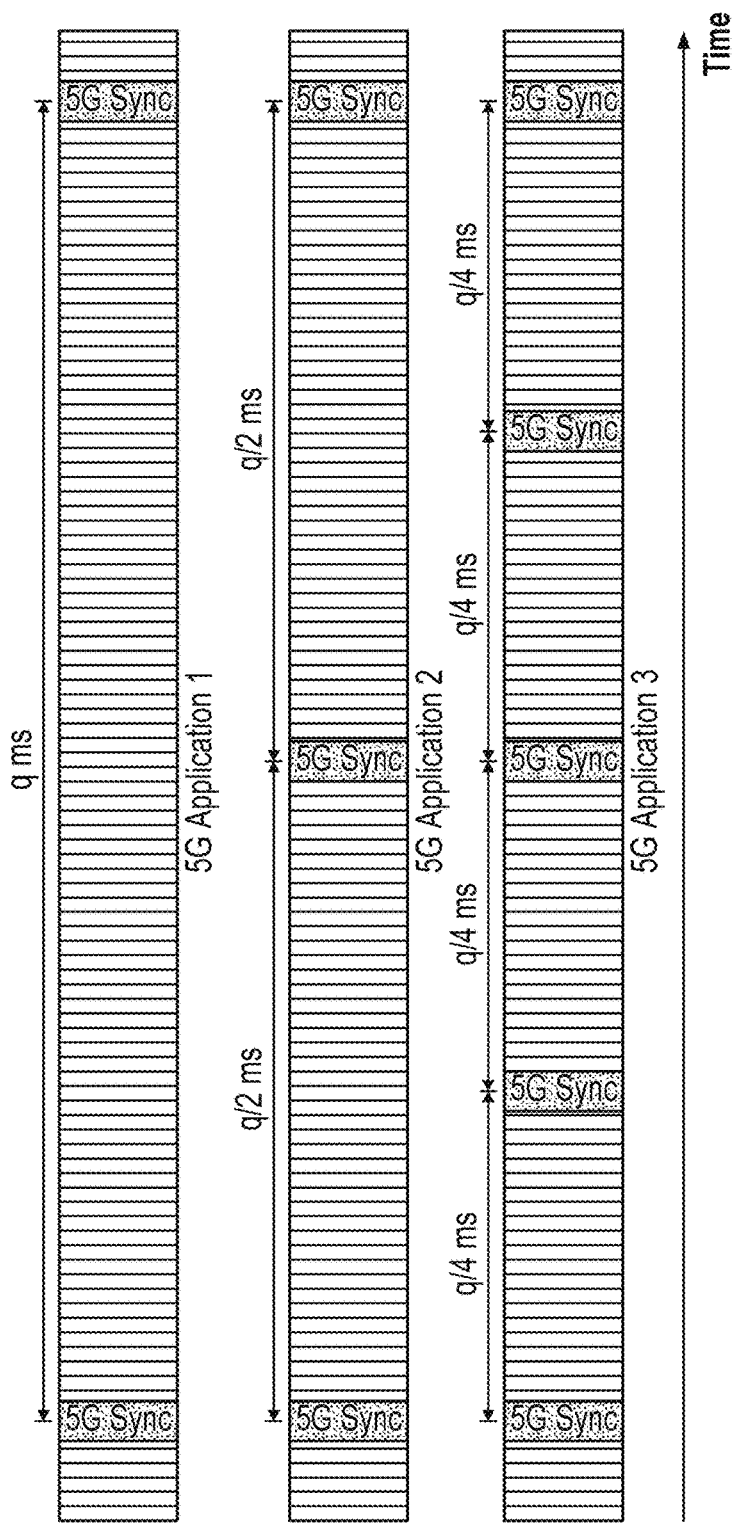
FIG. 33 illustrates a downlink sync broadcast period dependent upon various subcarrier spacings according to an embodiment of the application.

According to a further aspect of the application, it is envisaged that the periodicity of DL sync signals can be dependent on various 5G applications supported in the cell. For example, a 5G application can use different sync channel periodicities. In a use case, consider a cell that supports three different 5G services. Each service could have different subcarrier spacing, for instance, $\Delta f$, $2\Delta f$ and $4\Delta f$. Accordingly, the DL sync broadcast periodicity for each service would be different. For example, the application with subcarrier spacing $\Delta f$ can have q ms DL sync channel periodicity. Alternatively, the application with subcarrier spacing $2\Delta f$ can have q/2 ms periodicity. Alternatively, the application with subcarrier spacing $4\Delta f$ can have q/4 ms periodicity. This is shown, for example, in FIG. 33.

In an embodiment, the DL synchronization procedures at the UE are blindly detected with various DL sync broadcast periodicities. Specifically, in the PSS detection stage, the UE performs the step of cross-correlating a received signal with the Q possible PSS sequences. Q is the maximum number of PSS sequences can be supported. The UE may also perform the step of storing the cross-correlate result into various accumulation buffers according to the various PSS broadcast periodicities. The UE may also select the strongest peak from the accumulation buffers. Then, it may obtain the corresponding $N_{ID}^{(2)}$ with its corresponding root sequence u. From this, the time relative position of the correlation peak can provide the time offset to the waveform symbol to begin SSS detection.

In a further embodiment, in a SSS detection stage, the UE performs the step of cross-correlating a received signal with the P possible SSS sequences. The UE may also perform the step of storing the cross-correlate result into various accumulation buffers according to the various SSS broadcast periodicities. Next, the UE may select the strongest peak and obtain the corresponding $N_{ID}^{(1)}$ therefrom. If the UE cannot find reliable correlation results, the UE will return to the correlating step to detect the next $N_{ID}^{(2)}$. Otherwise, the UE will calculate the cell ID $N_{ID}^{cell}$ via $N_{ID}^{(1)}$ and $N_{ID}^{(2)}$.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, transit device or the like, perform and/or implement the systems, methods and processes described herein. Specifically, any of the steps, operations or functions described above may be implemented in the form of such computer executable instructions. Computer readable storage media includes volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the plural call flows according to FIGS. 7A/B, 14, 23-24, 29 and 31. The computer executable instructions may be stored in a memory and executed by a processor disclosed above in FIGS. 3C and 3F, and employed in devices including a node such as for example, a base station and end-user equipment. In particular, the UE as shown for example in FIGS. 3B and 3E is configured to perform the instructions of: (i) performing a search for a cell in a 5G network; (ii) detecting a primary synchronization signal of the cell; (iii) identifying a secondary synchronization signal of the cell; (iv) synchronizing with the cell; and decoding a physical broadcast channel of the cell using sync numerology. Here, a subcarrier spacing factor is obtained either from the detected primary synchronization signal or the detected second synchronization signal.

The UE may also be configured to performing configuration of an initial access signal in the 5G network. The instructions executed by processor include: (i) monitoring transmission of a downlink sweeping subframe including a beam sweeping block carrying a downlink initial access signal; (ii) detecting the downlink initial access signal carrying a synchronization channel; and (iii) determining, based on the synchronization channel, an identity of the beam sweeping block associated with the downlink.

In another aspect of the application, a UE on a first cell may wish to move to another cell. Here, the UE is configured to perform the steps of: (i) decoding a system information block of the first cell; (ii) determining the system information block includes sync numerology of the neighboring cell; (iii) performing primary and secondary synchronization signal detection of the neighboring cell; and (iv) synchronizing with the neighboring cell.

In another aspect, a base station as shown for example in FIGS. 3B-3F is configured to perform the instructions (i) transmitting a master information block of the cell to the node; and (ii) assigning the principal numerology to the node based upon criteria selected from network load, node location, network slicing configuration for the node, and combinations thereof.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. An apparatus on a 5G network comprising:
  a non-transitory memory including instructions stored thereon for performing configuration of an initial access signal in the 5G network; and
  a processor, operably coupled to the non-transitory memory, capable of executing the instructions of:
    monitoring transmissions of a downlink sweeping subframe including a beam sweeping block carrying a downlink initial access signal;
    detecting the downlink initial access signal carrying a synchronization channel; and
    determining, based on the synchronization channel, an identity of the beam sweeping block associated with the downlink initial access signal.

2. The apparatus of claim 1, wherein the processor is further configured to execute the instructions of calculating a timing offset between the beam sweeping block and the downlink sweeping subframe.

3. The apparatus of claim 2, wherein the processor is further configured to execute the instructions of compensating for the timing offset.

4. The apparatus of claim 1, wherein the determining instruction includes locating one or more of a cell ID and beam ID.

5. The apparatus of claim 4, wherein the downlink access signal further includes a beam reference signal.

6. The apparatus of claim 1, wherein the beam sweeping block is part of a beam sweeping burst.

7. The apparatus of claim 6, wherein the beam sweeping block includes one or more OFDM symbols.

8. The apparatus of claim 7, wherein the beam sweeping block includes one or more beams.

9. The apparatus of claim 7, wherein the synchronization channel includes a primary or secondary synchronous sequence employed to detect symbol timing, detect subcarrier spacing, derive a subframe index, derive a symbol to subframe index, or combinations thereof.

10. The apparatus of claim 1, wherein the apparatus is selected from a smartphone, tablet and laptop.

11. The apparatus of claim 1, wherein the detecting step includes:
  cross-correlating the detected primary synchronization signal with a number of other possible primary synchronization signals;
  obtaining a cell identity based upon the cross-correlating step; and
  deriving the subcarrier spacing factor from the obtained cell identity.

12. The apparatus of claim 1, wherein the identifying step includes:
  cross-correlating the identified secondary synchronization signal with a number of other possible secondary synchronization signals; and
  deriving the subcarrier spacing factor from the strongest peak obtained in the cross-correlating step.

13. The apparatus of claim 1, wherein the processor is further capable of providing sync numerology to the node prior to the synchronization step.

14. The apparatus of claim 13, wherein the sync numerology includes a cyclic prefix length and a subcarrier spacing for a principal numerology, the principal numerology being greater than or equal to 1.

15. The apparatus of claim 14, wherein the principal numerology includes physical layer channel parameters of cyclic prefix length, subcarrier spacing and symbol duration.

16. An apparatus on a 5G network comprising:
  a non-transitory memory including instructions stored thereon for performing downlink synchronization of a cell in the 5G network; and
  a processor, operably coupled to the non-transitory memory, capable of executing the instructions of:
    performing a search for a cell in a 5G network;
    detecting a primary synchronization signal of the cell;
    identifying a secondary synchronization signal of the cell;
    synchronizing with the cell; and
    decoding a physical broadcast channel of the cell using sync numerology, wherein a subcarrier spacing factor is obtained either from the detected primary synchronization signal or the detected second synchronization signal.

17. The apparatus of claim 16, wherein a periodicity of the primary or secondary synchronization signals is dependent upon an application supported by the cell.

18. The apparatus of claim 16, wherein the physical broadcast channel carries system information to support numerology, physical random access channel resources, block timing indication and demodulation.

19. A method for configuring a downlink initial access signal on a 5G network comprising:
   monitoring periodic transmissions of a downlink sweeping subframe, the subframe including a beam sweeping block carrying the downlink initial access signal;
   detecting the downlink initial access signal carrying a synchronization channel;
   calculating a timing offset between the beam sweeping block and the downlink sweeping subframe; and
   compensating for the timing offset.

20. The method of claim 19, further comprising:
   determining, based on the compensated timing offset, an identity of the beam sweeping block associated with the downlink initial access signal.

* * * * *